United States Patent
Arce et al.

(10) Patent No.: US 11,267,756 B2
(45) Date of Patent: Mar. 8, 2022

(54) ENGINEERED CEMENTITIOUS COMPOSITES

(71) Applicant: Board of Supervisors of Louisiana State University and Agricultural and Mechanical College, Baton Rouge, LA (US)

(72) Inventors: Gabriel Andres Arce, Baton Rouge, LA (US); Marwa Hassan, Baton Rouge, LA (US); Hassan Noorvand, Baton Rouge, LA (US); Tyson Rupnow, Baton Rouge, LA (US); Michele Barbato, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 16/838,169

(22) Filed: Apr. 2, 2020

(65) Prior Publication Data
US 2020/0317572 A1 Oct. 8, 2020

Related U.S. Application Data

(60) Provisional application No. 62/827,983, filed on Apr. 2, 2019.

(51) Int. Cl.
*C04B 18/24* (2006.01)
*C04B 18/08* (2006.01)
*C04B 16/06* (2006.01)
*C04B 103/30* (2006.01)

(52) U.S. Cl.
CPC .......... *C04B 18/24* (2013.01); *C04B 16/0633* (2013.01); *C04B 16/0641* (2013.01); *C04B 18/08* (2013.01); *C04B 2103/302* (2013.01)

(58) Field of Classification Search
CPC . C04B 16/0633; C04B 16/0641; C04B 18/08; C04B 18/24; C04B 2103/302
See application file for complete search history.

(56) References Cited

PUBLICATIONS

Inbasekar et al. "Study on Potential Utilization of Sugarcane Bagasse Ash in Steel Fiber Reinforced Concrete", International Journal of Engineering Sciences & Research Technology, Inbasekar, 5(4), pp. 43-50. ISSN: 2277-9655 (Year: 2016).*
Mangi et al. "Utilization of sugarcane bagasse ash in concrete as partial replacement of cement", IOP Conf. Series: Materials Science and Engineering 271 (2017) Jan. 2001, pp. 1-8. doi:10.1088/1757-899X/271/1/012001 (Year: 2017).*
Qudoos et al., "Performance Evaluation of the Fiber-Reinforced Cement Composites Blended with Wheat Straw Ash", Advances in Materials Science and Engineering vol. 2019, Article ID 1835764, 8 pages. https://doi.org/10.1155/2019/1835764 (Year: 2019).*
Rao et al., "Flexural Behaviour of Sugarecane Bagasse Ash Modified Fibre Reinforced Concrete", M. Venkata Rao Journal of Engineering Research and Application, vol. 8, Issue 6 (Part-V) Jun. 2018, pp. 13-20. (Year: 2018).*
Sudhakar et al. "Investigation of Effect On Various Fibers On The Mechanical Properties of Bagasse Ash Blended With High Performance Concrete", International Research Journal of Engineering and Technology (IRJET), vol. 04 Issue: 06, pp. 1756-1759. e-ISSN: 2395-0056 (Year: 2017).*
V. C. Li Engineered Cementitious Composites (ECC), (2019), Chapters 1-3, pp. 4,45,74. Springer, Berlin Germany. (submitted in 2 parts).

* cited by examiner

*Primary Examiner* — Anthony J Green
(74) *Attorney, Agent, or Firm* — Thomas | Horstemeyer, LLP

(57) ABSTRACT

Engineered Cementitious Composites (ECC) and cement products including Engineered Cementitious Composites are provided. The ECC can include cement, sugar cane bagasse ash, and fiber. The sugar cane bagasse ash can be processed to provide a partial cement or sand replacement in ECCs and cement products.

15 Claims, 43 Drawing Sheets

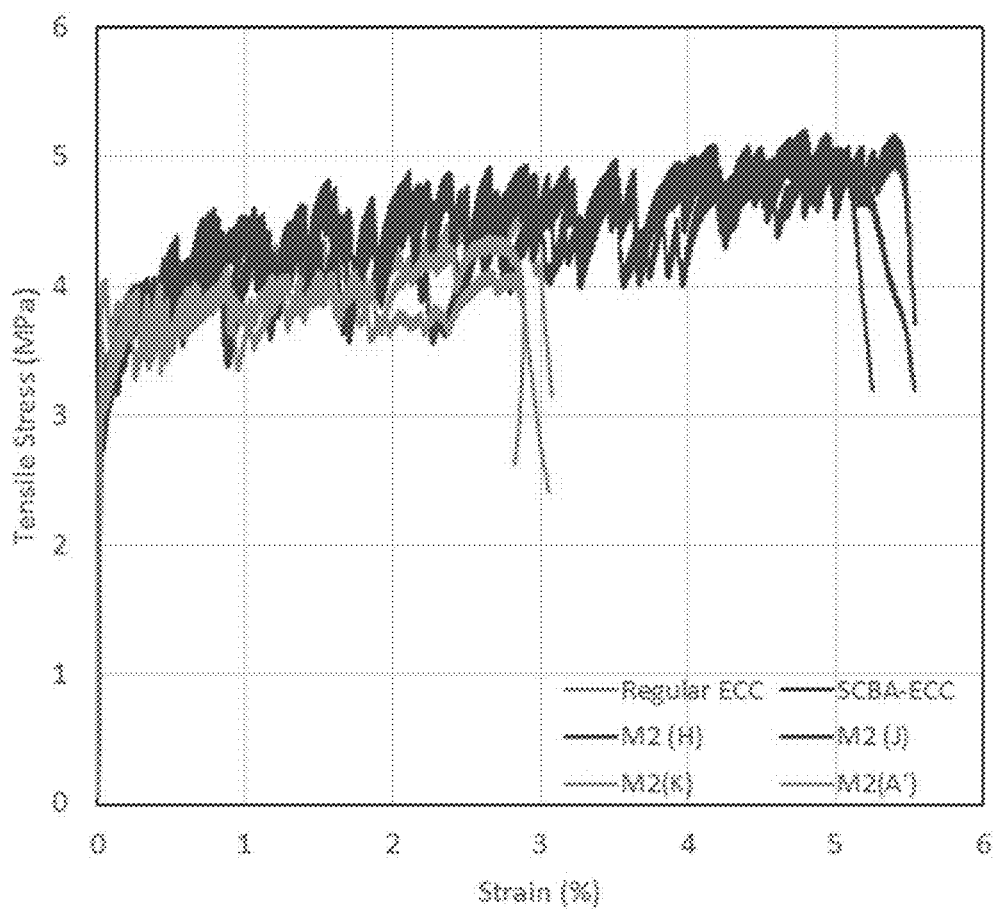
Fig. 4A
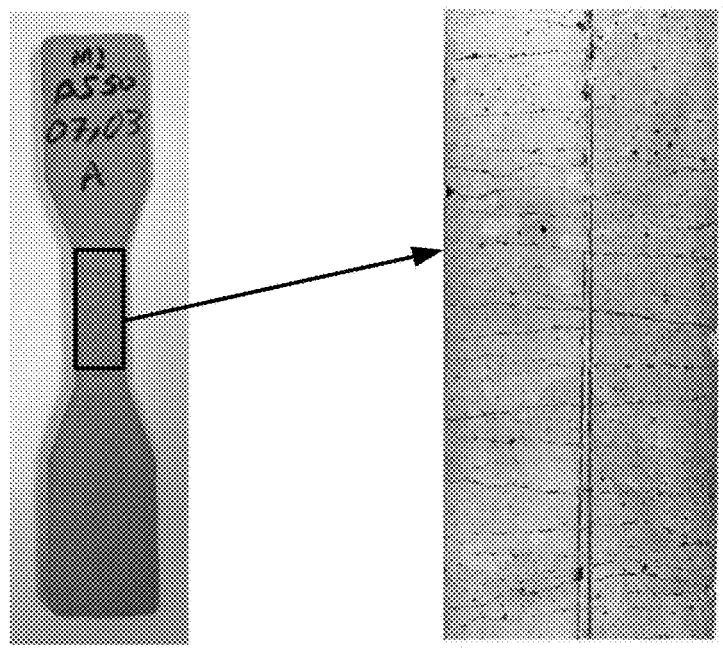
Fig. 4B  Fig. 4C

An: Anorthoclase, Q: Quartz; Al: Albite

ENGINEERED CEMENTITIOUS COMPOSITES

CROSS-REFERENCE TO RELATED APPLICATIONS

This application claims the benefit of and priority to U.S. Provisional Application Ser. No. 62/827,983, having the title "ENGINEERED CEMENTITIOUS COMPOSITES", filed on Apr. 2, 2019, the disclosure of which is incorporated herein by reference in its entirety.

STATEMENT REGARDING FEDERALLY SPONSORED RESEARCH OR DEVELOPMENT

This invention was made with Government support under contract DOT 69A3551747106 awarded by the US Department of Transportation. The Government has certain rights in the invention.

BACKGROUND

Through years of research and practical applications, concrete has proved to be a reliable construction material for use in infrastructure around the globe. However, the susceptibility of concrete to cracking is a major challenge and has resulted in various failures and early deterioration in concrete structures. As an effort to address this issue, many studies focused on improving ductility and fracture toughness of concrete materials. An approach to enhance ductility in concrete is by means of fiber reinforcement. Although the development of Fiber-Reinforced Concrete (FRC) has improved the fracture toughness of concrete, FRC has shown quasi-brittle post-peak tension softening behavior that results in low tensile strain capacity.

There remains a need for materials that overcome the aforementioned deficiencies.

SUMMARY

Embodiments of the present disclosure provide for Engineered Cementitious Composites, methods of making Engineered Cementitious Composites, products including Engineered Cementitious Composite and the like.

An embodiment of the present disclosure includes an Engineered Cementitious Composite (ECC) including cement, fiber, and fine aggregate. The fine aggregate can include sugar cane bagasse ash.

An embodiment of the present disclosure also includes concrete products including ECCs as above. The ECC can include about 5% to 90% cement by weight, about 5% to 90% fine aggregate by weight, and about 1% to 3% fiber by volume of the ECC.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 3A shows tensile strength; FIG. 3B tensile strain capacity;

FIG. 3C shows compressive strength.

FIG. 4A illustrates tensile stress vs. strain curves of regular ECC and SCBA-ECC of the present disclosure; FIG. 4B is an example of an SCBA-ECC tensile specimen of the present disclosure; FIG. 4C shows robust multiple microcracking PSH behavior of SCBA-ECC.

FIG. 5A shows the tensile stress vs. strain curve showcasing robust pseudo strain-hardening behavior and high tensile ductility; FIG. 5B tensile strain capacity; FIG. 5C tensile strength; FIG. 5D compressive strength.

FIG. 7A, SBF; FIG. 76, Raw SCBA; FIG. 7C Post-Processed SCBA; FIG. 7D Controlled SCBA.

FIG. 10A shows raw SCBA and FIG. 10B is an image obtained from BSE SEM.

(FIG. 11B) SCBA and Silica Sand Particle Size Distributions.

FIG. 12A graphs ECC compressive strength and FIG. 12B graphs ECC hardened density.

(FIG. 13A) M-0; (FIG. 13B) M-25; (FIG. 13C) M-50; (FIG. 13D) M-75; (FIG. 13E) M-100.

(FIG. 14A) first-cracking and tensile strength and (FIG. 14B) strain at peak strength.

16A) M-0 (FIG. 16B) M-25 (FIG. 16C) M-50 (FIG. 16D) M-75 (FIG. 16E) M-100; (FIG. 16F) average curves.

(FIG. 17A) Fiber Bridging Capacity, $\sigma\_0$ (FIG. 17B) Crack Opening at $\sigma\_0$, $\delta\_0$ (FIG. 17C) Complimentary Energy, $J\_b^'$.

(FIG. 20A) sieved bagasse ash and (FIG. 208) burned bagasse ash at 550° C.

(FIG. 21A) Cumulative particle size distributions and (FIG. 21B) Size distribution frequency.

(FIG. 26A) tensile strength and (FIG. 26B) tensile strain capacity at 28 days of curing.

(FIG. 27A) M-0 and (FIG. 27) M-50.

(FIG. 28A) M-0 (FIG. 28) M-25 (FIG. 28C) M-50 (FIG. 28D) M-75 (FIG. 28E) M-100 cracking characterization.

(FIG. 33A) tensile strength and (FIG. 338) tensile strain capacity at 28 days of curing according to various embodiments of the present disclosure.

DETAILED DESCRIPTION

Figure 1A:
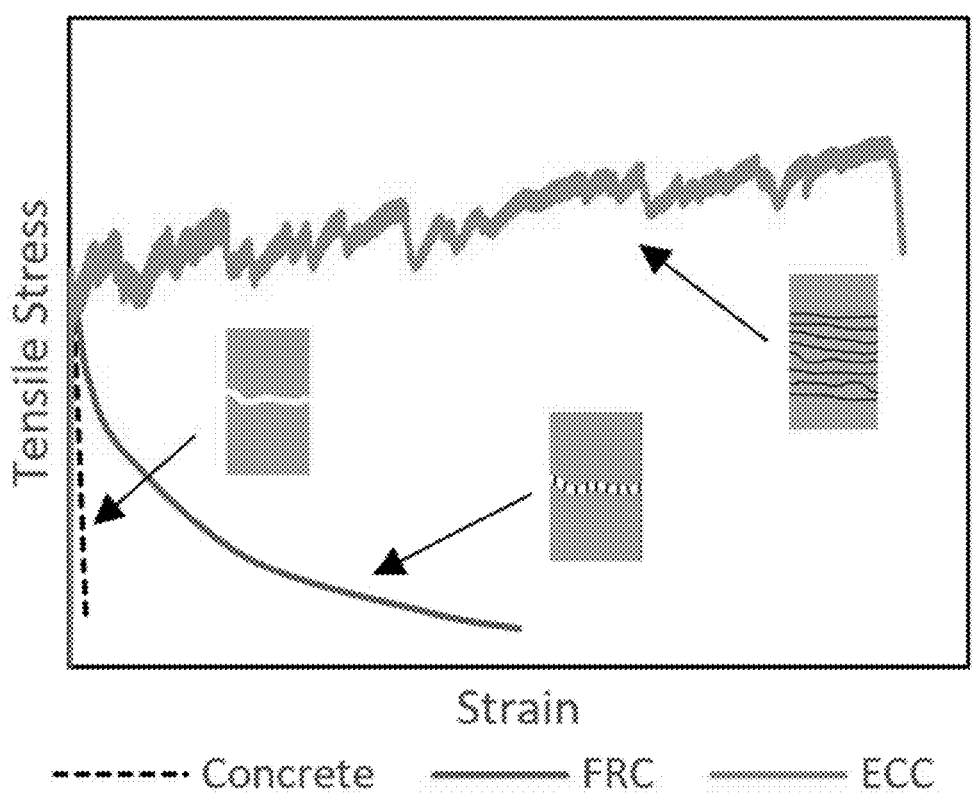
FIG. 1A graphs the stress vs. strain behavior of cementitious materials in tension.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, civil engineering, and the like, which are within the skill of the art.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition, components, or method steps (or analogs or derivatives thereof as discussed above). Such additional structural groups, composition, components, or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Definitions

"Fly ash", as used herein, is particulate matter that is a by-product of Coal combustion.

"Engineered Cementitious Composites" or "ECC', as used herein

"Sugarcane bagasse" as used herein refers to a fibrous and/or pulpy residue remaining after extraction of sugarcane or sorghum juice.

"Cement" as used herein refers to Ordinary Portland Cement (OPC).

"Concrete" as used herein refers to Ordinary Portland Cement (OPC) Concrete

"Sugarcane bagasse ash", or "SCBA" as used herein refers to a byproduct of sugar refinement. The ash can be raw or burned, and can be processed such as by grinding.

"Strength Activity index" or "SAI", as used herein, refers to the pozzolanic activity of supplementary cementitious materials (SCMs) by strength activity as described in ASTM C311

"Pseudo strain-hardening" or "PSH" as used herein describes the Inelastic deformation that takes place with an increase in load carrying capacity.

General Discussion

In accordance with the purpose(s) of the present disclosure, as embodied and broadly described herein, embodiments of the present disclosure, in some aspects, relate to cementitious compounds and concrete products. In general, embodiments of the present disclosure provide for compositions including sugarcane bagasse ash, and products including sugarcane bagasse ash.

The present disclosure includes Engineered Cementitious Composites (ECC) including sugarcane bagasse ash (SCBA). Advantageously, the SCBA can replace all or part of the sand or cement components of existing cementitious composites. The formulations described in the present disclosure are both cost-effective and provide enhanced properties over existing ECCs. The compounds and products of the present disclosure can include low-quality SCBA (e.g. sand-grade SCBA) to partially or completely replace microsilica sand and/or the compounds or products of the present disclosure can include high-quality SCBA to partially replace sand and/or cement in the manufacture of ECC. Low-quality SCBA can be raw or burned, with a mean particle size of about 10 to 300 μm, and Strength Activity index of about 30 to 100%. High-quality SCBA can be burned, having a mean particle size of about 10 to 100 μm, and Strength Activity Index of about 65% to 130%.

Embodiments of the present disclosure include ECC as described above, which can include cement, fibers, and fine aggregate. The fine aggregate can include sugar cane bagass ash.

The utilization of SCBA for sand and/or cement replacement significantly decreases the cost of ECC because SCBA is a readily available byproduct of another industry that is currently treated as waste. Beneficially, this also reduces the environmental footprint of ECC manufacture. In various embodiments, up to about 90% of cement content of a traditional ECC can be replaced with sugarcane bagasse ash (by weight). In various embodiments, up to 100% of sand content of a traditional ECC can be replaced with sugarcane bagasse ash (by weight). Advantageously, the use of SCBA can enhance the mechanical properties, such as strength and ductility, of ECC.

In various embodiments, the ECC can include about 1% to 5% fibers by volume. The fibers can include polymeric fibers, oil-coated polymeric fibers, non-oil-coated polymeric fibers, metallic fibers such as steel fibers, or other fibers and/or mixtures of fibers as can be envisioned by one of ordinary skill in the art.

Other advantages of embodiments according to the present include cost reduction by including non-oil-coated polymeric fiber in place of traditional oil-coated PVA fiber. Oil-coated fiber is expensive and not readily available in the US market. In embodiments of the present disclosure, the ECC can include non-oil-coated fibers. Typical fiber content is about 2%, where the compounds of the present disclosure can include a lower volume fraction (e.g. about 1 to 2%) of the non-oil-coated fibers. The non-oil-coated fibers can include, but are not limited to non-oil-coated Polyvinyl Alcohol (PVA), non-oil-coated Polypropylene (PP), non-oil-coated Polyethylene (PE), or combinations thereof. In other embodiments, the fibers can include natural fibers, or combinations of fiber types.

ECC exhibits better ductility than other concrete materials. However, existing ECCs utilize sands with extremely small particle size (i.e., about 150 μm average particle size) as an aggregate to attain this ductility. Sands with such particle sizes are not found readily in nature, therefore, artificially manufactured sands such as microsilica sand are utilized in the manufacture of ECC materials. Such materials are extremely expensive and not readily available. In various embodiments, the fine aggregate of the ECCs in the present disclosure can also include sand. The sand can be fine silica (also called microsilica) sand. The fine silica sand can also be such as river sand. Advantageously, the use of readily-available SCBA in the fine aggregate as a sand replacement, as described herein, can decrease the cost of ECCs without a significant loss of strength or ductility.

In various embodiments, the SCBA can be raw, or burned and/or calcinated. The SCBA can be milled to achieve desired particle sizes. In various embodiments, the fine silica sand can have a mean particle size of about 1 to 3000 μm. The raw SCBA can have a mean particle size from about 1 to 1000 μm, burned sugarcane bagasse ash having a mean particle size from about 1 to 1000 μm or a combination thereof. As described above, SCBA of various sizes and quality can be used or combined in the fine aggregate.

In various embodiments, the fine aggregate can include SCBA and fine silica sand in a ratio of about 1:20 to about 1:0 by weight. In other words, SCBA can be used as a partial or total sand replacement in the ECC of the present disclosure.

In the ECCs described above, other components may be included such as water, and/or a water reducer admixture (e.g. a polycarboxylate-based admixture.

In various embodiments, the ECC can include about 5% to about 90% of cement by volume or about 5% to about 90% cement by weight. In various embodiments, the ECC can include a fine aggregate Including about 5% to about 90% of SCBA by volume. In various embodiments, the fine aggregate can make up about 10% to 90% of the overall ECC. In various embodiments, the ECC can include about 30% to 80% by weight and about 10% to 60% fine aggregate by weight.

In various embodiments, the SCBA can also be bagasse ash from sorghum or other products.

In various embodiments, the cement in the ECC can also be partially replaced by Supplementary Cementitious Materials (SCMs) such as fly ash or slag. In a non-limiting example, the ECC could be include cement and fly ash, fiber, and fine aggregate (where the fine aggregate can include SCBA or a combination of SCBA and fine silica sand). In various embodiments, the fly ash to cement ratio can be from about 1:20 to 9:1 by weight.

The ECCs described herein can have a strain capacity in tension of about 0.1% to 10%, as described in the examples.

The present disclosure also provides for concrete including ECC as described above and herein.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

The exceptional properties of ECC make it an excellent material for repair and new construction of transportation infrastructure. However, to date, ECC implementation has been hindered by its cost. To this end, innovative ways of reducing ECC materials cost is of great importance for the large-scale implementation of these composites. On the other hand, sugarcane bagasse ash (SCBA) is an agricultural by-product with no economic value in Louisiana. While SCBA is currently considered a waste, due to its physical and chemical properties, SCBA possesses an excellent potential to be implemented in ECC as sand and/or cement replacement depending on its level of refinement. As such, the possible implementation of SCBA in ECC formulation, open the possibility to reduce the cost and increase the practicality of ECC materials by partially or completely replacing the expensive and not widely available microsilica sand, as well as to partially replacing cement Introduction Concrete is brittle and possess a low tensile strength, which allow for the occurrence and propagation of cracks due to loading or changing environmental conditions [1]. Moreover, the occurrence of cracks in concrete is highly related to the deterioration and failure of concrete pavements, overlay systems and bridges; hence, the improvements of crack resistance in concrete materials is of particular interest for the transportation sector.

Adding fibers to concrete is a well-established practice to mitigate the brittle behavior of concrete by limiting crack growth and propagation. Yet, traditional fiber reinforced concrete (FRC) produces rather marginal improvements in ductility and tensile strength. Furthermore, FRC continues to exhibit a strain-softening phenomenon after first cracking (single localized crack growth associated with a decrease in load carrying capacity) under tensile stresses as shown in FIG. 1A. For these reason, high performance fiber reinforced cementitious composites (HPFRCC) were developed as a superior alternative to mitigate concrete brittleness and its weak behavior under tensile stresses. In contrast to FRC, HPRFRCC exhibit a strain-hardening performance after first cracking under tensile stresses. Strain-hardening occurs due to inelastic deformation of the composite through the formation of multiple micro-cracks [2]. This inelastic deformation takes place with an increase in load carrying capacity and is referred as pseudo strain-hardening (PSH) to differentiate this mechanism with the strain-hardening phenomena observed in metals [3]. Early versions of HPFRCC such as SIFCON (Slurry Infiltrated Fiber Concrete) were designed by utilizing high contents of fiber (4-20% volume fraction) and achieved desirable improvements in tensile strength and ductility [4]. However, high fiber contents limited its application in the field due to constructability issues and cost.

Figure 1B:
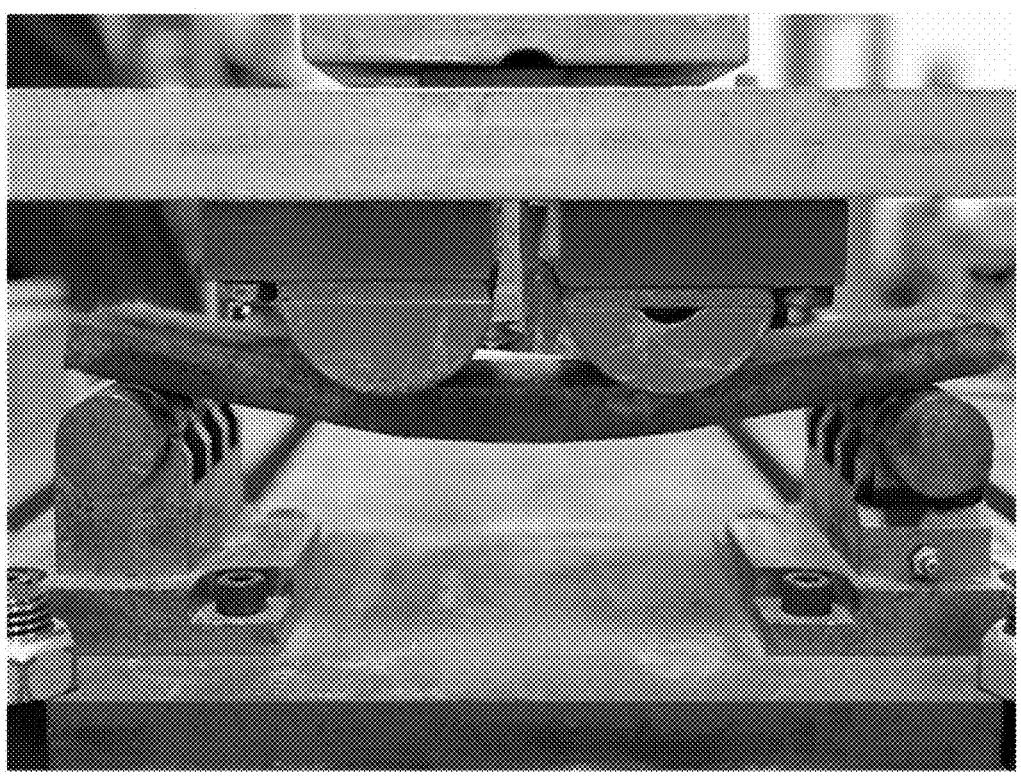
FIG. 1B is a photograph illustrating high deflection capacity of Engineered Cementitious Composites (ECC) material in accordance with embodiments of the present disclosure.

Engineered Cementitious Composites (ECC), also known as bendable concrete (FIG. 1b), are a novel class of HPFRCC that are designed and optimized based on micromechanics principles to exhibit a high tensile ductility (2 to 5% strain capacity in tension) through a robust PSH behavior at relatively low fiber contents (typically 2% volume fraction) [5]. This makes ECC practical to be implemented in the field using existing equipment and techniques as well as significantly more cost-effective than early versions of HPFRCC. Research on ECC durability has shown promising results against major types of concrete deterioration including corrosion, freeze-thaw, alkali silica reaction and sulfate attack [4], [6], [7]. Furthermore, ECC exhibits significant self-healing characteristics because of its tight crack width that allows autogenous healing mechanisms of cementitious materials to be effective; thus, enhancing the durability potential of this novel material even more [8], [9]. To date, ECC have been applied in bridge deck link slabs, bridge deck patches, and several repairs of concrete structures with successful performance [4], [10], [11]. While ECC properties are promising for repair applications and new construction of transportation infrastructure, its high cost compared with regular concrete limits its widespread application. ECC typically utilizes 2% volume fraction of polyvinyl alcohol (PVA) fiber, microsilica sand, and high contents of cement, which greatly increase its cost compared to regular concrete. For this reason, decreasing fiber content (without significantly penalizing performance) and implementing low cost materials that can partially or completely replace cement and microsilica sand can provide more cost-effective and practical ECC materials.

In Louisiana, the sugar production industry is of immense relevance generating a yearly economic value of $3 billion [12]. According to the American Sugarcane League, in 2016, more than 12.8 million tons of sugarcane were harvested in the state yielding 1.6 million tons of sugar and nearly 2.4 million tons of a fibrous by-product named bagasse [13]. Typically, bagasse is burned by the sugar mills to generate energy as well as to mitigate the fire hazard presented by dry fibrous bagasse [14]. Depending on the burning process of bagasse, the obtained ash yield ranges between 3% to 9%; yet, this sugarcane bagasse ash by-product is considered an agricultural waste with no economic value. In addition, bagasse ash constitutes a potential environmental hazard which leads to containment and disposal costs to the industry. Based on the literature and research conducted at LSU, when property processed by sieving (to remove coarse particles), controlled burning (to remove excess carbon content), and grinding (to further decrease particle size), sugar cane bagasse ash (SCBA) can exhibit significant pozzolanic activity due to its chemical composition an small particle size [15]-[20]. Typically, processed SCBA consists of more than 60% silicon oxide ($SiO_2$), and 7% of aluminum oxide ($A_2O_3$) by weight. In turn, this makes bagasse ash an excellent candidate for an affordable supplemental cementitious material (SCM) to partially replace cement in the production of ECC. While SCBA can serve as an excellent SCM material when properly processed, raw bagasse ash (i.e., SCBA obtained directly from the mill without further processing) exhibits high carbon content and therefore low pozzolanic activity. While raw SCBA cannot be utilized as a SCM, this lower quality ash presents excellent potential as a highly fine aggregate material to replace the expensive microsilica sand used in the production of ECC. To this end, the feasibility of utilizing bagasse ash has been evaluated with different levels of quality as cement and fine aggregate replacement for the manufacture of ECC in order to reduce its cost, make it more practical, and increase its greenness. To date, no other ECCs have utilized sugarcane bagasse ash.

Background
ECC Design

There are two basic conditions that needs to be met for the PSH behavior of ECC materials to occur, the strength criterion and the energy criterion [21]. The strength criterion (Eq. 1) guarantees adequate fiber-bridging capacity upon crack initiation and requires the first-cracking strength of the composite to be less than the fiber-bridging capacity on any plausible crack plane [21]. On the other hand, the energy criterion (Eq. 2) provides for steady-state flat crack propagation, which occurs when the crack tip matrix toughness ($J_{tip}$) is less or equal than the complementary energy of the fiber bridging relation ($J'_b$) as demonstrated by Marshall and Cox utilizing J-integral analysis [4], [21], [22].

Strength criterion [4]:

$$\sigma_0 \geq \sigma_{cs} \quad (1)$$

where,
$\sigma_0$=Fiber-bridging capacity;
$\sigma_{cs}$=Cracking strength.

Energy criterion [4]:

$$J'_b = \sigma_0 \delta_0 - \int_0^{\delta_0} \sigma(\delta) d\delta \geq J_{tip} \quad (2)$$

where,
$J'_b$=Complementary energy of the fiber-bridging relation;
$J_{tip}$=Crack-tip matrix toughness;
$\delta_0$=Crack opening corresponding to $\sigma_0$;
$\sigma(\delta)$=Fiber-bridging relationship.

Figure 2:
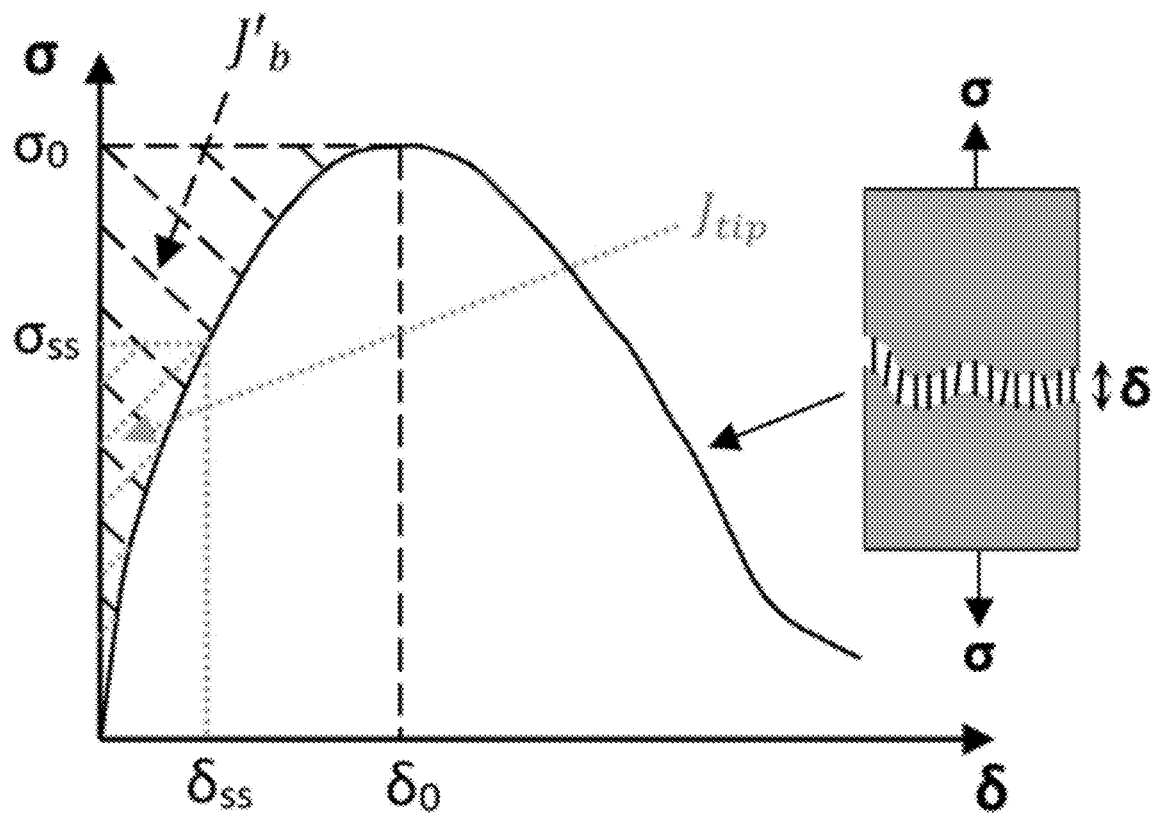
FIG. 2 illustrates the fiber bridging relationship (σ-δ curve) in accordance with embodiments of the present disclosure.

If the crack-tip matrix toughness $J_{tip}$ (sensitive to the details of the cementitious matrix design) is too high or inadequate energy absorption occur in the increasing phase of the σ-δ curve, then, steady-state crack propagation is hard to be achieved [23], [24]. FIG. 2 presents a graphical representation of $J'_b$ and $J_{tip}$ on a schematic fiber-bridging curve.

From Eqs.1 and 2, successful design of ECC can be achieved when both the strength and the energy criteria are satisfied. Consistent with the conditions for PSH behavior presented above, if the ratios $J'_b/J_{tip}$, and $\sigma_0/\sigma_{cs}$ named pseudo strain-hardening performance indexes (PSH indexes) are greater than one then, both, the strength and the energy criteria will be met. Otherwise, if any of the two ratios are less than one, the tensile-softening behavior of fiber reinforced concrete (FRC) will prevail (as shown in FIG. 1A). It is important to notice that the equality signs on Eq.1 and Eq.2 assume a perfectly homogeneous material; thus, in practice the need for PSH indexes greater than one are desired for robust PSH performance [2], [4]. Theoretical and experimental evidence suggests that a PSH strength index of 1.3 and PSH energy index of 2.7 correlates to saturated multiple cracking behavior of fiber reinforced cementitious composites [25]. Saturated PSH behavior refers to the greatest multiple cracking intensity that can occur in fiber reinforced cementitious composites before crack spacing is too small for further crack formation (due to inability of sufficient stress transfer from fibers at a crack plane) [26].

Preliminary Investigation

The major hypothesis of the research is that bagasse ash can be utilized to replace cement and/or sand in the production of ECC materials. In order to obtain a preliminary validation of this hypothesis, a regular ECC mixture design (M2-1.75%) developed utilizing local ingredients in the state of Louisiana [27], was modified by replacing 25, 50, 75 and 100% of its sand (by volume) with post-processed SCBA. Proportions of the regular ECC mixture (M2-1.75%) and SCBA-ECC mixtures (M2-1.75%-SCBA-X, where X is the level of replacement) are presented in Table 1.1. In Table 1.1, EA/C is the Fly Ash to cement ratio, W/B is the water to binder ratio, and S/B is the sand to binder ratio.

TABLE 1.1

ECC Materials Proportions

| | Proportions by Weight | | | | | | | | | |
|---|---|---|---|---|---|---|---|---|---|---|
| Mix ID | Cement | Fly Ash | Water | Sand | HRWR | Fibers (Vol %) | SCBA (%) | FA/C | W/B | S/B |
| M2-1.75% | 1 | 2.2 | 0.87 | 1.16 | TBD | 1.75 | 0 | 2.2 | 0.27 | 0.36 |
| M2-1.75%-SCBA-25 | 1 | 2.2 | 0.87 | 1.16 | TBD | 1.75 | 25 | 2.2 | 0.27 | 0.36 |
| M2-1.75%-SCBA-50 | 1 | 2.2 | 0.87 | 1.16 | TBD | 1.75 | 50 | 2.2 | 0.27 | 0.36 |
| M2-1.75%-SCBA-75 | 1 | 2.2 | 0.87 | 1.16 | TBD | 1.75 | 75 | 2.2 | 0.27 | 0.36 |
| M2-1.75%-SCBA-100 | 1 | 2.2 | 0.87 | 1.16 | TBD | 1.75 | 100 | 2.2 | 0.27 | 0.36 |

Materials

The materials utilized for the manufacture of ECC were the following: Type I Ordinary Portland Cement (OPC), fine river sand with a maximum particle size of 1.18 mm and a fineness modulus of 1.96, Class F Fly Ash, non-oil coated RECS 15 Polyvinyl Alcohol (PVA) fibers from NYCON, US (8 mm in length, 38 µm in diameter, and 1600 MPa tensile strength), and a polycarboxylate-based high range water reducer (HRWR). Bagasse ash utilized as sand replacement was post-processed SCBA. Post-processing consisted of grinding, sieving, and burning.

Experimental Testing

Compressive strength test according to ASTM C39 [30] as well as uniaxial tensile test per recommendations of the Japan Society of Civil Engineers [31] were conducted after 28 days of curing. Three compressive strength tests were conducted for each ECC material evaluated. On the other hand, 10 uniaxial tensile test were conducted for each ECC material.

Results

Figure 3A:
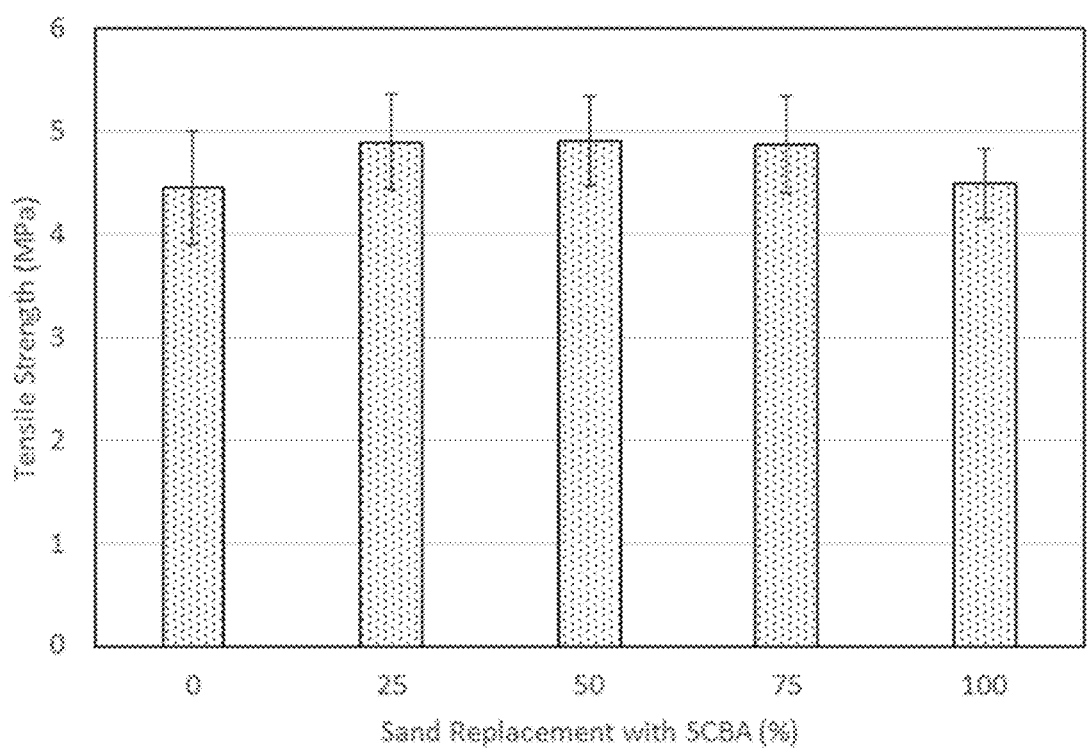
FIGS. 3A-3C graph the mechanical properties of sugarcane bagasse ash (SCBA) ECC materials of embodiments of the present disclosure at different contents of sand replacement with SCBA.
Figure 3B:
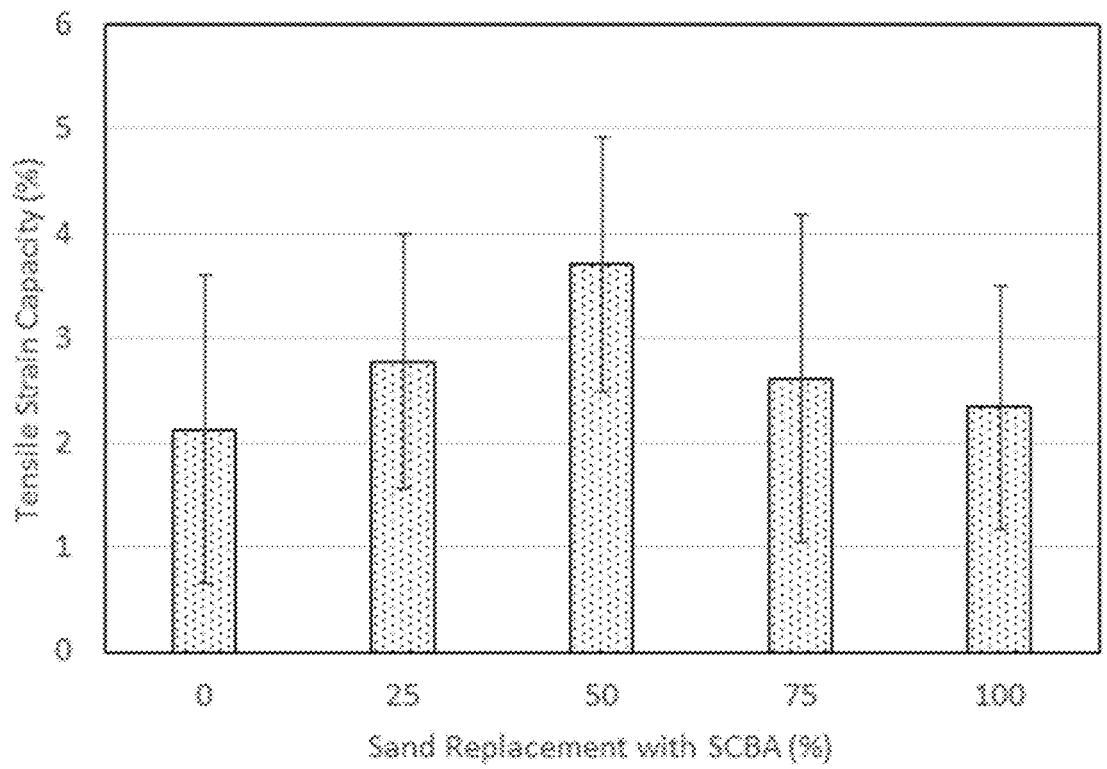
Figure 3C:
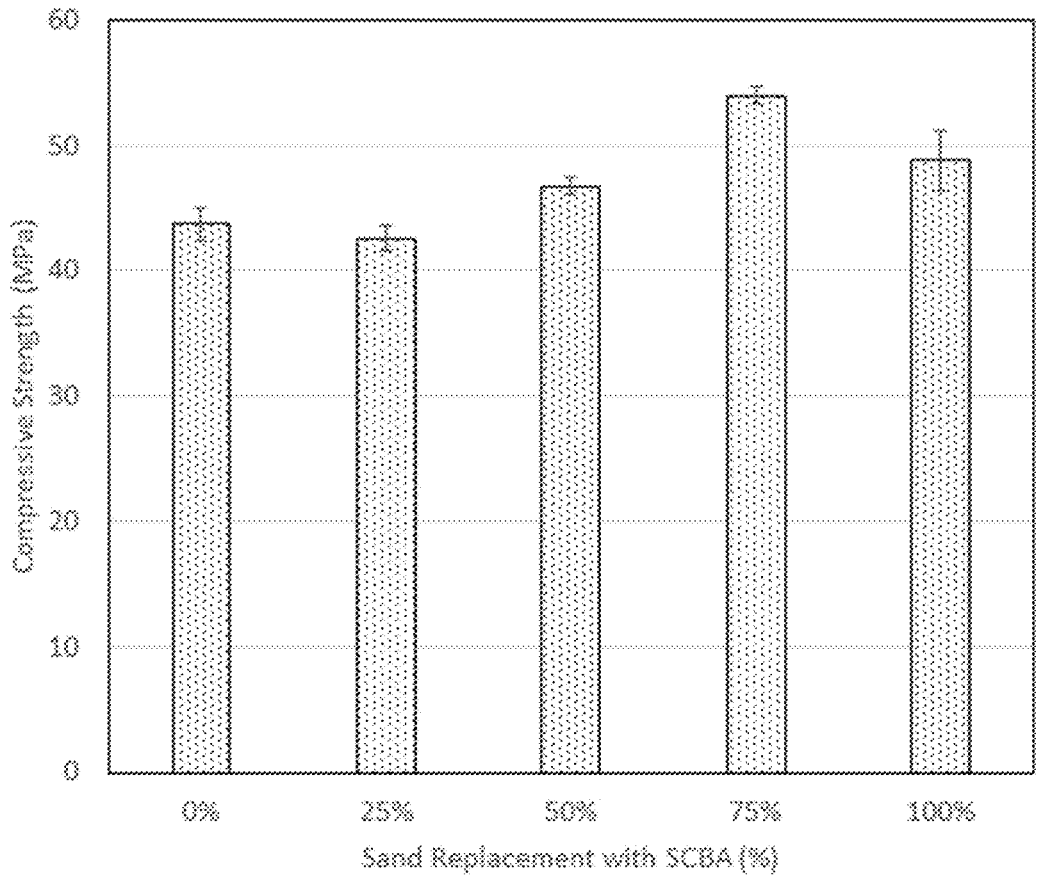
Figure 5A:
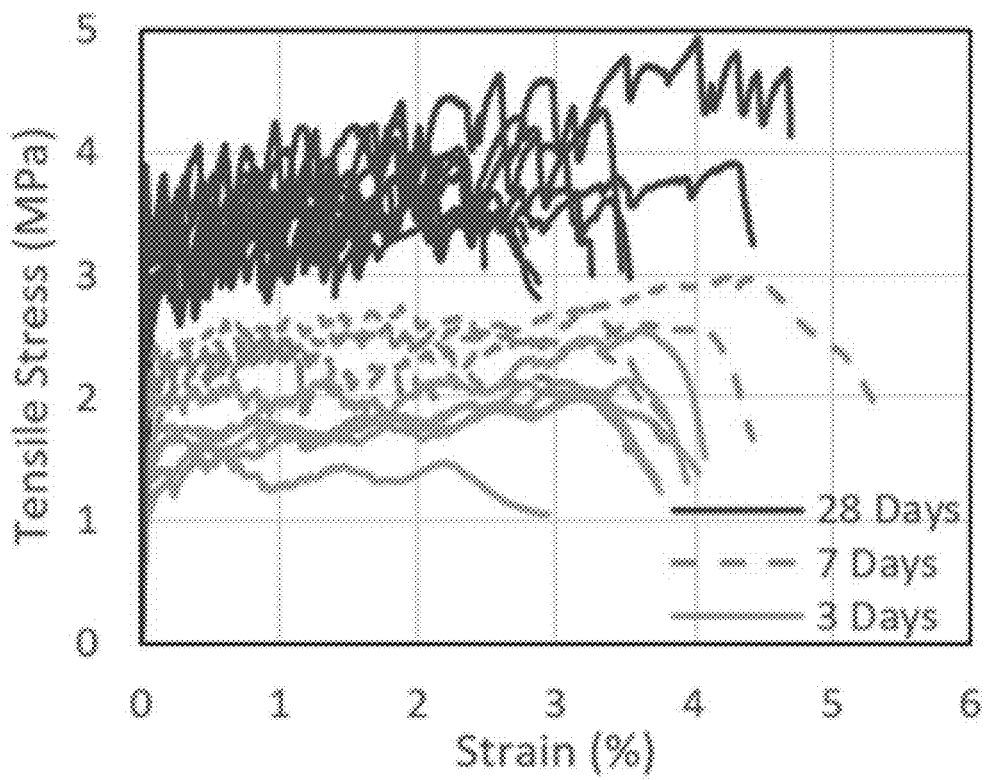
FIGS. 5A-D show the mechanical properties of M3-1.5% cost-effective ECC material of the present disclosure after 3, 7 and 28 days of curing.
Figure 5B:
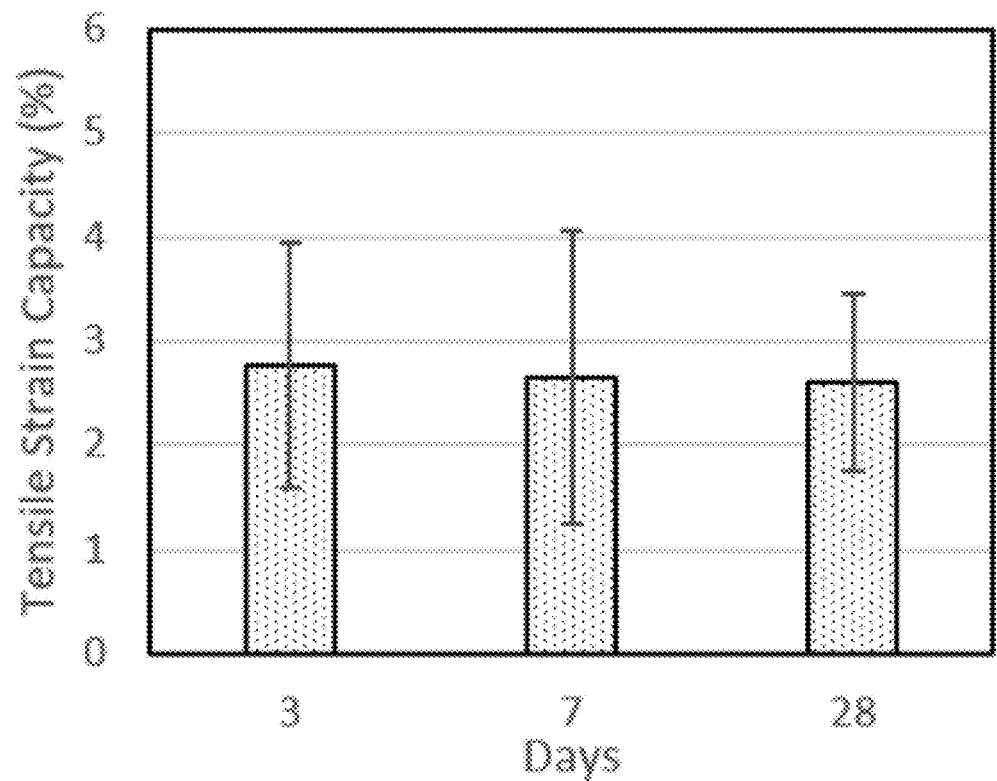
Figure 5C:
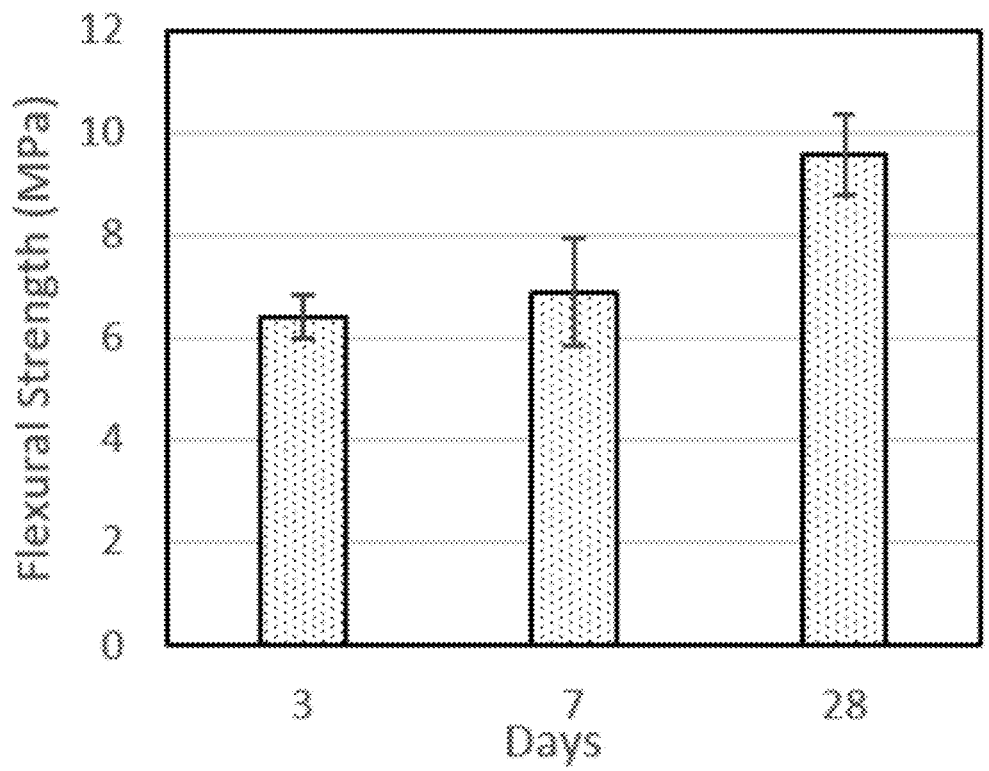
Figure 5D:
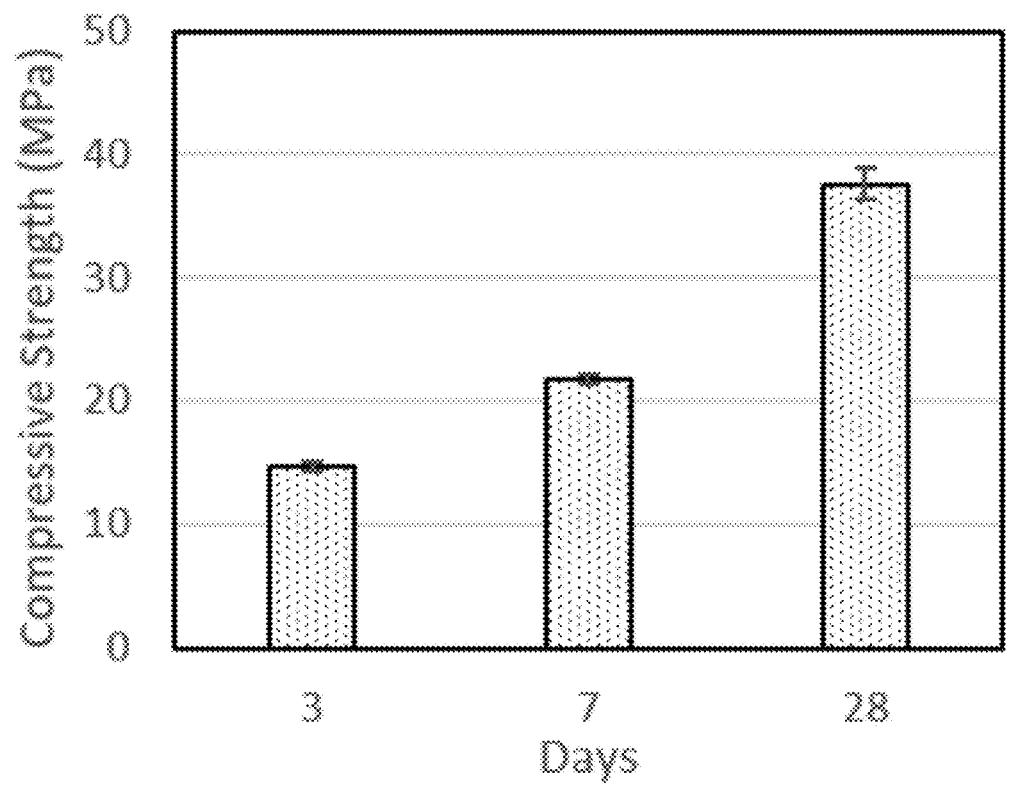
Figure 7A:
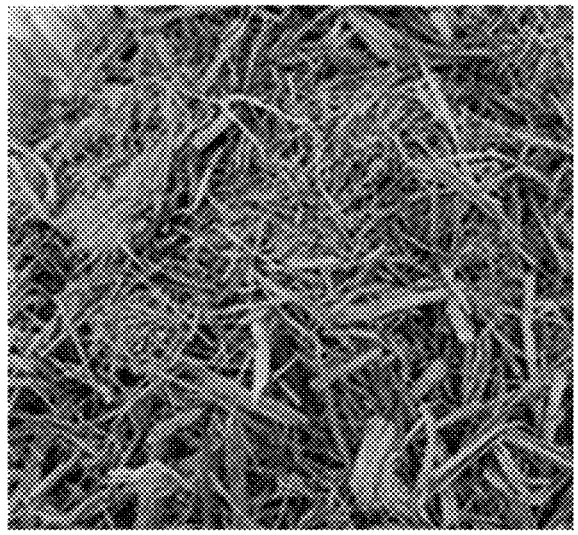
FIGS. 7A-7D show SCBA Materials in accordance with embodiments of the present disclosure.
Figure 7B:
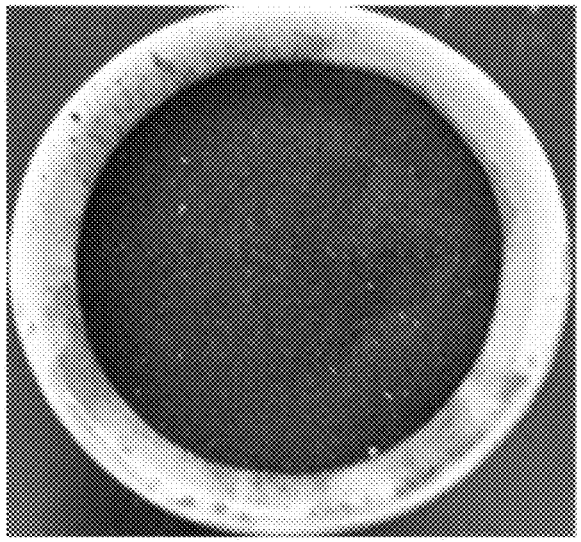
Figure 7C:
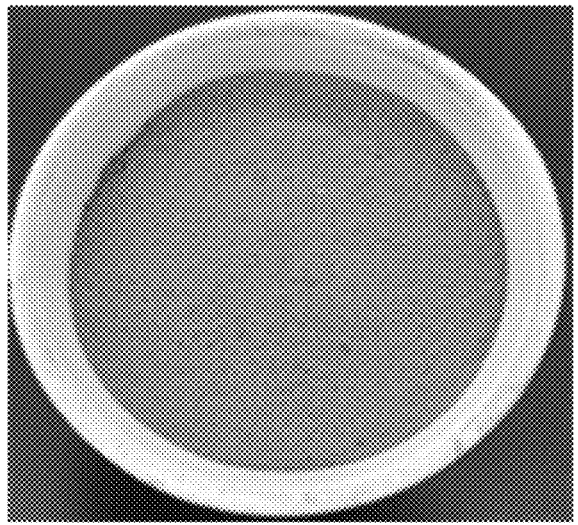
Figure 7D:
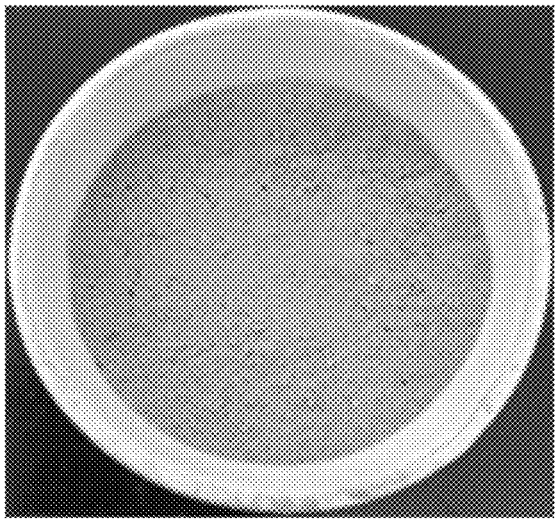

As shown in FIGS. 3A, 3B and 3C, all SCBA-ECC materials evaluated outperformed regular ECC in terms of tensile strength, tensile ductility and compressive strength (excepting the compressive strength of M2-1.75%-SCBA-25 which underperformed that of regular ECC by 2.5%). Particularly, at 50% sand replacement with SCBA, SCBA-ECC exhibited outstanding enhancements in tensile ductility (i.e., tensile strain capacity) and tensile strength compared to regular ECC. FIG. 4A presents the tensile stress vs. strain curves of three regular ECC and three M2-1.75%-SCBA-50 specimens showcasing the increase in tensile strength and tensile ductility. Furthermore, FIGS. 4B and 4C present a M2-1.75%-SCBA-50 tensile specimen after testing exhibiting multiple thigh cracks as expected from a robust PSH behavior in ECC materials.

The increments in tensile ductility of SCBA-ECC compared to regular ECC are mainly attributed to the smaller particle size SCBA compared to typically utilized fine silica sand in the state of Louisiana. The utilization of sand with smaller particle size reduces $J_{tip}$. Consequently, this allows for an increment in the energy PSH indicator ($J'_b/J_{tip}$); thus, generating the enhancement in tensile ductility. In addition, the tensile and compressive strength increase is attributed to the reactivity of SCBA. When replacing a non-reactive material such as silica sand with a pozzolanic component such as SCBA, it is likely that its reactivity provides with additional strength to the cementitious matrix and a stronger fiber/matrix interface.

Example 1 References

[1] S. Mindess, F. J. Young, and D. Darwin, Concrete, 2nd ed. Prentice Hall, 2003.
[2] E. Yang, "Designing Added Functions in Engineered Cementitious Composites," p. 276, 2008.
[3] G. Fischer and V. C. U, "Effect of fiber reinforcement on the response of structural members," Eng. Fract. Mech., vol. 74, no. 1-2, pp. 258-272, 2007.
[4] V. C. Li, "Engineered Cementitious Composites (ECC)—Material, Structural, and Durability Performance," Concr. Constr. Eng. Handb., p. 78, 2008.
[5] M. L. and V. C. Li, "Influence of Material Ductility on Performance of Concrete Repair," Ad Mater. J., pp. 419-428, 2009.
[6] M. Şahmaran and V. C. U, "Suppressing Akali-Silica Expansion," Concr. Int., pp. 47-52, 2016.
[7] H. Liu, Q. Zhang, V. Li, H. Su, and C. Gu, "Durability study on engineered cementitious composites (ECC) under sulfate and chloride environment," Constr. Build. Mater., vol. 133, pp. 171-181, 2017.
[8] Y. Yang, M. D. Lepech, E. H. Yang, and V. C. Li, "Autogenous healing of engineered cementitious composites under wet-dry cycles," Cem. Concr. Res., vol. 39, no. 5, pp. 382-390, 2009.
[9] M. Şahmaran, G. Yildirim, R. Noori, E. Ozbay, and M. Lachemi, "Repeatability and Pervasiveness of Self-Healing in Engineered Cementitious Composites," ACI Mater. J., vol. 112, no. 4, pp. 513-522, 2015.
[10] V. C. Li, "On engineered cementitious composites (ECC). A review of the material and its applications," J. Adv. Concr. Technol., vol. 1, no. 3, pp. 215-230, 2003.
[11] S. Qian, M. D. Lepech, Y. Y. Kim, and V. C. U, "Introduction of transition zone design for bridge deck link slabs using ductile concrete," ACI Struct. J., vol. 106, no. 1, pp. 96-105, 2009.
[12] American Sugar Cane League, "Industry Info." [Online]. Available: http://www.amscl.org/industry-info.
[13] American Sugar Cane League, "Louisiana Sugarcane Industry Production Data 1975 to 2016." Thibodaux, La., 2017.
[14] R. D. Perlack and B. J. Stokes (Leads), "Biomass Supply for a Bioenergy and Bioproducts Industry:," 2011.
[15] K. Ganesan, K. Rajagopal, and K. Thangavel, "Evaluation of bagasse ash as supplementary cementitious material." Cem. Concr. Compos., vol. 29, no. 6, pp. 515-524, 2007.
[16] J. Payá, J. Monzó, M. V. Borrachero, L. Díaz-Pinzón, and L. M. Ordónez, "Sugar-cane bagasse ash (SCBA): Studies on its properties for reusing in concrete production," J. Chem. Technol. Biotechnol., vol. 77, no. 3, pp. 321-325, 2002.
[17] G. C. Cordeiro, R. D. Toledo Fiho, L. M. Tavares, and E. M. R. Fairbairn, "Pozzolanic activity and filler effect of sugar cane bagasse ash in Portland cement and lime mortars," Cem. Concr. Compos., vol. 30, no. 5, pp. 410-418, 2008.
[18] G. C. Cordeiro, R. D. Toledo Fiho, and E. M. R. Fairbairn, "Effect of calcination temperature on the pozzolanic activity of sugar cane bagasse ash." Constr. Build. Mater., vol. 23, no. 10, pp. 3301-3303, 2009.
[19] G. C. Cordeiro, R. D. Toledo Filho, L. M. Tavares, and E. de M. R. Fairbairn, "Ultrafine grinding of sugar cane bagasse ash for application as pozzolanic admixture in concrete," Cem. Concr. Res., vol. 39, no. 2, pp. 110-115, 2009.
[20] S. Subedi, G. Arce, M. Hassan, N. Kumar, M. Barbato, and M. T. Gutierrez-Wing, "Influence of Production Methodology on the Pozzolanic Activity of Sugarcane Bagasse Ash," in 2019 Tran-SET Conference.
[21] H. Ma, S. Qian, Z. Zhang, Z. Lin, and V. C. Li, "Tailoring Engineered Cementitious Composites with local ingredients," Constr. Build. Mater., vol. 101, pp. 584-595, 2015.
[22] D. B. Marshall and B. N. Cox, "A J-integral method for calculating steady-state matrix cracking stresses in composites," Mech. Mater., vol. 7, no. 2, pp. 127-133, 1988.
[23] V. C. Li, C. Wu, S. Wang, A. Ogawa, and T. Saito, "Interface tailoring for strain-hardening polyvinyl alcohol-engineered cementitious composite (PVA-ECC)," ACI Mater. J., vol. 99, no. 5, pp. 463-472, 2002.
[24] Z. Pan, C. Wu, J. Liu, W. Wang, and J. Liu, "Study on mechanical properties of cost-effective polyvinyl alcohol engineered cementitious composites (PVA-ECC)," Constr. Build. Mater., vol. 78, pp. 397-404, 2015.
[25] Tetsushi Kanda and V. C. Li, "Practical Design Criteria for Saturated Pseudo Strain Hardening Behavior in ECC-2006.pdf," J. Adv. Concr. Technol., vol. 4, no. 1, pp. 59-72, 2006.
[26] T. Kanda and V. C. Li, "New Micromechanics Design Theory for Pseudo Strain Hardening Cementitious Composites," J. Eng. Mech., vol. 125, no. 4, pp. 373-381, 1999.
[27] G. Arce, T. Rupnow, and M. Hassan, "Evaluation of the Performance and Cost-Effectiveness of Engineered Cementitious Composites (ECC) Produced from Region 6 Local Materials," 2018.

Example 2

As previously mentioned, FRC has shown quasibrittle post-peak tension softening behavior that results in low tensile strain capacity (1). Studies have been conducted to transform the quasibrittle behavior of FRC to a ductile strain-hardening behavior similar to that of steel. Different approaches have been proposed resulting in a modern class of cement-based materials known as High-Performance Fiber Reinforced Cementitious Composites (HPFRCC). HPFRCC are characterized by tensile strain-hardening behavior after initiation of the first crack and with a strain capacity as much as several hundred times that of FRC (2). According to Naaman and Reinhardt, HPFRCC is characterized by an ultimate strength higher than the first cracking strength of the composite (controlled by the cementitious matrix fracture toughness) and formation of multiple cracking throughout the inelastic deformation system (2). While the apparent strain in FRC depends on the gauge length, the deformation of HPFRCC is considered a pseudo-strain, which is uniform and independent of the gauge length at a macro-scale level (3). The word "pseudo strain-hardening" and sometimes referred to as "pseudo ductility" is utilized to differentiate between strain-hardening behavior in metals and the behavior of crack-based deformation in HPFRCC because of dislocation micromechanics (4).

An emerging class of micromechanically-designed HPFRCC is known as engineered cementitious composites (ECC) or bendable concrete, which are designed with a lower volume fraction of short fiber (5). The strain hardening behavior of ECCs is accompanied by a high strain capacity of 1 to 5% in tension (6). It should be noted that the strain hardening behavior of ECC is mainly controlled by the formation of multiple cracks as tensile stress increases in the concrete (7). The unique feature of ECC addresses concrete limitations such as limited deformation capacity, low tensile strength, and the failure through macro-cracking of regular concrete (8).

Li et al. evaluated the performance of steel-reinforced ECC (R/ECC). It was observed that R/ECC possesses a higher load carrying capacity than typical steel reinforced concrete due to the increased tensile strength and strain-hardening behavior of ECC (9). Furthermore, Increased shear capacity (limited by the tensile strength of the material) of R/ECC with potential for shear reinforcement reduction or even removal was reported (10). The improved ductility and structural damage tolerance of R/ECC due to enhanced deformation compatibility between ECC and steel are among other benefits of ECC utilization (11). Moreover, ECC has also shown great durability potential (7). Several studies have concluded that ECC remains durable and preserves its mechanical performance against major types of concrete deterioration including sulfate attack, alkali-silica reaction, corrosion, and freeze-thaw (7,12). The enhancement is attributed to the superior ductility of ECC and tight crack width. In addition, selfhealing properties of crack-damaged ECC have been reported due to its tight crack width, which allows for autogenous healing mechanisms of cementitious materials to be effective and result in the recovery of mechanical and transport properties, further enhancing the durability of ECC (13). To this end, ECC has been successfully applied in the field for repairing concrete structures, in bridge deck patches, and in bridge deck link slabs (7, 11). However, ECCs high initial cost has prevented wide-scale implementation of this new class of construction materials. ECC typically utilizes 2% volume fraction of oil-coated polyvinyl alcohol (PVA) fiber (expensive and not readily available in the US), microsilica sand (expensive and not widely available), and high contents of cement (expensive), which greatly increase its cost compared to regular concrete.

Embodiments of the present disclosure provide cost-effective Engineered Cementitious Composites (ECC), which can include the following components: cement, fly ash, fine silica sand (such as from the Mississippi river), water, water reducer admixture, and non-oil-coated PVA fiber. The formulations provide for the production of cost effective ECC materials by: 1) Utilizing readily available non-oil-coated PVA fiber instead of oil-coated PVA fiber typically utilized to manufacture ECC (which is expensive and not readily available in the US market); 2) Utilizing low fiber content (1.5% volume fraction instead of the typically utilized 2% volume fraction); 3) Replacing expensive and hard to obtain microsilica sand with readily available fine silica sand (e.g. from the Mississippi river); 4) Replacing more than 65% of cement with fly ash (by weight).

Mixture proportions can be optimized to provide cost-effectiveness and exceptional mechanical properties. FIGS. 5A-D presents the mechanical properties of the cost-effective ECC material labeled as M3-1.5% (shown in Table 1.2). As can be seen in FIGS. 5A-D, after the standard curing time of 28 days, M3-1.5% ECC exhibits exceptional tensile ductility of 2.6% strain (260 times that of regular concrete), a flexural strength of 9.6 MPa (more than two times that of regular concrete) and a compressive strength of 37.6 MPa (approximately 25% stronger than regular concrete).

TABLE 1.2

| | M3-1.5% components | | | | | | | | |
|---|---|---|---|---|---|---|---|---|---|
| | Proportions by Weight | | | | | | | | |
| Mix ID | Cement | Fly Ash | Water | Sand | HRWR (%)[1] | W/B | S/B | FA/C | FA (%)[2] | Fibers (Vol. %) |
| M3-1.5% | 1 | 3.0 | 1.9 | 1.45 | 0.13 | 0.27 | 0.36 | 3.0 | 75 | 1.50 |

[1]% HRWR dosage by weight of cement
[2]% To of cement replacement with fly ash by weight In contrast to traditional concrete, ECC materials such as the Cost-Effective ECC described herein can undergo substantial amounts of deformation without breaking (ECCs have 100 to 500 times the deformation capacity of regular concrete in tension) through a controlled process of multiple micro-cracking called "pseudo strain-hardening." Furthermore, ECC materials typically exhibit 2 to 3 times the flexural strength of regular concrete and higher compressive strength. Because of their unique properties, ECCs are promising for repair and construction of transportation infrastructure (pavements and overlays). For instance, the exceptional ductility of ECC has the potential prevent fracture of concrete pavements and eliminate the need for joints (reducing repair and construction costs). Moreover, ECC pavements could potentially be constructed at half the thickness of typical concrete pavements while exhibiting equal or better performance.

While the implementation of ECC in transportation infrastructure is highly promising, ECC materials could also be implemented in the repair of all kinds of civil infrastructure. Because of its superior ductility ECC materials can absorb interface incompatibilities between the ECC/concrete repaired systems preventing delamination (which is the most common failure mode of concrete repairs).

The possibilities of commercial application of the cost-effective ECC materials of the present disclosure, are vast. In addition, the implementation of these materials has the potential to produce a positive social and economic impact by providing the public with more durable and reliable infrastructure.

Example 2 References

1. Mai, Y. W. *Fracture Mechanics of Cementitious Materials*. Taylor & Francis, 1995.
2. Naaman, A. E. Characterization of high performance fiber reinforced cement composites-HPFRCC. 1996.
3. Yang, E. *Designing Added Functions in Engineered Cementitious Composites*. 2008.
4. LI, V. C., and H. C. Wu. Pseudo Strain Hardening Design in Cementitous Composites.
5. Li, V. C. Engineered Cementitious Composites (Ecc)—Tailored Composites through Micromechanical Modeling. *Canadian Society for Civil Engineering*, 1998, pp. 1-38.
6. Li, M. L. and V. C. Influence of Material Ductility on Performance of Concrete Repair-2009.pdf. *Aci Materials Journal*, No. September-October, 2009, pp. 419-428.
7. Li, V. C. Engineered Cementitious Composites (ECC)—Material. Structural, and Durability Performance. *Concrete Construction Engineering Handbook*, 2008, p. 78.
8. Li, V. C., Wang, S. and Wu, C. Tensile strain-hardening behaviour of Polyvinyl Alcohol Engineered Cementitious Composites (PVA-ECC). *ACI Materials Journal*. No. 98, 2001. pp. 483-492.
9. Li, V. C., and G. Fischer. 30 INTERACTION BETWEEN STEEL REINFORCEMENT AND ENGINEERED CEMENTITIOUS COMPOSITES. No. 3, 1999, pp. 361.
10. Kanda, T., Z. L., and V. C. Li. Application of pseudo strain-hardening cementitious composites to shear resistant structural elements. *Fracture Mechanics of Concrete Structure*, Vol. Proceeding, 1998, pp. 1477-1490.
11. U, V. C. On engineered cementitious composites (ECC). A review of the material and its applications. *Journal of Advanced Concrete Technology*, Vol. 1, No. 3, 2003, pp. 215-230.
12. Liu, H., Q. Zhang, V. Li, H. Su, and C. Gu. Durability study on engineered cementitious composites (ECC) under sulfate and chloride environment. *Construction and Building Materials*, Vol. 133, 2017, pp. 171-181.
13. Kan, L.-L., L.-L. Kan, H.-S. Shi, A. R. Sakulich, and V. C. Li. Self-Healing Characterization of Engineered Cementitious Composite Materials. *ACI materials journal*. Vol. 107, No. 6, 2010, p. 617.

Example 3

In various embodiments according to embodiments of the present disclosure, at least three types of SCBA can be utilized.

1) Raw SCBA (for sand replacement): Raw SCBA is bagasse ash directly collected from the sugar mill which is produced from the uncontrolled burning of sugarcane bagasse fiber (SBF) in a sugar factory. Raw SCBA is minimally processed by drying and sieving to remove coarse impurities (i.e., unburnt fibers, gravel, etc.). Raw SCBA may also be grinded to further reduce particle size. Raw SCBA exhibits high carbon content (i.e., 10 to 60% by weight) which can act as micro-defects in the cementitious matrix of ECC reducing the crack tip matrix toughness ($J_{tip}$); thus, enhancing the ductility of the composite. Furthermore, raw SCBA exhibit a calcium oxide (CaO) content of about 1 to 15%, a silica ($SiO_2$) content of 10 to 60%, an aluminum oxide ($A_2O_3$) content of 1 to 15%, and an iron oxide ($FeO_3$) content of 1 to 15%. Raw SCBA can exhibit a mean particle size ranging from about 10 to 300 μm (depending on grinding treatment, if any). The small particle size of raw SCBA help to reduce j and enhance the ductility of the cementitious composite. Raw SCBA pozzolanic activity as measured by the Strength Activity Index (SAI) can range from about 30 to 100%.

2) Controlled SCBA (for sand and/or cement replacement): Controlled SCBA is bagasse ash produced by the controlled burning of SBF. The SBF collected from the sugar mill is washed with water to remove impurities and then allowed to air dry. The dry SBF is burned at temperatures ranging from about 350° C. to 800° C. for about 1 to 10 hours. Subsequently, the controlled SCBA may be grinded to further reduce its particle size. Controlled SCBA exhibits low carbon content (i.e., <10% by weight). Furthermore, controlled SCBA exhibits a calcium oxide (CaO) content of 1 to 30%, a silica ($SiO_2$) content of 40 to 90%, an aluminum oxide ($Al_2O_3$) content of 1 to 30%, and an iron oxide ($FeO_3$) content of 1 to 30%. Controlled SCBA can exhibit a mean particle size ranging from about 10 to 100 μm (depending on grinding treatment, if any). The small particle size of controlled SCBA help to reduce $J_{tip}$ and enhance the ductility of the cementitious composite. Controlled SCBA exhibits high pozzolanic activity as measured by the Strength Activity Index (SA). The SAI of controlled SCBA can range from about 65 to 130%. [0106] 3) Post-Processed SCBA (for sand and/or cement replacement): The material labeled as post-processed SCBA is bagasse ash obtained by the post-processing of raw SCBA. Raw SCBA is further processed by burning (at temperatures ranging from 350° C. to 800° C. for 1 to 10 hour) and grinding. Post-processed SCBA exhibits low carbon content (i.e., <10% by weight). Furthermore, post-processed SCBA exhibit a calcium oxide (CaO) content of 1 to 30%, a silica ($SiO_2$) content of 40 to 90%, an aluminum oxide ($Al_2O_3$) content of 1 to 30%, and an iron oxide ($FeO_3$) content of 1 to 30%. Post-processed SCBA can exhibit a mean particle size ranging from 10 to 100 μm (depending on grinding treatment, if any). The small particle size of post-processed SCBA help to reduce $J_{tip}$ and enhance the ductility of the cementitious composite. Post-processed SCBA exhibits high pozzolanic activity as measured by the Strength Activity Index (SAI). The SAI of post-processed SCBA can range from 65 to 130%.

Example 4

The study in this example investigated the effects of sugarcane bagasse ash (SCBA) utilization as a partial or complete replacement of sand in Engineered Cementitious Composites (ECC). ECC mixtures with five different replacement levels of sand with SCBA were produced (i.e., 0%, 25%, 50%, 75%, and 100% by volume). The SCBA utilized in this study was comprehensively characterized. Furthermore, the fresh and hardened properties of the produced ECC mixtures were thoroughly evaluated. The characterization of SCBA revealed that SCBA consisted mainly of small (i.e., 256 μm average particle size) porous and irregularly shaped particles with carbon and silica as its main constituents. In terms of ECC fresh properties, the incorporation of SCBA produced an important loss in workability which was mitigated with high dosages of HRWR; yet, as a consequence air content substantially increased. In the case of hardened material properties, the incorporation of SCBA as sand replacement produced a slight decrease (up to 11%) on the compressive strength of ECCs. However, the tensile strength and especially the tensile ductility of the composites were substantially enhanced (up to 22.3% and 311%, respectively). The tensile strength improvements were attributed to the pozzolanic and/or filler effect of SCBA which likely enhanced the microstructure of the ECC cementitious matrix; thus, increasing the fiber/matrix frictional bond ($\tau_0$). On the other hand, enhancements in the tensile ductility were associated to the combined effect of the reduction of $J_{tip}$ (credited to the decrease in aggregate particle size and the increase in air content) and the increase in $J_b'$ (attributed to the potential decrease in the fiber/matrix chemical bond ($G_d$) and an enhanced fiber dispersion). The surface resistivity of ECC materials was negatively affected by the addition of SCBA. Furthermore, the drying shrinkage of all SCBA-ECC materials was higher than that of control at all ages of curing (excepting M-25 at 28 days of curing).

Materials

The materials utilized in the production of ECC mixtures were Ordinary Portland Cement (OPC) Type I (specific gravity of 3.15), class F fly ash (specific gravity of 2.29), silica sand, i.e., fine river sand (specific gravity of 2.62) with a mean particle size of 421 µm and a maximum nominal particle size of 995 µm, water, high-range water reducing admixture (HRWR), and Polyvinyl Alcohol (PVA) fibers. The PVA fibers utilized were non-oil coated RECS-15 fibers provided by NYCON, US. The RECS-15 fibers have a diameter of 38 µm, a length of 8 mm, a tensile strength of 1600 MPa, Young's modulus of 40 GPa, a maximum elongation of 6% and a specific gravity of 1.3. Furthermore, the chemical composition of cement and fly ash obtained from XRF analysis is presented in Table 4.1. To produce SCBA-ECC mixtures, raw SCBA was utilized as sand replacement. The details on the raw SCBA material are presented in the following section.

TABLE 4.1

Oxide Composition of Cement and Fly Ash

| Oxide | CaO | $SiO_2$ | $Al_2O_3$ | $Fe_2O_3$ | $K_2O$ | $Na_2O$ | MgO | $SO_3$ | $CO_2$ |
|---|---|---|---|---|---|---|---|---|---|
| Cement (%) | 63.77 | 19.6 | 4.55 | 3.00 | 0.37 | 0.00 | 2.27 | 3.43 | — |
| Fly Ash (%) | 7.97 | 57.94 | 20.03 | 3.67 | 1.24 | 2.14 | 2.02 | 0.49 | — |

Raw SCBA

SCBA utilized in this study was collected from Alma Plantation in Lakeland, La. For the production of raw SCBA, the collected SCBA was initially dried at 65° C. for 10-12 hours to remove moisture and subsequently sieved using a No. 20 sieve (i.e., 841 µm opening sieve) to remove coarse impurities (i.e., large unburnt fibers, gravel, etc.). The specific gravity of the processed raw SCBA was 2.24.

Raw SCBA produced in this study was thoroughly characterized by SEM-EDS, X-Ray Diffraction (XRD), and Laser Diffraction Particle Size Analysis. Moreover, since SCBAs can exhibit substantial pozzolanic activity depending on the level of processing, the pozzolanic activity of raw SCBA was evaluated by the Strength Activity Index (SAI) method according to ASTM C311 (ASTM C311/C311M 2013).

ECC Preparation

To investigate the influence of sand replacement with raw SCBA on the properties of ECC, a total of five ECC mixtures were prepared. ECC mixtures were designated as M-X, where X is the % replacement of sand with raw SCBA by volume. The dosages of sand replacement investigated were 0%, 25%, 50%, 75%, and 100% by volume. In this study, the reference mixture M-0 utilized similar proportions as those of ECC mixture design M-2.2% from Noorvand et al. (Noorvand et al. 2019); however, the W/B content was increased from 0.27 to 0.32 to enhance workability and the fiber content was reduced from 1.75 to 1.5% to produce more cost-effective composites. The fly ash-to-cement ratio (F/C), water-to-binder ratio (W/B), and the fiber content of the M-0 ECC mixture were 2.2 (by weight), 0.32 (by weight), and 1.5% (volume fraction), respectively. For comparative purposes, the F/C, W/B, and fiber content were kept constant for all ECC materials evaluated in this study. The details of the ECC mixture proportions are illustrated in Table 4.2.

TABLE 4.2

ECC Mixture Proportions

| Mix ID | Cement (kg/m$^3$) | Fly Ash (kg/m$^3$) | Water (kg/m$^3$) | Sand (kg/m$^3$) | Raw SCBA (kg/m$^3$) | Raw SCBA (%)[a] | HRWR (%)[b] | $V_f$ (%)[c] |
|---|---|---|---|---|---|---|---|---|
| M-0 | 358.9 | 789.5 | 367.5 | 416.2 | 0 | 0 | 0 | 1.5 |
| M-25 | 358.9 | 789.5 | 367.5 | 312.2 | 92.2 | 25 | 0.13 | 1.5 |
| M-50 | 358.9 | 789.5 | 367.5 | 208.1 | 184.3 | 50 | 0.45 | 1.5 |
| M-75 | 358.9 | 789.5 | 367.5 | 104.1 | 276.4 | 75 | 0.80 | 1.5 |
| M-100 | 358.9 | 789.5 | 367.5 | 0 | 368.6 | 100 | 1.5 | 1.5 |

[a]% of sand replacement by volume;
[b]% of HRWR by weight of cement;
[c]% of fiber content by volume In this study, all ECC mixtures were prepared using a planetary mixer. Initially, powder components (cement, fly ash, sand, and raw SCBA) were dry mixed for three minutes at low speed. Next, water and HRWR were added and mixed for another three minutes at low speed. Subsequently, a modified marsh funnel test proposed by Li and Li was utilized to assess the rheology of the mix (Li 2013). Then, PVA fibers were introduced to the wet mix in two minutes while mixing at a slow speed. Finally, the material was mixed vigorously at high speed for another five minutes. After completion of the mixing process, the air content, and unit weight of the ECC materials were assessed according to ASTM C138 (ASTM C138/C138M 2017). Subsequently, three cylindrical, ten dog-bone shape (6 for uniaxial tensile test and 4 for a single crack tensile test), and four prisms specimens (for drying shrinkage analysis) were casted for each mixture design. All the cylindrical and dog-bone shape specimens were covered with plastic and left in the mixing room (specimens were covered to prevent loss of moisture) for 24 hours prior to demolding. On the other hand, before demolding, the prisms specimens were placed in a moist room for 23±0.5 hours according to ASTM C157. Finally, all specimens were placed in a lime saturated water tank according to ASTM C192 (ASTM C192/C192M 2016) and allowed to cure.

Experimental Tests

Compressive Strength

The compressive strength of the ECC mixtures was assessed according to ASTM C39 on 101.6×203.2 mm (4×8 in.) cylindrical specimens (ASTM C39/C39M 2009). For each mixture, three specimens were tested at 28 days of curing by means of hydraulic pressure with a constant loading rate of 0.25 MPa/s.

Uniaxial Tensile Test

Figure 8A:
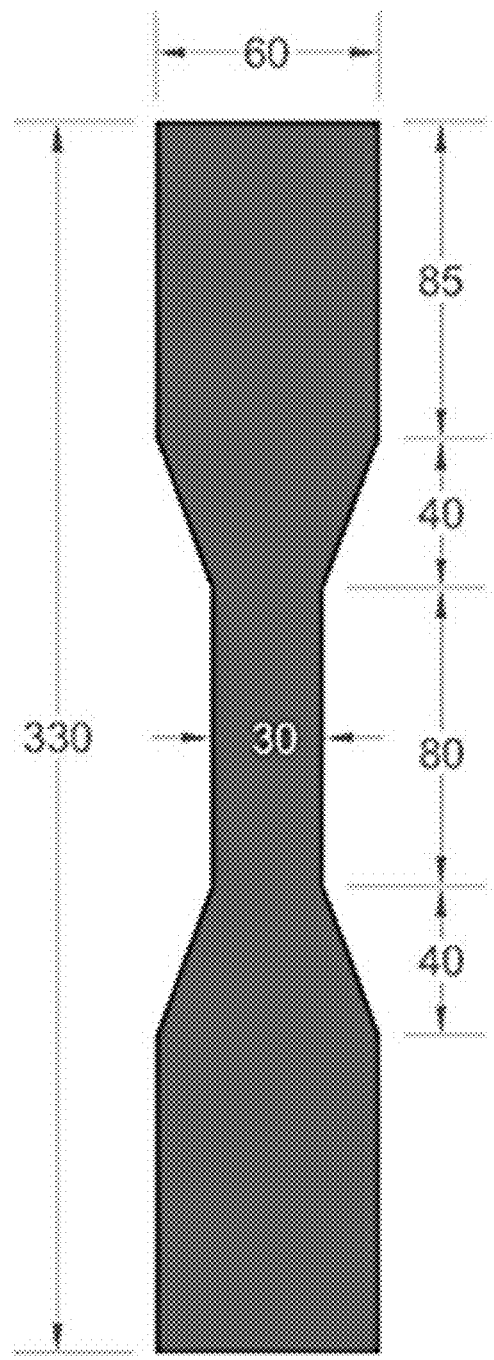
FIG. 8A provides a schematic of one example of a "dog-bone" shaped specimen used as a test for SCBA-ECC materials of embodiments of the present disclosure.
Figure 8B:
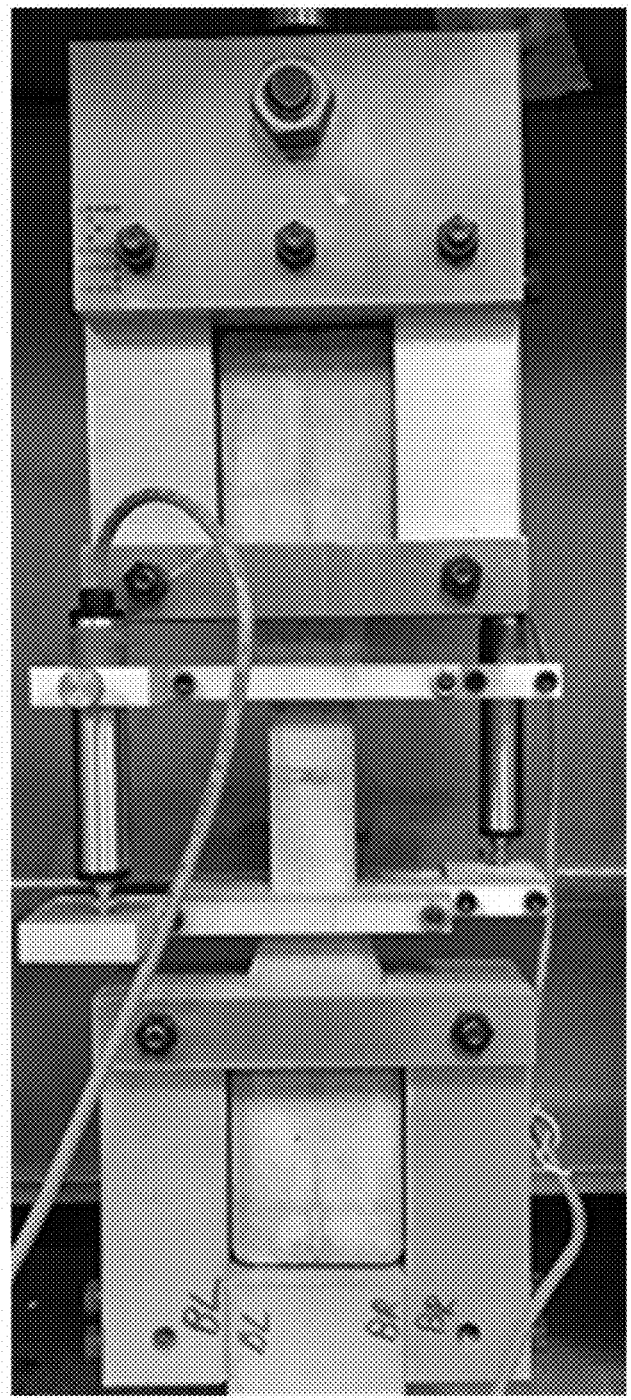
FIG. 8B is a camera image of an example of uniaxial tensile test setup as described in the examples.

The tensile properties of ECC mixtures were investigated by uniaxial tensile tests per recommendations of the Japan Society of Civil Engineers (JSCE) on a uniaxial tensile test of HPFRCCs (Japan Society of Civil Engineers. 2008). Six dog-bone shaped specimens, measuring 330 mm in length, 60 mm in width, and 13 mm in thickness, were evaluated at 28 days of curing. The geometrical details of the dog-bone shaped specimen are presented in FIG. 8A. The uniaxial tensile test was conducted by applying a displacement controlled the axial load (at a constant rate of 0.5 mm/min) utilizing a 250 kN capacity servo-hydraulic machine. Furthermore, to evaluate the material deformation, two LVDTs were attached at each side of the specimen (as shown in FIG. 8B). The gage length utilized was 80 mm.

Single-Crack Tension Test (SCTTT)

Figure 9A:
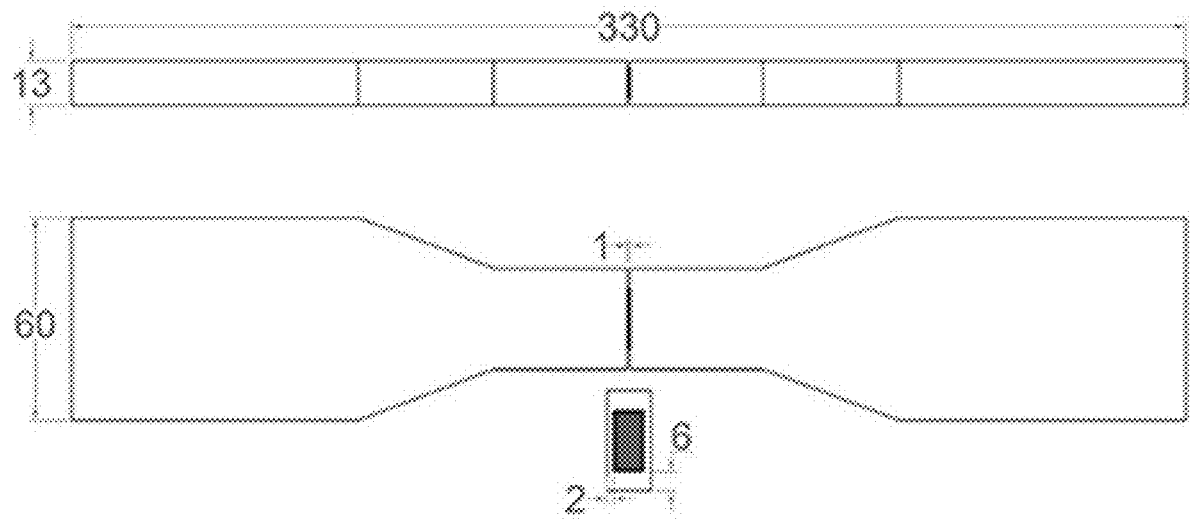
FIG. 9A provides a schematic of one example of a notched "dog-bone" shaped specimen (dimensions in mm) used as a test for SCBA-ECC materials of embodiments of the present disclosure.
Figure 9B:
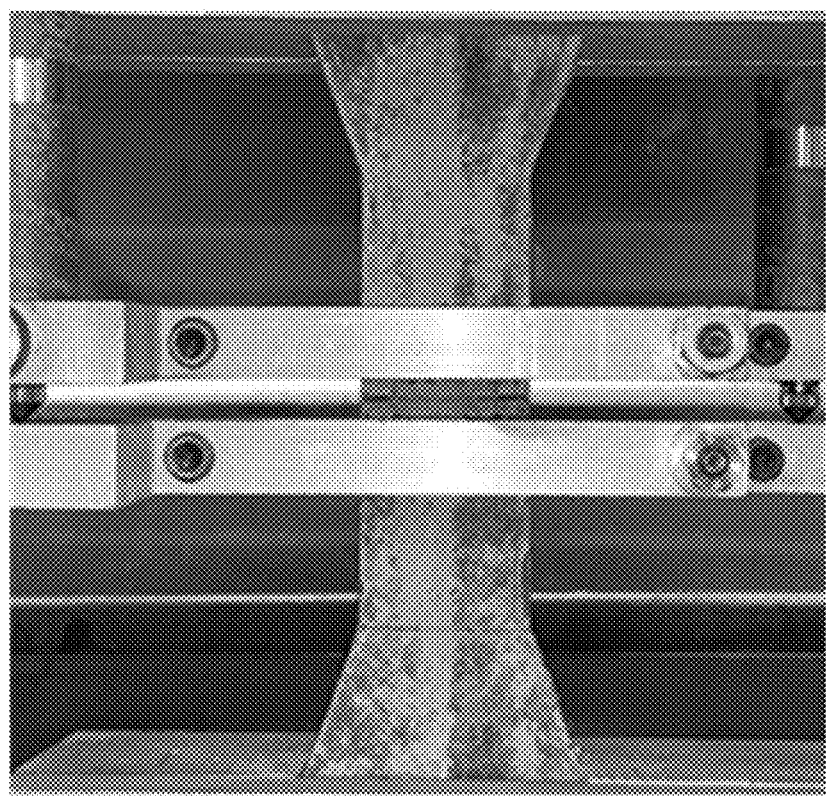
FIG. 9B is a camera image of an example of single-crack tension test setup as described in the examples.

In this study, the Single-Crack Tension Test (SCTT) was adopted to assess the effects of SCBA as sand replacement on the fiber-bridging relation ($\sigma$-$\delta$) (Pereira et al. 2012). For this test to be effective, the main prerequisite is to obtain a single crack during the entire test. Since ECC is designed to exhibit multiple cracks, dog-bone specimens are notched at its middle section around the entire specimen (as shown in FIG. 9A) in order to allow for the formation of a single crack. The notch thickness adopted in this study was 1 mm. SCTT was conducted at 28 days of curing on four specimens for each mixture design. The notched specimens were loaded at a displacement control rate of 0.5 mm/min using the same equipment utilized in the uniaxial tensile test. The crack opening ($\delta$), was assessed by attaching two LVDTs at each side of the specimen as shown in FIG. 9B. The gage length utilized in SCTT was 20 mm. This small gage length is utilized in order to minimize the contribution from the elastic deformation of the cementitious matrix on the crack opening measurements.

Surface Resistivity

To gain some insight on the durability of ECC materials, surface resistivity test was performed according to LaDOTD TR233 "Test Method for Surface Resistivity Indication of Concrete's Ability to Resist Chloride Ion Penetration" (LaDOTD 2018). The electrical resistivity of ECC samples was measured at 28 days of curing on 101.6×203.2 mm (4×8 in.) cylindrical specimen. Since this is a non-destructive test, the cylindrical specimens utilized for this test were the same utilized for compressive strength evaluation. The electrical resistivity was measured using a Proceq® Resipod surface resistivity meter (with a 1.5" probe spacing). For each specimen, 2 sets of readings were taken along the center of the longitudinal axis at 4 different locations (i.e., 0°, 90, 180°, and 270°). For each mixture design, the final resistivity value was obtained by taking the average surface resistivity of three cylindrical specimens.

Drying Shrinkage

In this study, the drying shrinkage of ECC mixtures was evaluated according to ASTM C157 (ASTM C157/157M 2016). Four prism specimens measuring 25.4×25.4×285 mm were casted for each ECC mixture design. After casting, specimens were kept in a moist room (at 23±2° C. and >95% relative humidity) for 23.5±0.5 hours. Next, specimens were demolded and immersed in a lime saturated water tank for 30 minutes. Subsequently, the initial length comparator dial reading was taken, and the prism specimens were again immersed in the lime saturated water tank. Finally, readings were taken at 7, 14, and 28 days of curing and the drying shrinkage at each specific curing age was computed utilizing equation 3.

$$\Delta L_x = \frac{CRD - \text{initial } CRD}{G} \times 100 \qquad (3)$$

where, $\Delta L_x$=Length change of any prism specimen at any given age %;

CRD=Difference between the comparator reading of the reference bar and the specimen at any given age; and G=Gage length (250-mm [10 inch]).

Results and Analysis

Raw SCBA Characterization

SEM-EDS

For the SEM-EDS analysis, a Quanta™ 3D Dual Beam™ FEG FIB-SEM with EDAX Pegasus EDS/EBSD detectors was utilized to investigate the morphology and elemental chemical composition of raw SCBA.

Figure 10A:
FIGS. 10A-10B are example images of raw SCBA.

FIG. 10A shows a non-magnified camera image of raw SCBA. FIG. 108 presents the morphology of SCBA obtained from backscattered electron (BSE) SEM imaging. From FIG. 10B, it can be observed that raw SCBA consists of a combination of particles with varied shapes and sizes (i.e., irregular porous particles, large fibrous particles, spherical particles, and prismatic particles). SCBA is produced from the uncontrolled burning (with high temperature gradients) of SBF in boilers of cogeneration plants at the sugar mill. Due to the high temperature gradients, some portions of the SBF experiences high temperatures, whereas, some portions remain partially unburned. The fibrous particles observed in the SEM images were attributed to unburned SBF. On the other hand, irregular porous particles observed were attributed to amorphous silica. Spherical and prismatic particles also observed, were attributed to crystalline silica formed due to zones of high calcination temperature (usually above 700° C.). Previous studies have reported the presence of spherical silica particles in SCBA due to melting when SBF burning temperature exceeds 600° C.-800° C. (Cordeiro et al. 2009; Govindarajan and Jayalakshmi 2011; Subedi et al. 2019). Moreover, prismatic crystalline silica has also been reported due to SCBA contamination with soil and crystallization of silica at temperatures beyond 700° C.

In order to gain insight into the chemical composition of raw SCBA, EDS analysis was conducted. EDS spectra were collected utilizing area mode with a current of 4 pA and a voltage of 20 kV. The oxide composition of raw SCBA is presented in Table 4.3. From Table 4.3, it can be observed that raw SCBA was mainly composed of $SiO_2$ and $CO_2$. $SiO_2$ content was indicative of silica content (amorphous and crystalline) while the $CO_2$ content was indicative of high carbon content due to unburnt SBF. It is important to note that raw SCBA exhibited a total pozzolanic component ($SiO_2+Al_2O_3+Fe_2O_3$) of 52.58%; thus, meeting ASTM C618 minimum pozzolanic component requirement to be classified as a Class C pozzolan (a minimum of 50% for Class C pozzolans and 70% for Class F and Class N pozzolans).

pozzolanic activity of the SCBA material due to its high silica content. To assess the reactivity of raw SCBA, the 28-day compressive strength of 50 mm control mortar cubes (prepared with a water-to-binder ratio of 0.484 and a sand-to-cement ratio of 2.75) was compared with that of SCBA admixed mortar cubes, utilizing 20% replacement of cement (by weight) with raw SCBA. Furthermore, to compare the reactivity of raw SCBA to that of non-reactive silica sand, additional specimens (designated as SA) were prepared to utilize silica sand as a 20% replacement of cement (by weight). The sand utilized for all mortar mixtures was standard graded sand conforming to ASTM C778 (ASTM C778 2017). After 28 days of curing, the compressive strength of all mortar cubes (6 replicas for each mixture) was tested according to ASTM C109 (ASTM C109/109M 2010). Furthermore, the strength activity index was calculated by using equation 4.

$$SAI = \left(\frac{A}{B}\right) * 100 \qquad (4)$$

TABLE 4.3

Oxide Composition of Raw SCBA

| Oxide | CaO | $SiO_2$ | $Al_2O_3$ | $Fe_2O_3$ | $K_2O$ | $Na_2O$ | MgO | $SO_3$ | $CO_2$ | $SiO_2 + Al_2O_3 + Fe_2O_3$ |
|---|---|---|---|---|---|---|---|---|---|---|
| SCBA (%) | 3.84 | 42.80 | 5.54 | 4.24 | 3.63 | 0.14 | 0.56 | 0.15 | 38.13 | 52.58 |

X-Ray Diffraction (XRD)

Figure 11A:
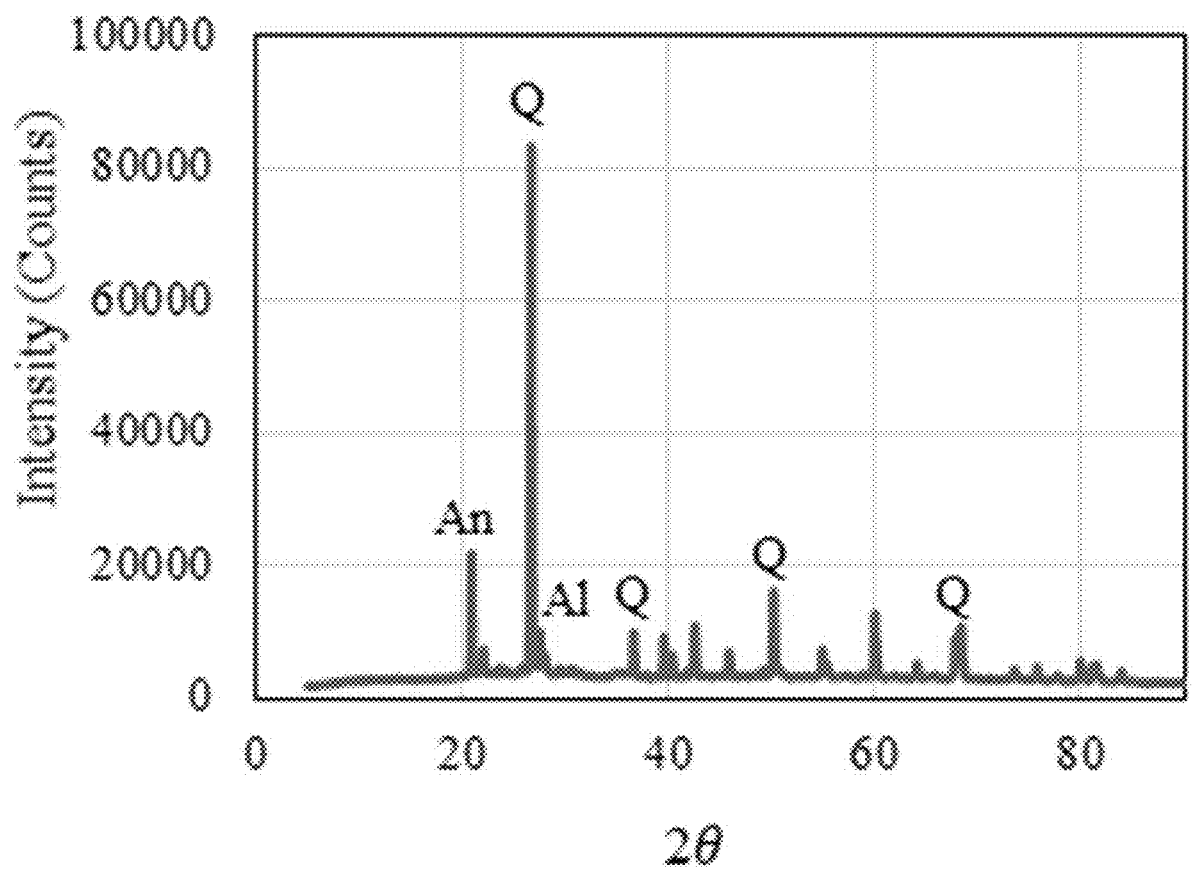
FIGS. 11A-11B are graphs showing examples of (FIG. 11A) XRD Pattern of Raw SCBA.

XRD analysis was performed by using $CuK\alpha$ radiation at 40 mA and 45 kV, with a step size of 0.026 in the range of 5° to 90 2θ. FIG. 11A presents the XRD pattern of raw SCBA. From FIG. 11A, crystalline silica in the form of quartz was evident due to the presence of quartz characteristic peaks. Furthermore, based on Rietveld analysis conducted using Highscore v4.7 software, the SCBA phases were quantified. The analysis reported the presence of 52.9% of amorphous component, 38.9% of quartz, and 5.5% of albite in raw SCBA. The quartz content of raw SCBA may be attributed to the crystallization of amorphous silica during calcination of SBF and the presence of soil adhered to the SBF during sugarcane harvest. Furthermore, the amorphous phase can be attributed to the presence of amorphous silica and unburnt SBF.

Laser Diffraction Particle Size Analysis

Figure 11B:
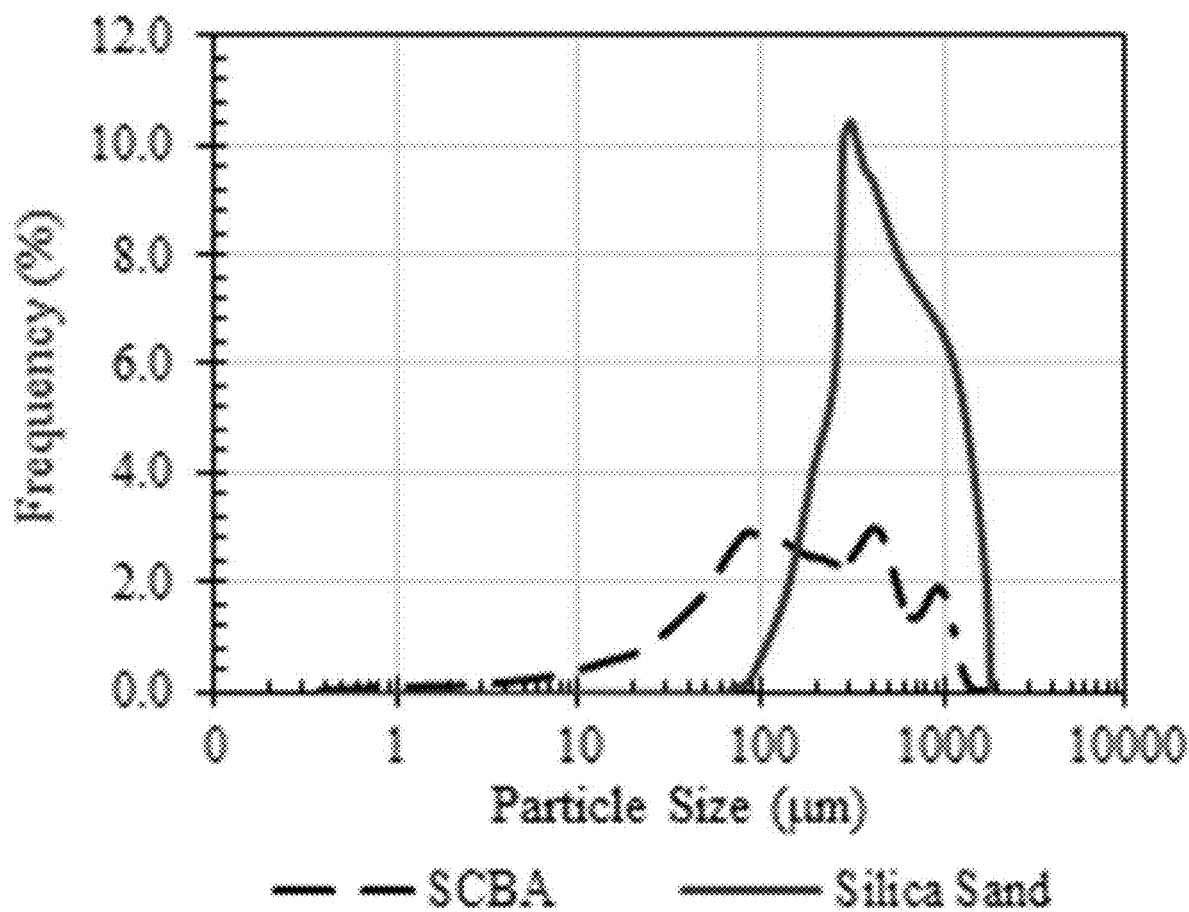
Figure 12A:
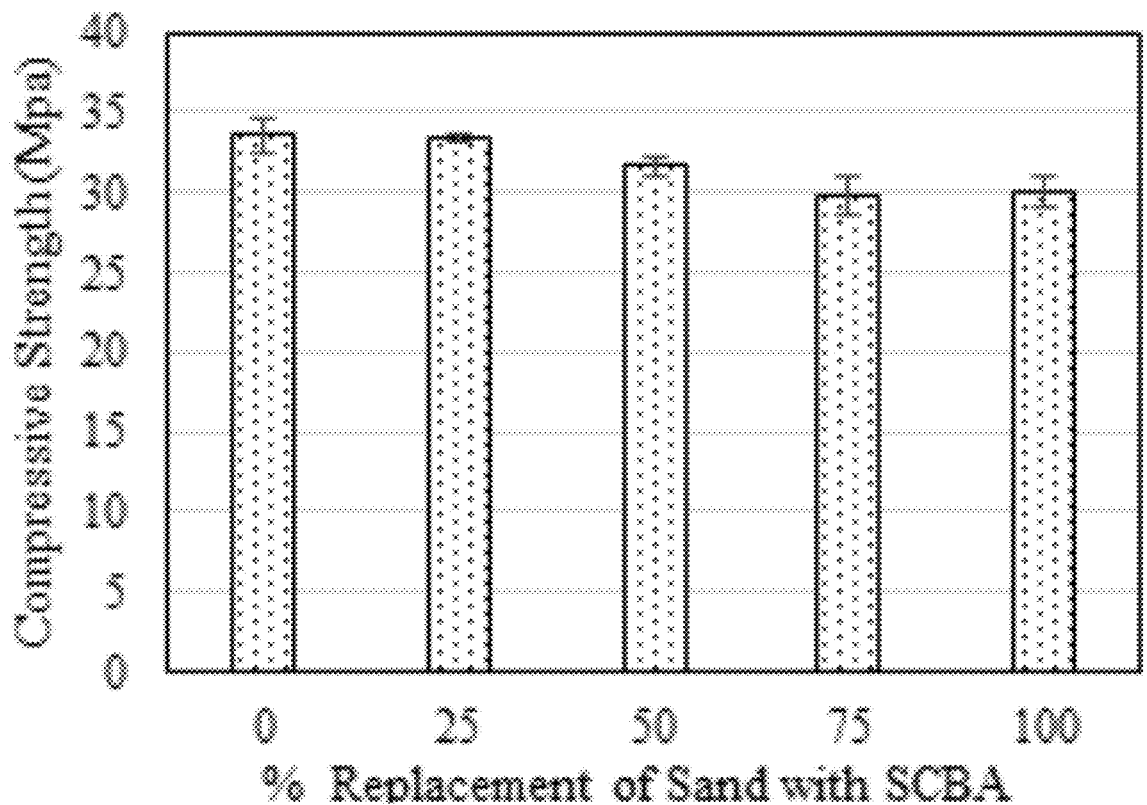
FIG. 12A-12B provides graphs of SCBA compositions according to various embodiments of the present disclosure.
Figure 12B:
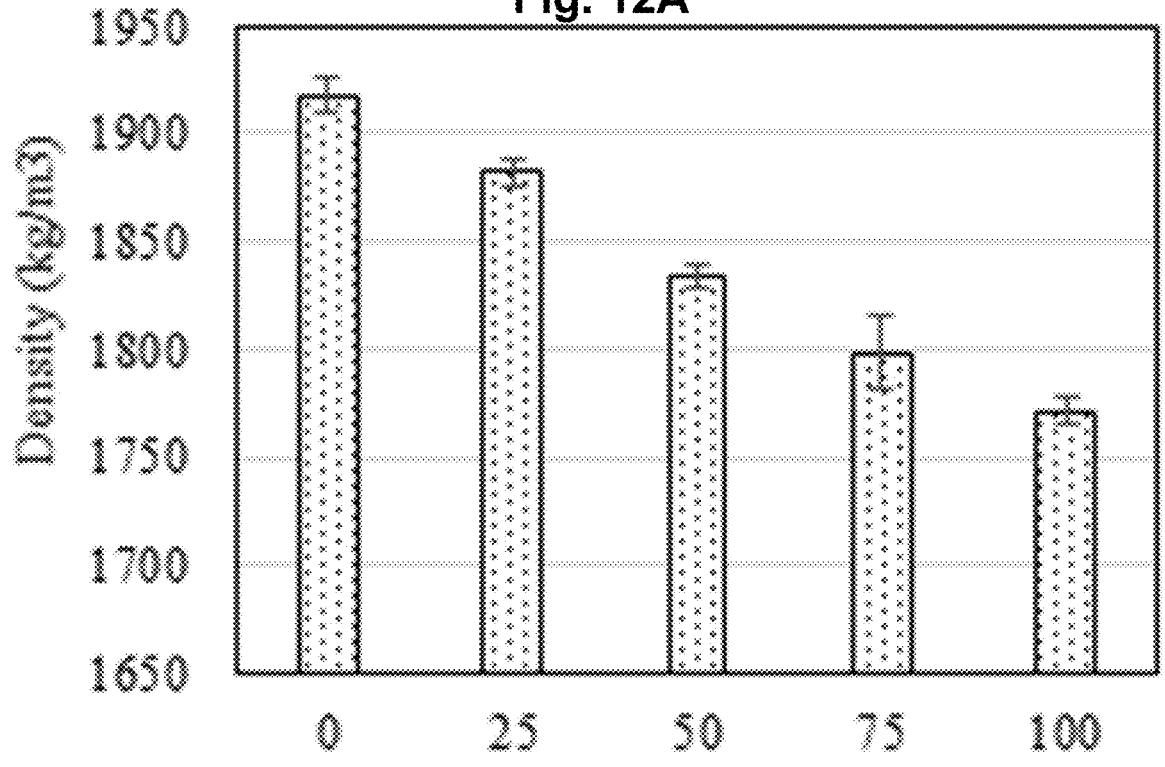
Figure 13A:
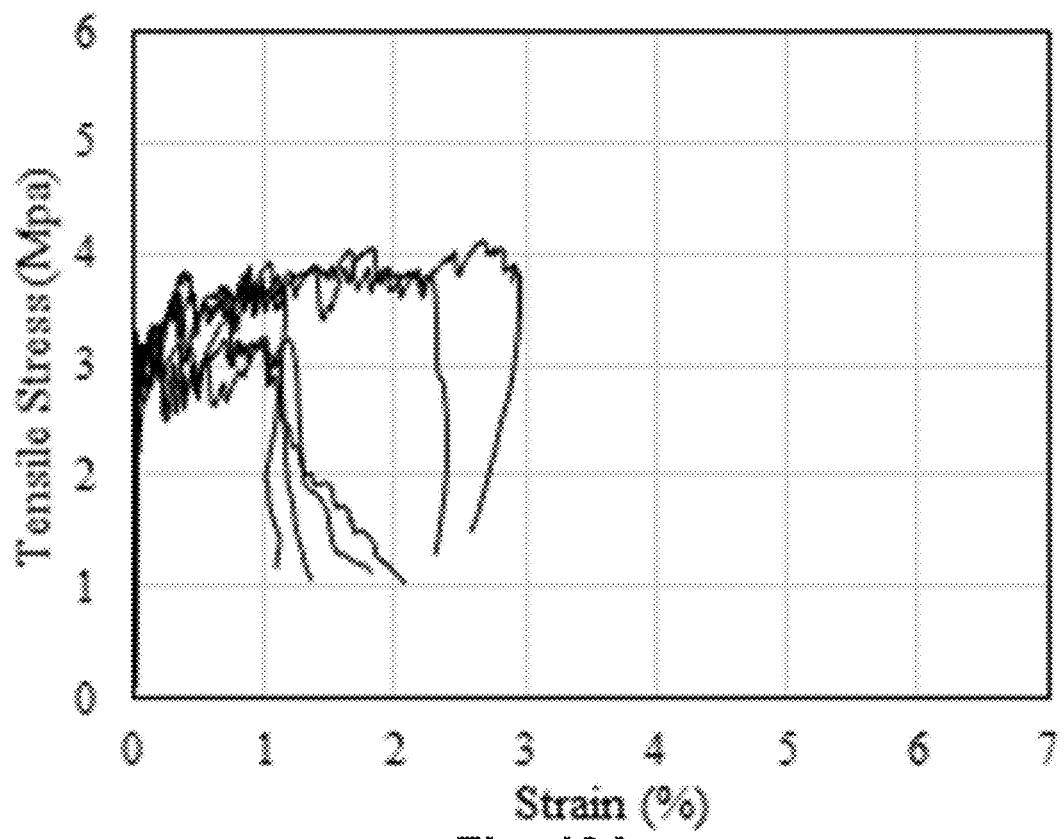
FIGS. 13A-13E are graphs comparing the tensile stress versus strain according to various embodiments of the present disclosure.
Figure 13B:
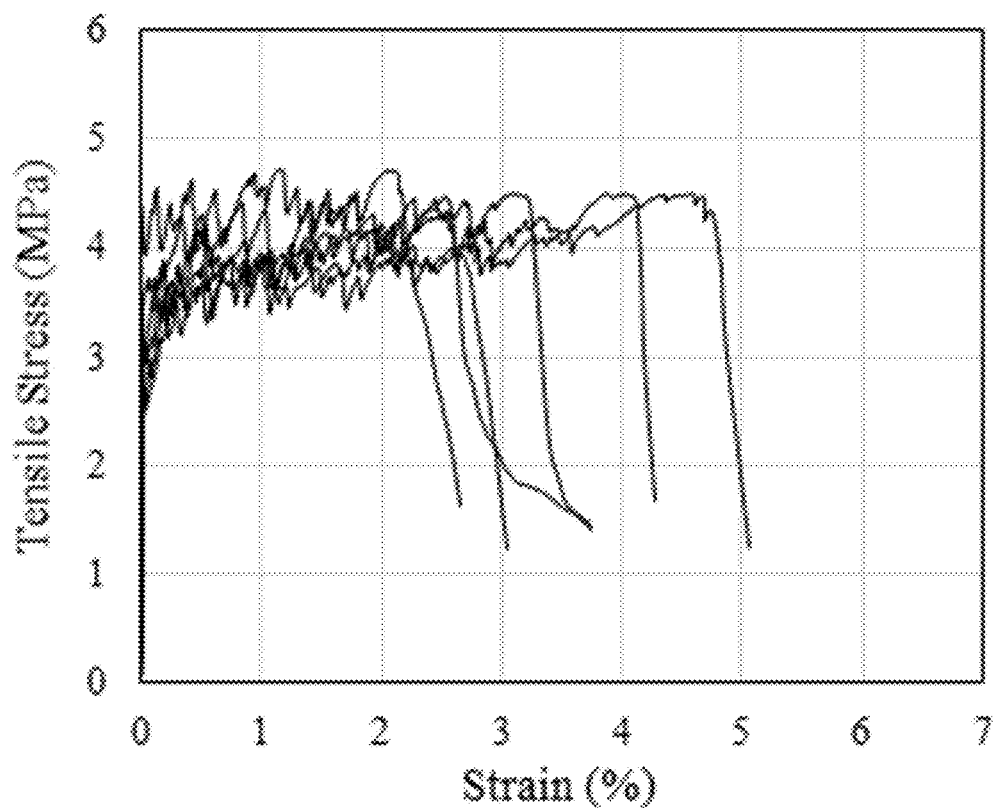
Figure 13C:
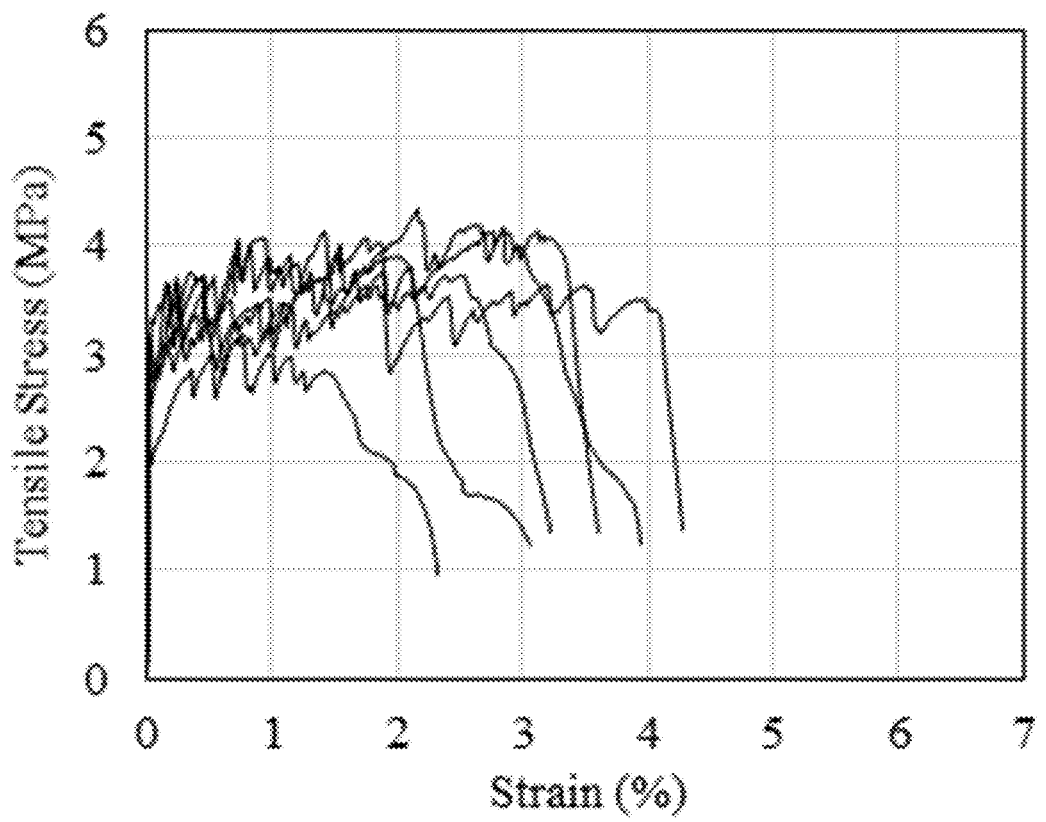
Figure 13D:
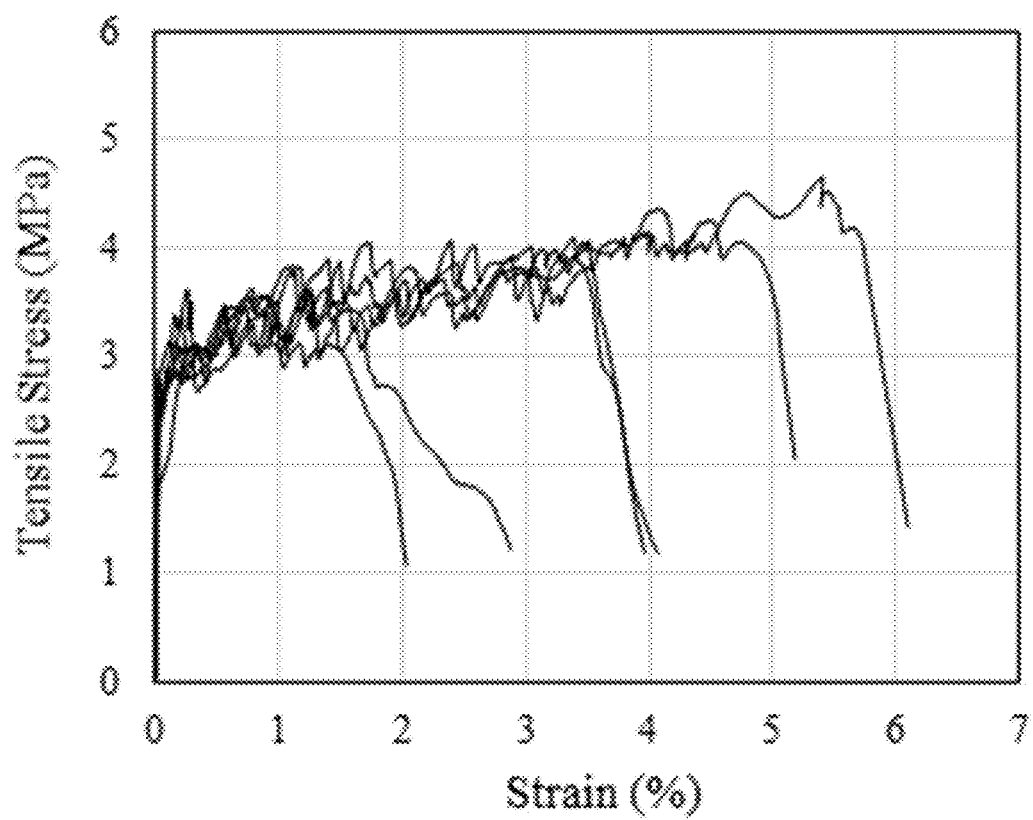
Figure 13E:
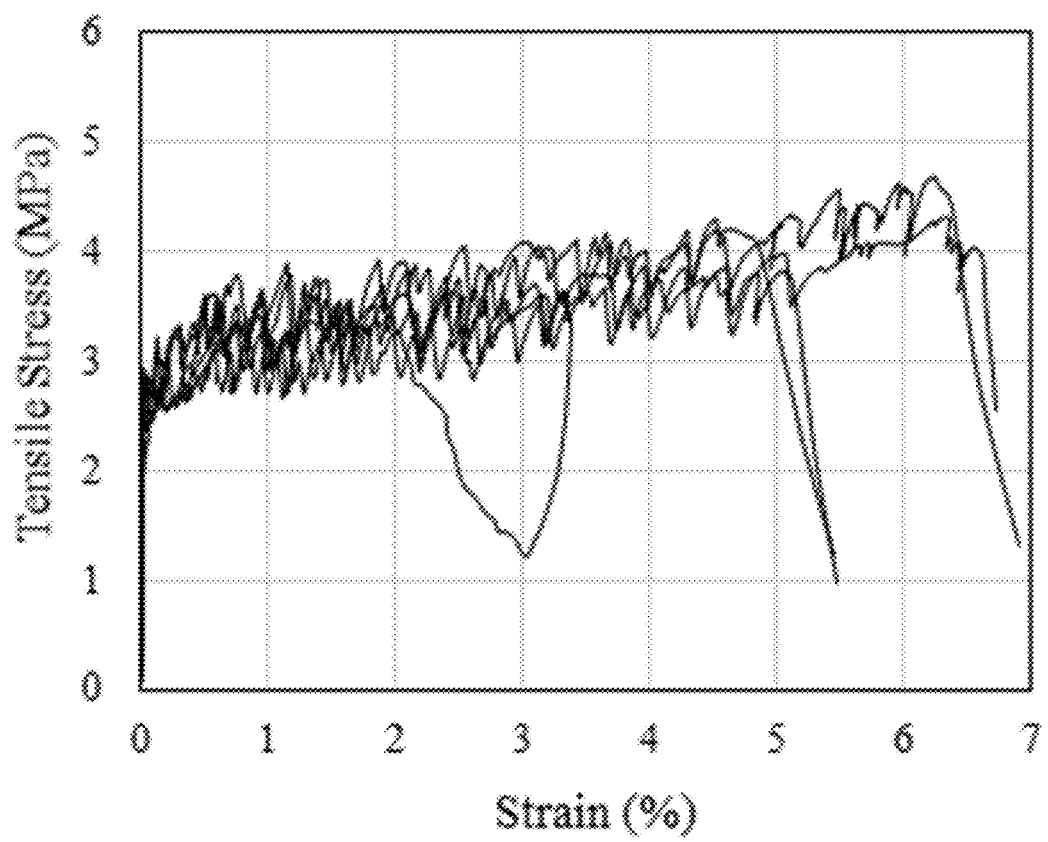

The particle size distribution of raw SCBA and silica sand were obtained from a Beckman LS200 Laser Diffraction Particle Size Analyzer. The analysis was performed in a micro-volume module where samples were suspended in water with agitation for 60 seconds. The particle size distribution of raw SCBA and silica sand are presented in FIG. 11B. From FIG. 11B, it can be observed that silica sand consists of coarser particles in comparison to that of raw SCBA. For instance, the mean particle size of raw SCBA was 256 µm (maximum nominal particle size of 539 µm), whereas silica sand exhibited a mean particle size of 421 µm (maximum nominal particle size of 995 µm).

Strength Activity Index (SAI)

The pozzolanic activity of raw SCBA was evaluated by the strength activity Index (SAI) method according to ASTM C311 (ASTM C311 2013). The objective of determining the SAI of SCBA was to gain insight on the Where:

A=average compressive strength of SCBA admixed cubes; and

B=average compressive strength of control mixture cubes.

The average compressive strength and corresponding SAI values calculated per equation 1 are presented in Table 4.4. From Table 4.4, it can be observed that the SA mortars exhibited a SAI value of 63.2%, whereas, BA mortars exhibited a SAI value of 72.1%. The higher SAI value of BA specimens was indicative of filler action (due to its small particle size) and/or reactiveness of raw SCBA in contrast to non-reactive silica sand (crystalline silica). The possibility of the pozzolanic activity of SCBA was attributed to the presence of reactive silica (amorphous silica) in raw SCBA. It should be noted that the difference in compressive strength between SA and BA specimens was statistically significant (i.e., $p=0.03$). Furthermore, it is important to mention that the SAI exhibited by BA mortars (i.e., 72.1%) was slightly lower than the minimum SAI requirement by ASTM C618 of 75% for a material to be classified as a pozzolan (ASTM C618 2014).

TABLE 4.4

Strength Activity Index Results

| ID | Description | Compressive Strength (MPa) | SD (MPa) | CV (%) | SAI (%) |
|---|---|---|---|---|---|
| CO | Control | 42.73 | 4.90 | 11.48 | N/A |
| BA | 20% cement replacement with SCBA | 30.82 | 1.03 | 3.35 | 72.12 |
| SA | 20% cement replacement with sand | 27.23 | 3.84 | 14.12 | 63.72 |

Fresh ECC Properties

In the fresh state, the rheology of the ECC cementitious matrix is an important parameter controlling fiber dispersion. Consequently, this affects both the feasibility and density of multiple cracking (Li and Li, 2013). To assess the rheology of all ECC mixtures prepared in this study, the modified Marsh funnel proposed by Li and Li was conducted. The Marsh funnel test proposed by Li and Li is a simple method to assess the workability of ECC mixtures and gain insight on the viscosity of the ECC mortar (Li 2007). In this test, the modified Marsh funnel is initially filled with mortar (before the incorporation of PVA fibers). Then, the bottom outlet of the cone is opened to allow the ECC mortar to flow. The Marsh cone flow time is the elapsed time (in seconds) from the opening of the bottom outlet of the cone until the light becomes visible when observing from the top (Li 2013). The study conducted by Li and Li suggested that a Marsh cone flow time between 15-33 seconds is optimum to ensure uniform fiber dispersion on ECC utilizing PVA fibers (12 mm in length) at 2% volume fraction (Li and Li 2013). However, it is important to notice that the PVA fiber length and content utilized in this study were 8 mm and 1.5% volume fraction, respectively, both of which help fiber dispersion. Therefore, the aforementioned flow time range is not directly applicable to this study. For this reason, all ECC mixtures produced were inspected by touch to evaluate whether fiber clump formation existed in any of the ECC mixtures. It is important to mention that no fiber clump formation was detected in any of the ECC materials produced.

Figure 10B:
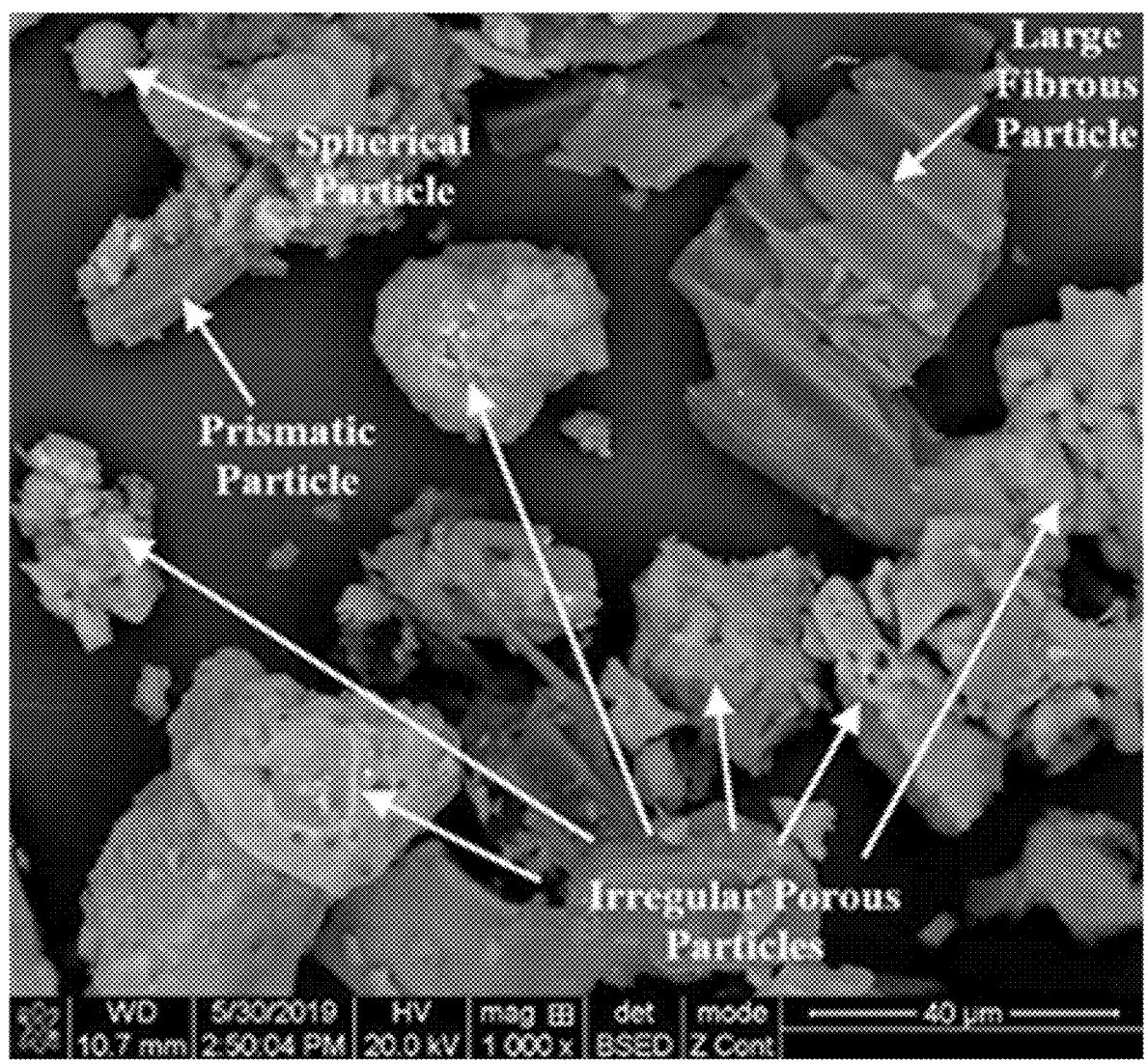

As seen in FIG. 10B, SCBA particles are very irregular, fine, and porous; as such, when replacing silica sand with SCBA, a substantial loss in workability occurs. For this reason, the control mixture (M-0) was designed to be a highly workable mixture (lowest flow time) to provide sufficient workability at high replacement levels of sand with SCBA and allow for ECC manufacturing to be possible. Furthermore, to mitigate the drastic loss in workability, HRWR dosage was incremented as the SCBA content increased (as shown in Table 4.5). From the Marsh funnel test results presented in Table 5, it can be observed that M-100 exhibited a high flow time even after the addition of HRWR at a dosage of 1.5% by weight of cement. In this study, HRWR dosage was limited to 1.5% due to its influence on other material properties such as air content.

Since air content can have an important effect on the hardened properties of concrete materials and different HRWR dosages were utilized, the air content of all ECC mixtures was evaluated according to ASTM C642 (ASTM C642 2006). Table 4.5 presents the effect of HRWR on air content. As HRWR was increased the air content in the cementitious matrix also increased. For Instance, the air content for M-0 was 1.4%; yet, for M-100 the air content rose up to 5.8%.

TABLE 5

| | Fresh ECC properties | | |
|---|---|---|---|
| ID | HRWR (%)[1] | Flow Time (sec) | Air Content (%) |
| M-0 | 0 | 7.00 | 1.40 |
| M-25 | 0.13 | 15.00 | 2.90 |
| M-50 | 0.45 | 24.00 | 3.50 |
| M-75 | 0.80 | 23.00 | 5.30 |
| M-100 | 1.5 | 28.00 | 5.80 |

[1]% by weight of cement

Compressive Strength

The 28-day compressive strength of all ECC mixtures is presented in FIG. 6a. As shown in FIG. 6a, the incorporation of SCBA produced minor effects on the compressive strength of the ECC materials. In general, as the sand replacement with SCBA increased, the compressive strength decreased slightly (excepting M-100 compared to M-75). An ANOVA and Tukey Pairwise Comparison was conducted to evaluate if the differences between mixtures were statisticaly significant. Per the ANOVA, statistically significant differences were encountered (p-value=0.0006). Moreover, according to the Tukey Pairwise Comparison, statistically significant differences were encountered between control and SCBA-ECC mixtures incorporating SCBA contents greater than 50%. However, for SCBA-ECC materials with 50% or less sand replacement with SCBA, differences with control were not statistically significant. The decrease in compressive strength observed can be associated with the decrease in density of the ECC materials with SCBA. In FIG. 6b, the hardened densities of all the ECC materials are reported. As seen in FIG. 6b, the density of the ECCs decreased with the increase in the replacement of sand with SCBA. This was expected since SCBA exhibits a lower specific gravity than silica sand. Furthermore, the increase in air content reported in Table 5 is also a factor contributing to the reduction in density. It is important to mention that regularly for each 1% increase in air content, a 5% decrease in compressive strength occurs (ACI Committee 212 2016). As seen in Table 5, the air content in M-25, M-50, M-75, and M-100 increased by 1.5, 2.1, 3.9, and 4.4% compared to control, respectively. Consequently, the expected reductions in compressive strength due to air content were in the order of 7.5, 10.5, 19.5, and 22% for M-25, M-50, M-75, and M-100, respectively. However, the compressive strength decrease reported in this study for M-25, M-50, M-75 and M-100 compared to control (33.58 MPa) were 0.4, 5.8, 11.0, and 10.3%, respectively. Thus, in all cases, the compressive strength decrease was much lower than the expected values due to air content increase. This phenomenon could be attributed to the pozzolanic activity and/or filler action of SCBA which likely contributed mitigating the compressive strength reduction.

Uniaxial Tensile Test

The tensile stress vs. strain curves at 28 days of curing for all ECC materials are presented in FIG. 13A-13E. From FIG. 13A-13E, the average tensile strength and tensile strain capacity were determined for each ECC material and presented in FIGS. 14A and 14B, respectively. From FIG. 13A-13E, it can be observed that all ECC mixtures in this study exhibited a pseudo-strain-hardening behavior, i.e., sustained increase in tensile load carrying capacity beyond the first matrix cracking (Koker and Van zijl G. P. A. G. 2004). However, it should be noted that both tensile strength and tensile ductility were significantly influenced by the SCBA content in ECC mixtures.

Figure 14A:
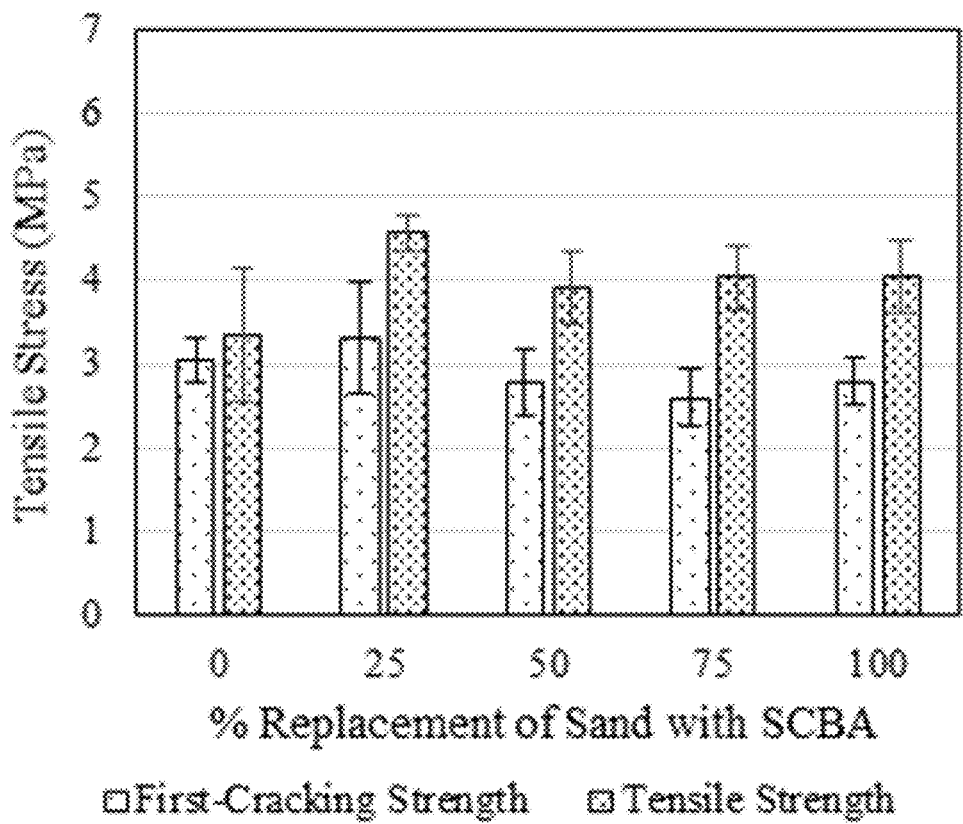
FIGS. 14A-14B illustrate uniaxial tensile test results according to various embodiments of the present disclosure.
Figure 14B:
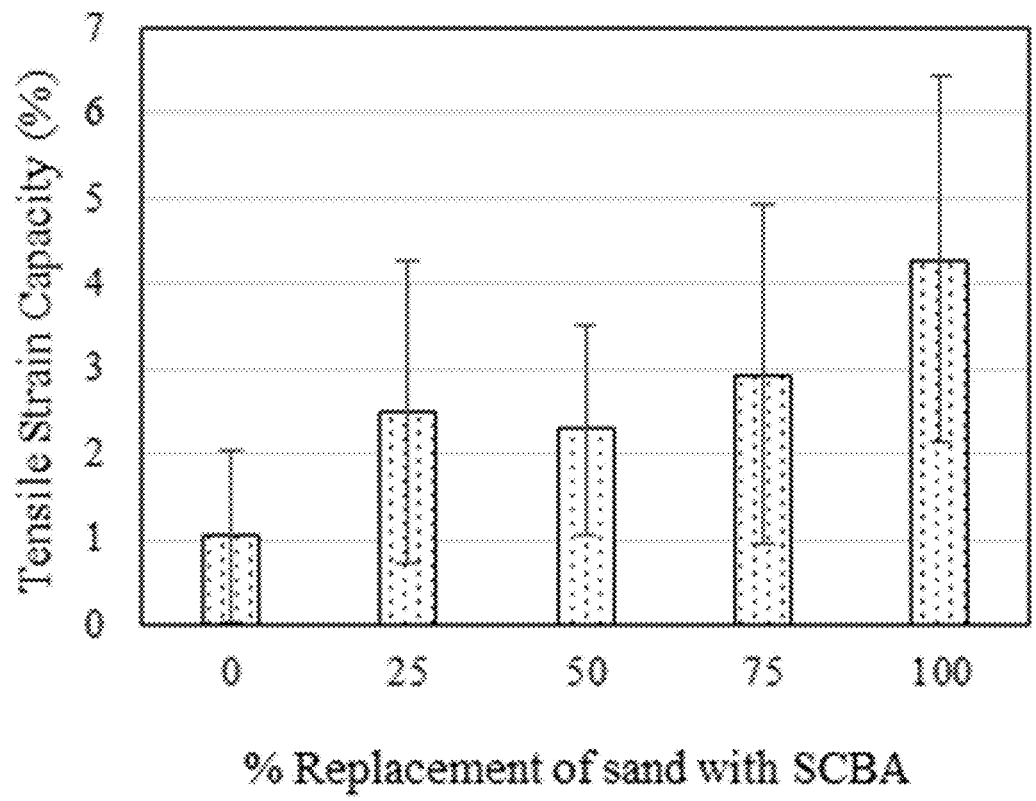
Figure 15A:
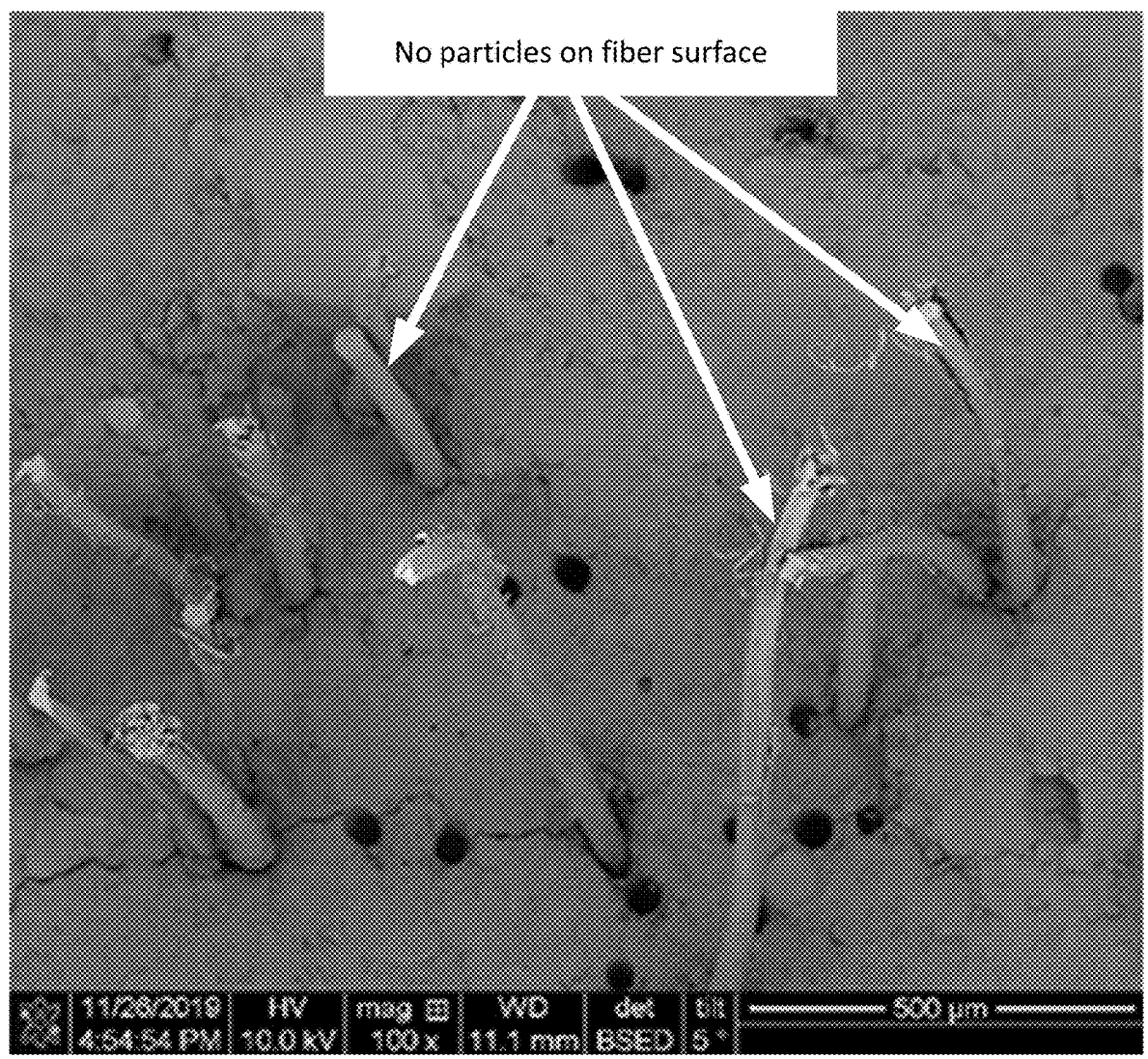
FIGS. 15A-15D are representative backscattered Electron (BSE) SEM images of ECC Materials, (FIG. 15A) M-0 (FIG. 15B) M-0 (FIG. 15C) M-25 (FIG. 15D) M-50, according to various embodiments of the present disclosure.)
Figure 15B:
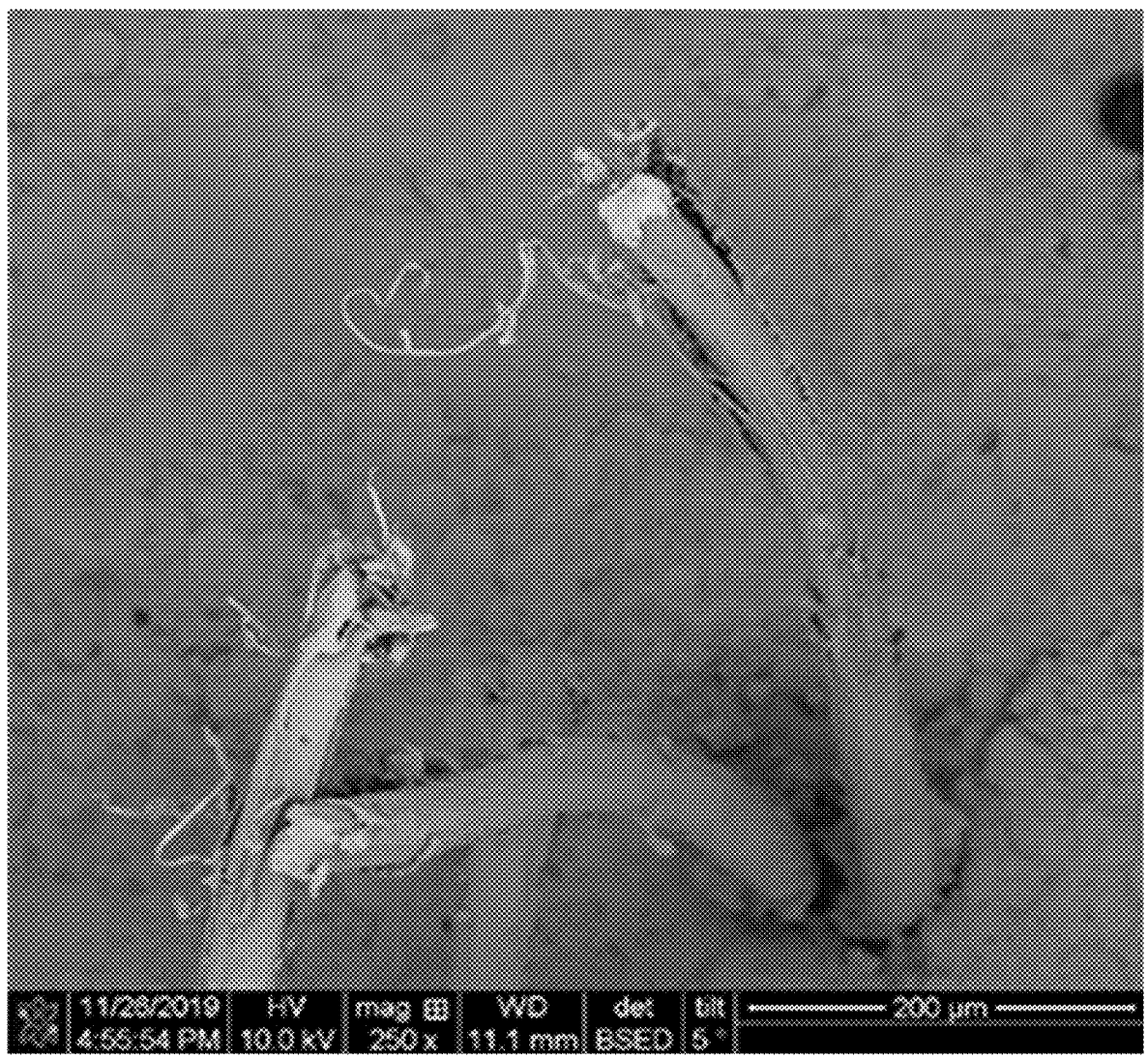
Figure 15C:
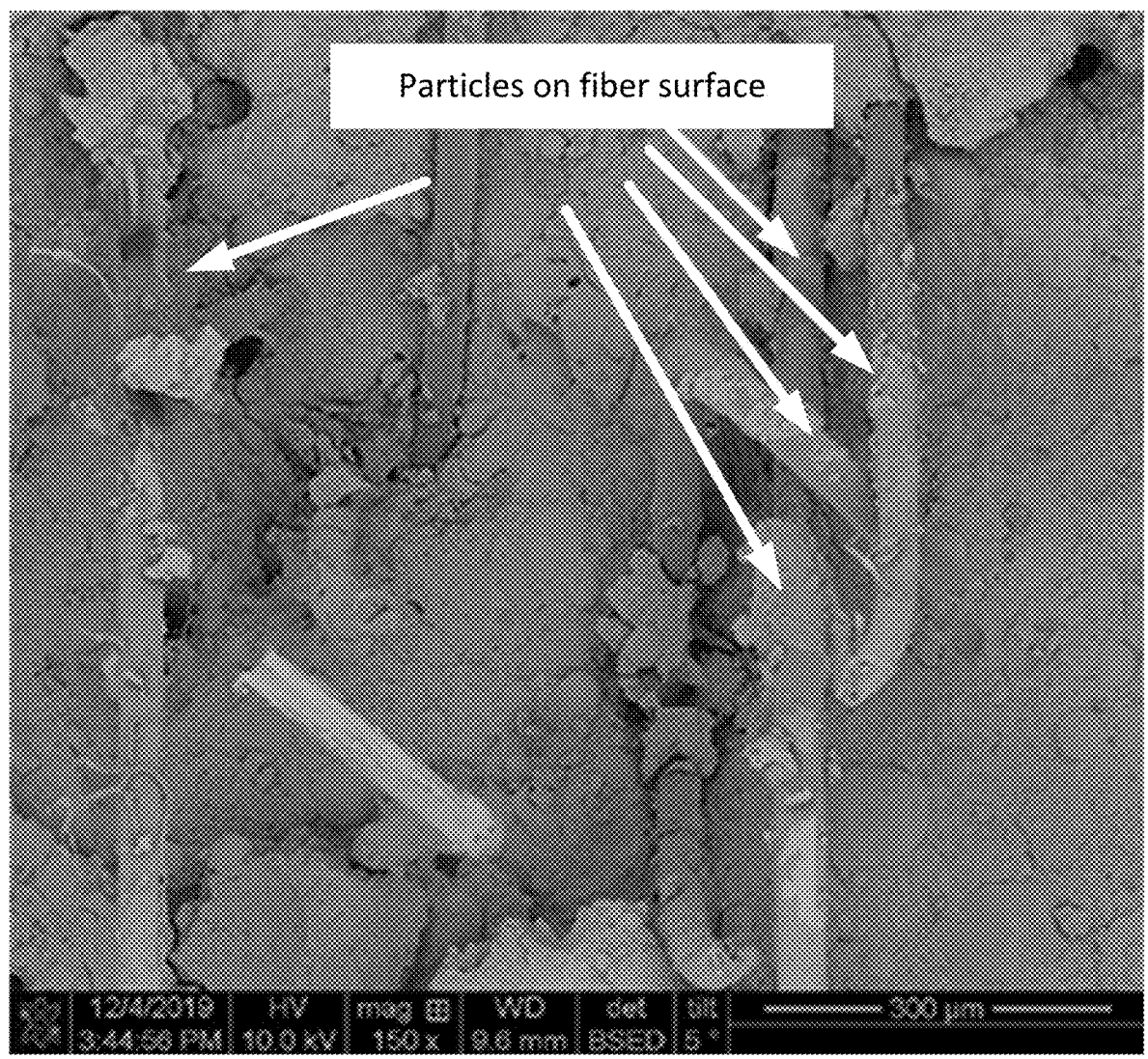
Figure 15D:
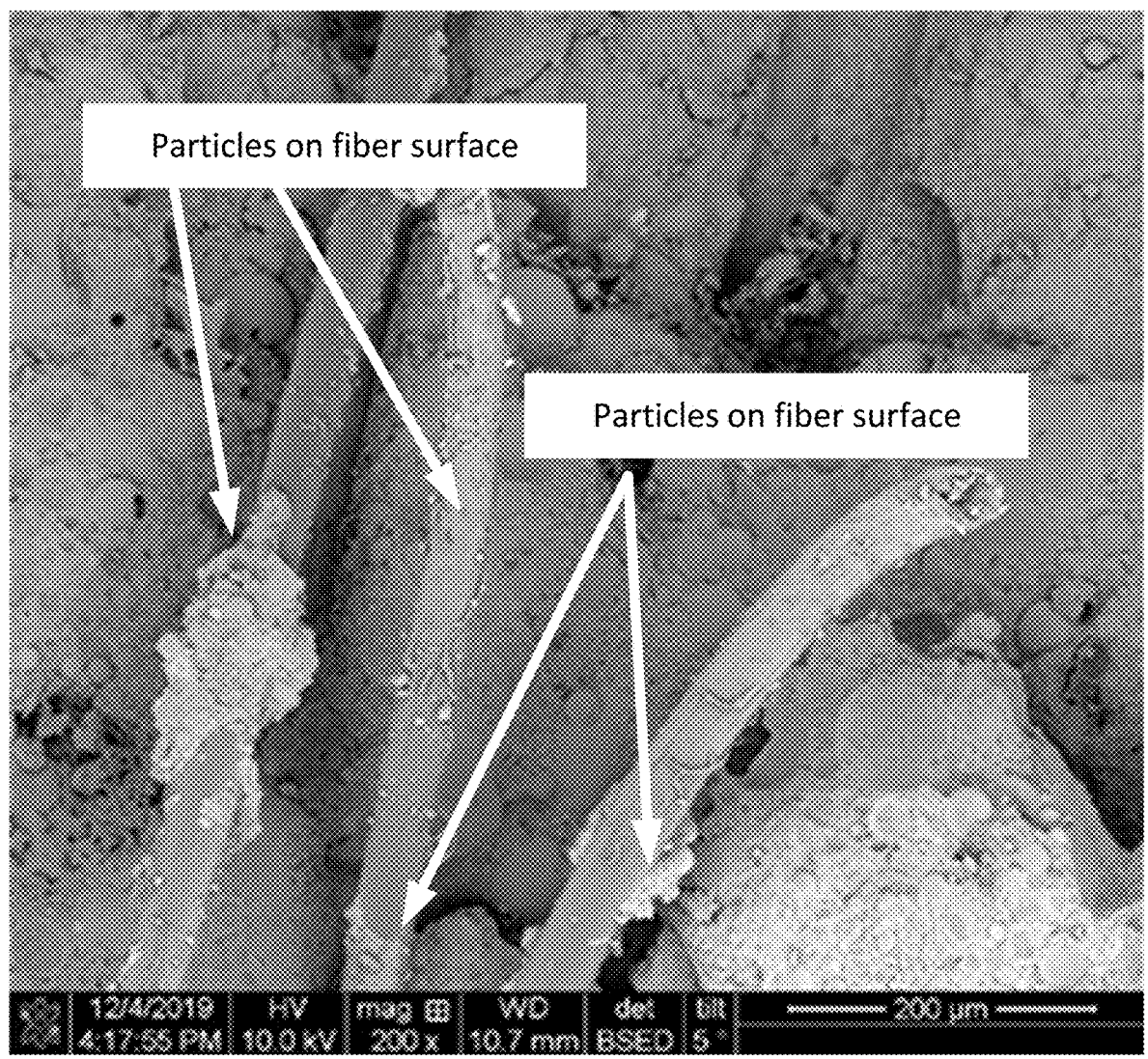

From FIG. 14B, a progressive enhancement in tensile ductility of the composites can be observed with increasing contents of SCBA (excepting M-50 compared to M-25). For instance, control (M-0) exhibited a tensile strain capacity of 1.04% which increased to 4.28% for 100% sand replacement with SCBA (M-100) (an improvement of 311%). Previous studies have concluded that the increase in aggregate particle size increases the tortuosity of the fracture path, which in turn increases the resistance to the crack propagation, i.e., fracture toughness ($K_m$); thus increasing $J_{tip}$ (Moseley, Ojdrovic and Petroski 1987; Nallathambi, Karihaloo, and Heaton 1984; Perdikaris and Romeo 1995). According to ECC design principles, the decrease in the crack-tip matrix toughness of the composite promotes the pseudo strain hardening behavior of ECC materials by facilitating the formation of multiple cracks (allowing for a robust PSH behavior). In turn, this is quantified by the PSH energy index ($J'_b/J_{tip}$). From the particle size analysis presented in FIG. 11B, it can be observed that SCBA is much finer than the river sand utilized; therefore, the fracture toughness of SCBA-ECC cementitious matrices is expected to decrease with the increase in SCBA content. Furthermore, it is important to acknowledge that the air content increase reported in Table 5 can also play a role in decreasing the fracture toughness of the cementitious matrices by providing air bubbles which can act as defects. As such, the reduction of the SCBA-ECC cementitious matrices fracture toughness with increments in SCBA content is believed to be an important factor producing the increase in tensile ductility due to the combined effect of reduced aggregate particle size and increase in air content.

Besides the effect of aggregate particle size and air content on the fracture properties of the cementitious matrix of the composites, the carbon content of SCBA may also be a contributing factor in the ductility enhancement observed. A study by Wang and Li (2007), showed that carbon particles tend to concentrate on the PVA fiber surface during mixing providing a lubrication mechanism that eases fiber pullout (Yang et al. 2007). The study stated that the frictional stress ($\tau_0$) between the fiber and the cementitious matrix reduces due to the carbon coating on the PVA fiber surface. Furthermore, the study suggested that the carbon coating could also lead to the weakening of the chemical bond ($G_d$) between the PVA fibers and the cementitious matrix. From EDS analysis (as shown in Table 3), it was observed that SCBA exhibits significant amounts of carbon content; and therefore, carbon coating of PVA fibers in SCBA-ECC is highly likely. As a result, a decrease in $\tau_0$ due to carbon coating can lead to either a reduction or an increase in $J_b'$ depending on the initial $\tau_0$ conditions. If the initial $\tau_0$ is large and significant fiber rupture is occurring during fiber pullout from the cementitious matrix, lowering $\sigma_0$ can cause a reduction in fiber rupture; and consequently, an increase in $J_b'$ (which favors ductility of the composite). On the other hand, if the initial $\tau_0$ is low, a decrease in $\tau_0$ will lead to a reduction in the fiber-bridging capacity; and therefore, a decrement in (which will negatively impact tensile ductility) (Li 2003). Wu recommended an optimal range for $\tau_0$ of 1.0 to 2.1 MPa to facilitate fiber pullout without failure (Wu 2001). It is important to notice that without an in-depth examination of the fiber/matrix interfacial parameters through single fiber pullout test it is hard to conclude whether the carbon coating effect will have a positive or negative impact in the tensile ductility of the composites due to its effect on $\tau_0$. Furthermore, it is also important to note that other effects of SCBA such as microstructure enhancement effects (due pozzolanic and/or filler effect) can mitigate the potential decrease in $\tau_0$ due to the effect of carbon coating. In the case of the decrease in chemical bond ($G_d$), $J_b'$ will be increased by reducing premature fiber rupture during the deboning of the fibers from the cementitious matrix; thus, positively affecting the tensile ductility of the composites (Redon et al. 2001). In this study, it is hypothesized that the fiber carbon coating effect produced by SCBA positively affects the tensile ductility of the ECC materials mainly due to the reduction of the chemical bond ($G_d$). FIG. 15A-15D, present SEM images from the failure cross-section of SCTT specimens of ECC mixtures (i.e., M-0, M-25, and M-50). From these Figures, a coating of micro particles can be observed on the surface of M-25 and M-50 (presented in FIGS. 15C and 15D, respectively) fibers compared to those of M-0 (presented in FIGS. 15A and 15B). This in turn, presents evidence of the apparent tendency of carbon particles in SCBA to coat PVA fibers; thus, likely lowering the interfacial chemical bond. In addition to the effect of carbon coating, it is believed that the pozzolanic activity of SCBA may also contribute to the reduction in the chemical bond. Previous studies have suggested that the chemical bond of PVA fibers with the cementitious matrix arises to a great extend due to the formation of calcium hydroxide at the fiber/matrix interface (Yang et al. 2007). As such, pozzolanic materials such as low calcium Class F fly ash have been shown to be effective in reducing $G_d$ (Wang and L 2007; Yang et al. 2007). From EDS analysis (as shown in Table 3), it can be observed that the SCBA utilized in this study has a low CaO and a high $SiO_2$ content similar to that of a highly pozzolanic fly ash. As such, SCBA may further reduce the chemical bond of the fiber/matrix interface in ECC materials by altering the chemical composition of the cementitious matrix.

Another important factor affecting the ductility of the composites is the rheology of the cementitious matrix. As mentioned before, the cementitious matrix rheology can significantly affect the distribution of fibers in the composite. For instance, low plastic viscosity of the cementitious matrix can lead to a non-uniform distribution of fibers causing a reduction in the effective volume of fibers ($V_f$) at the weakest cross-section within the specimen (Li 2013). In turn, the local reduction in $V_f$ will produce a lower fiber-bridging capacity ($\sigma_0$) and a reduction in the complementary energy of the fiber-bridging relation ($J_b'$) which can lead to the loss of tensile ductility and strength of the material. In this study, the cementitious matrices prepared exhibited an apparent increase in the plastic viscosity (i.e., thickening of the cementitious matrix) with the increase in SCBA content as suggested by the modified Marsh funnel test results shown in Table 5. As such, it is important to acknowledge that the matrix thickening effect produced by the replacement of sand with SCBA could also support the increase in tensile ductility observed in FIG. 14B.

In summary, the increase in tensile ductility observed in ECC materials by increasing contents of SCBA may be associated with the combined effect of $J_{tip}$ reduction and $J_b'$ increment. $J_{tip}$ reduction can be attributed to the decrease of aggregate particle size and increase in air content. On the other hand, $J_b'$ increment can be attributed to the decrease in the fiber/matrix chemical bond (by the potential formation of a carbon coating layer in the PVA fiber and the pozzolanic properties of SCBA), and an enhanced fiber dispersion (due to the thickening of the cementitious matrix).

While the tensile strength of all SCBA-ECC materials were greater than control, the opposite was true for the first-cracking strength of the SCBA-ECC cementitious matrices as shown in FIG. 14A (with the exception of M-25). The first-cracking strength of the cementitious matrix is primarily dependent on the characteristics of the cementitious matrix (i.e., matrix fracture toughness and preexisting initial flaw size) and not on the attributes of the fiber/matrix interface which become dominant post-cracking. As such, the decrease in the first-cracking strength is likely associated with the decrease in the matrix fracture toughness and/or an increase in the preexisting initial flaw size as a consequence of aggregates with smaller particle size (i.e., SCBA) and added artificial defects (i.e., additional air voids), respectively.

Single Crack Tension Test (SCTT)

In order to precisely assess the fiber-bridging relation of a cementitious composite, it is of utmost importance to produce one single crack during the tensile test. Otherwise, the crack opening measured experimentally will not correspond to that of a single crack; thus, introducing significant error to the crack opening measurement. To this end, in the SCTT a thin notch is cut around the specimen with the goal to produce one single crack. FIG. 16A-16E presents the fiber-bridging stress ($\sigma$) vs. crack opening ($\delta$) relationship (i.e., fiber-bridging relation) obtained through SCTT for all ECC materials evaluated in this study. The dotted lines from FIG. 16A-16E present the fiber-bridging relation of each specimen while the solid line presents the average fiber-bridging relation. As shown in FIG. 16A-16E, the fiber-bridging relations obtained did not always exhibit one single peak (which is indicative of one single crack). On the contrary, fiber-bridging relations with more than one peak were observed in all the Figures. Specially, this was the case for ECC with high SCBA content (i.e., 75 and 100%), where multiple peaks (3-4 peaks) were predominant as shown in FIGS. 16D and 16E. This behavior is consistent with the uniaxial tensile test results since the high ductility shown by M-75 and M-100 (through a robust PSH behavior) likely resulted in the formation of multiple cracks in the thin notched area. From the results seen in FIG. 16A-16E, it is recommended that future studies evaluate the fiber-bridging relation of SCBA-ECC materials through SCTT utilizing a reduced fiber content (i.e., 1% volume fraction or lower) such that a single crack can be consistently obtained. In this way, a more accurate representation of the fiber-bridging relation can be obtained. It is important to notice that while lower fiber content in the SCTT can guarantee a single crack in the notched testing section, fiber/matrix micromechanical interfacial parameters such as the frictional stress ($\sigma_0$), chemical bond ($G_d$), and slip-hardening coefficient ($\beta$) tend to increase when fiber content decreases (due to lower air content in the cementitious matrix) (Yang et al. 2008). As such, utilizing fiber-bridging relations obtained at lower fiber contents (i.e., 1% volume fraction) to predict the fiber-bridging relation of a composite with higher fiber content (i.e., 1.5%) can also incur in some inaccuracies.

As previously discussed, air content increased substantially with the increments in SCBA content (due to the effect of HRWR dosage increase). As such, a decrease in the matrix/fiber interfacial bond; and thus, a tensile strength decrease with the increase in SCBA content was expected. Contradictorily, the tensile strength of all ECC mixtures containing SCBA were greater than that of the control mixture. The greatest tensile strength increase reported was for M-25, where the difference with control (i.e., M-0) was 22.3% (from 3.73 MPa to 4.56 MPa). In the case of M-50, M-75 and M-100, the increments in tensile strength compared to control were of 5.1% (from 3.73 MPa to 3.92 MPa), 8.3% (from 3.73 MPa to 4.04 MPa), and 8.6% (from 3.73 MPa to 4.05 MPa), respectively. This behavior is attributed to the pozzolanic and/or filler effect of the SCBA material which likely enhanced the microstructure of the ECC cementitious matrix; thus, increasing the fiber/matrix frictional bond ($\tau_0$). This effect has been previously observed in ECC materials when high levels of cement replacement with fly ash are utilized (Yang et al. 2007). In this study, this phenomenon is believed to outweigh the decrease in the fiber/matrix frictional bond due to the increase in air content and the possible carbon coating formed on the surface of the fiber.

Figure 16A:
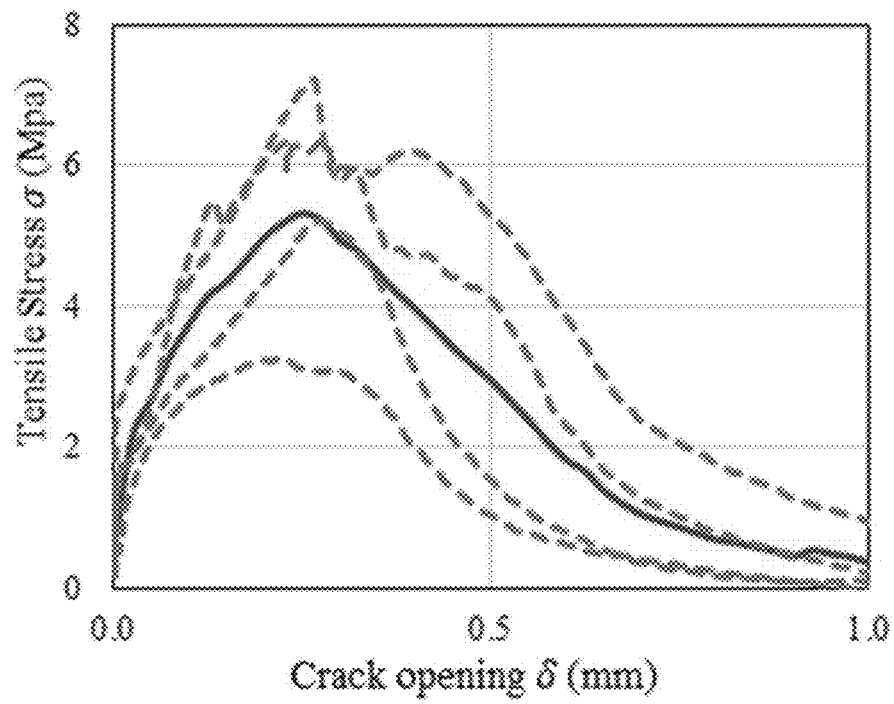
FIGS. 16A-16F are graphs showing single-crack tension tests (SCTT bridging stress vs. crack opening curves according to various embodiments of the present disclosure: (FIG.
Figure 16B:
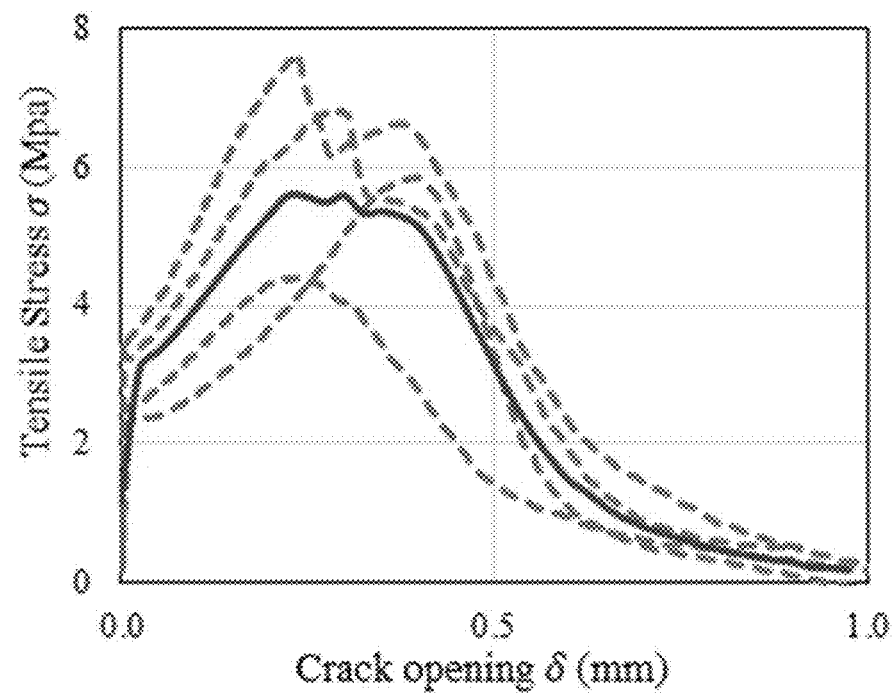
Figure 16C:
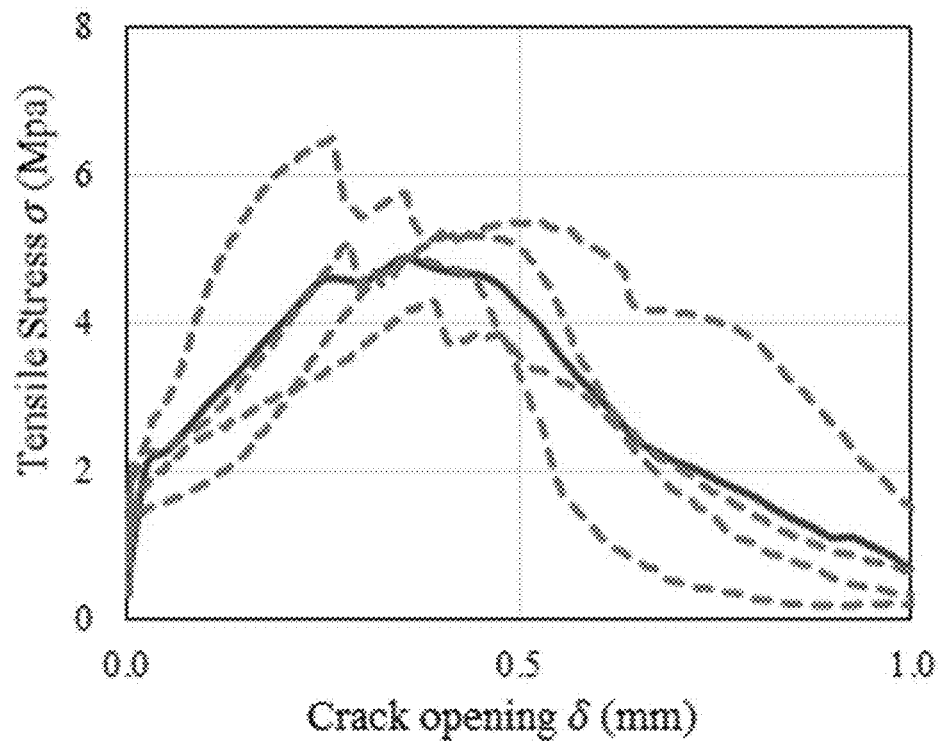
Figure 16D:
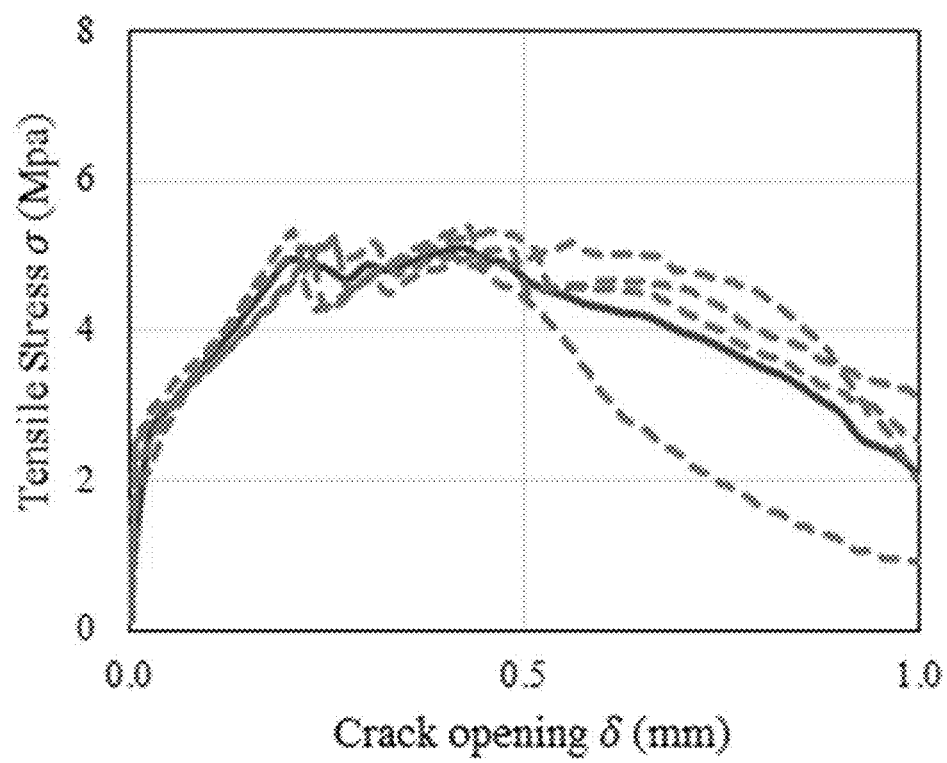
Figure 16E:
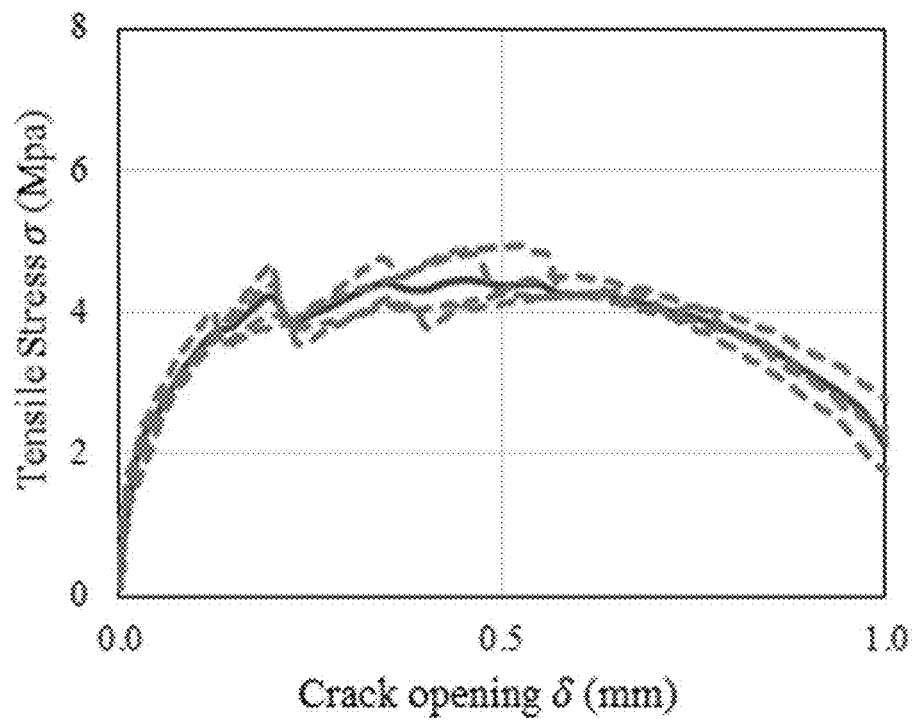
Figure 16F:
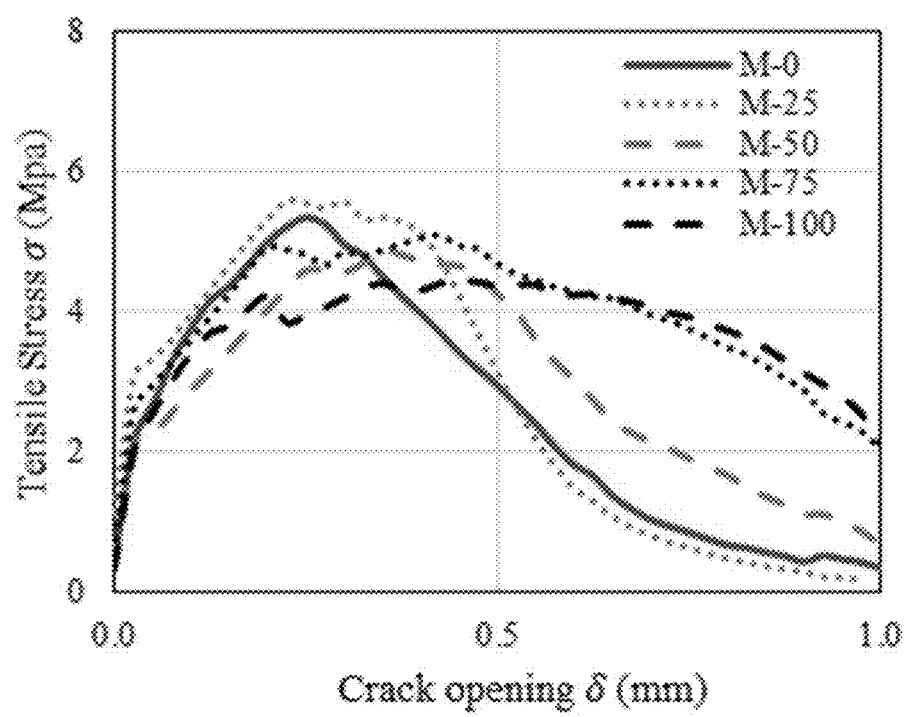

FIG. 16F presents the average fiber-bridging curve for al ECC mixtures. From FIG. 16F, it can be noted that for al SCBA-ECC mixtures, with the exception of M-25, the fiber-bridging curves shifted downwards (i.e., decrease in $\sigma_0$) and to the right (i.e., increase in the crack opening corresponding to the peak bridging stress, $\delta_0$). In contrast, for M-25 the fiber-bridging curve shifted upwards (i.e., increase in $\sigma_0$) at a similar $\delta_0$ as in M-0. Based on ECC design criteria, an increase in the fiber-bridging capacity ($\sigma_0$) and the shift of the fiber-bridging relation to the right (increase in $\delta_0$) favors the PSH behavior of ECC materials by providing with an increase in the complementary energy ($J_b'$). As such, the influence of SCBA content on the main parameters describing the fiber-bridging relation of ECC materials (i.e., $\sigma_0$, $\delta_0$, $J_b'$) are presented in FIG. 17A-17C, respectively.

Figure 17A:
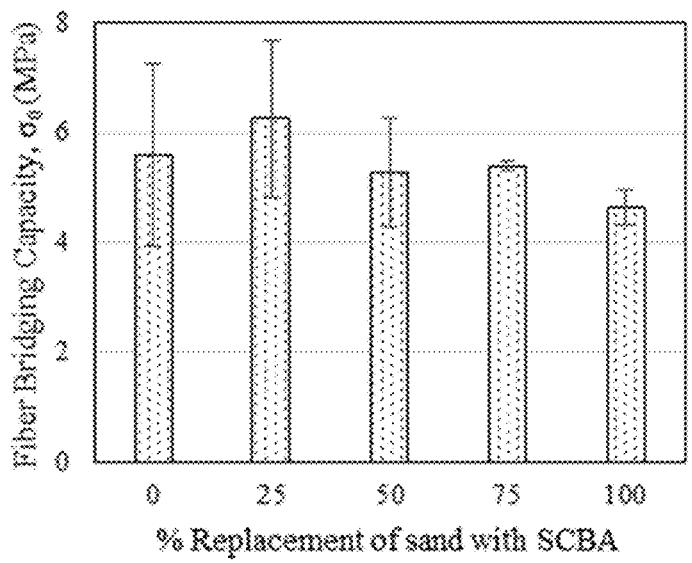
FIGS. 17A-C provide SCTT experimental results according to various embodiments of the present disclosure.
Figure 17B:
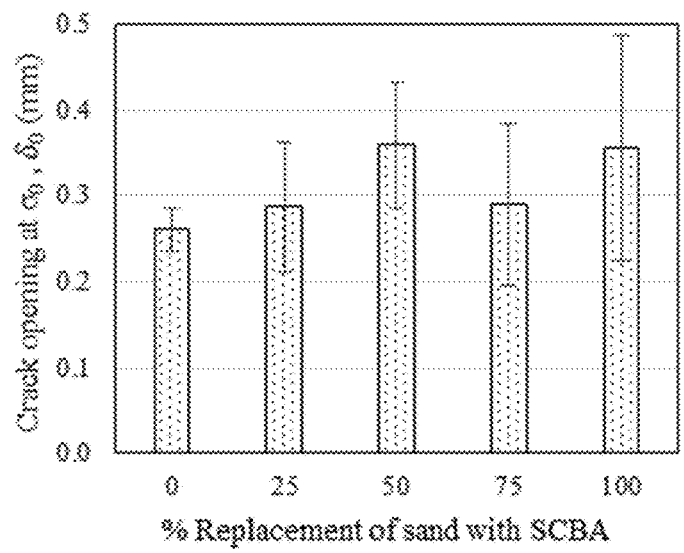
Figure 17C:
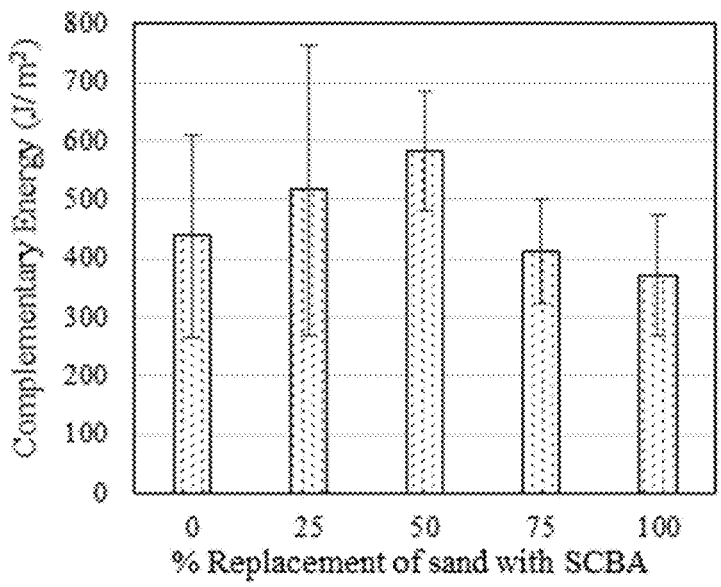

From FIG. 17A, the fiber-bridging capacity $\sigma_0$ presents a similar trend to that of the tensile strength of the ECC materials observed in FIG. 14A. Yet, in the case of the fiber-bridging capacity, M-50, M-75, and M-100, slightly underperformed M-0. In the SCTT, M-0 exhibited a bridging capacity of 5.58 MPa which increased up to 6.26 MPa for M-25 (12.2% increase). Subsequently, for ECC mixtures incorporating SCBA contents higher than 25%, the fiber-bridging capacity decreased with M-100 exhibiting the lowest bridging capacity of 4.64 MPa (25% decrease compared to control). It is important to notice that the fiber-bridging capacity values were greater than those of the tensile strength of the composites. This is the case since the failure of the ECC composite in a regular uniaxial tensile test occurs in the weakest of several cracks occurring in the material, while the failure in the SCTT occurs in a single random crack occurring in the notched area of the specimen. As such, on average, the tensile strength of the composite is always lower than the fiber-bridging capacity. This phenomenon, in turn, is likely responsible for the lower fiber bridging capacities observed for M-50, M-75, and M-100 compared to control (which was not in agreement with tensile strength results from uniaxial tensile tests). As mentioned previously, specimens with high contents of SCBA experienced multiple cracking within the notched area during the SCTT. As such, this can produce a lower bridging capacity value; thus, explaining the difference observed in tensile strength results (from the uniaxial tensile test) and fiber bridging capacity results (from the SCTT).

From FIG. 16B, $\delta_0$ shows an increasing trend with the increment in SCBA content (excepting M-75 compared to M-50). For instance, M-0 exhibited a crack opening of 0.26 mm at $\sigma_0$ which increased up to 0.36 mm for M-50 and M-100. The increase in $\delta_0$ may be attributed to the combined influence of the formation of multiple cracks observed in the SCTT and the possible decrease in the fiber/matrix chemical bond $G_d$. As discussed earlier in the uniaxial tensile test section, an increase in air content of the cementitious matrix, the carbon coating formed on the surface of the fiber, and the pozzolanic effect of SCBA can contribute to the decrease in the chemical bond.

FIG. 16C presents the complementary energy ($J_b'$) of the $\sigma(\delta)$ relation for all ECC materials produced in this study. In terms of fiber/matrix interfacial properties, the result shows that the most effective type of ECC mixture to maximize tensile ductility is M-50 as it exhibited the highest $J_b'$ (i.e., 582.32 J/m$^2$). Interestingly, while M-50 exhibited the highest J, it was the ECC material with the lowest tensile strain capacity among all SCBA-ECC mixtures. This can be the case since the energy PSH index depends on both $J_b'$ and $J_{tip}$. As such, while $J_b'$ was optimal for M-50, $J_{tip}$ was likely not. In turn, this suggests that the effect of SCBA in reducing $J_{tip}$ may be the predominant effect in the enhancements in tensile ductility observed. Yet, fracture toughness tests should be conducted in future research to confirm this hypothesis.

Surface Resistivity

Figure 18A:
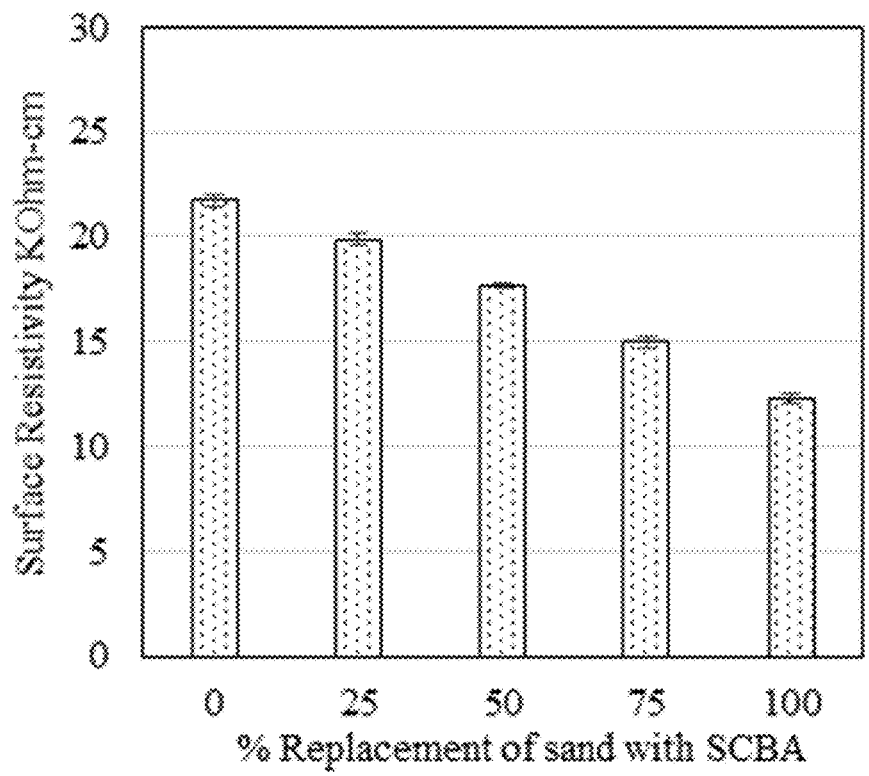
FIGS. 18A-18B provide (FIG. 18A) Surface Resistivity Results and (FIG. 18B) Back-Scattered Electron (BSE) SEM image of M-50 according to various embodiments of the present disclosure.
Figure 18B:
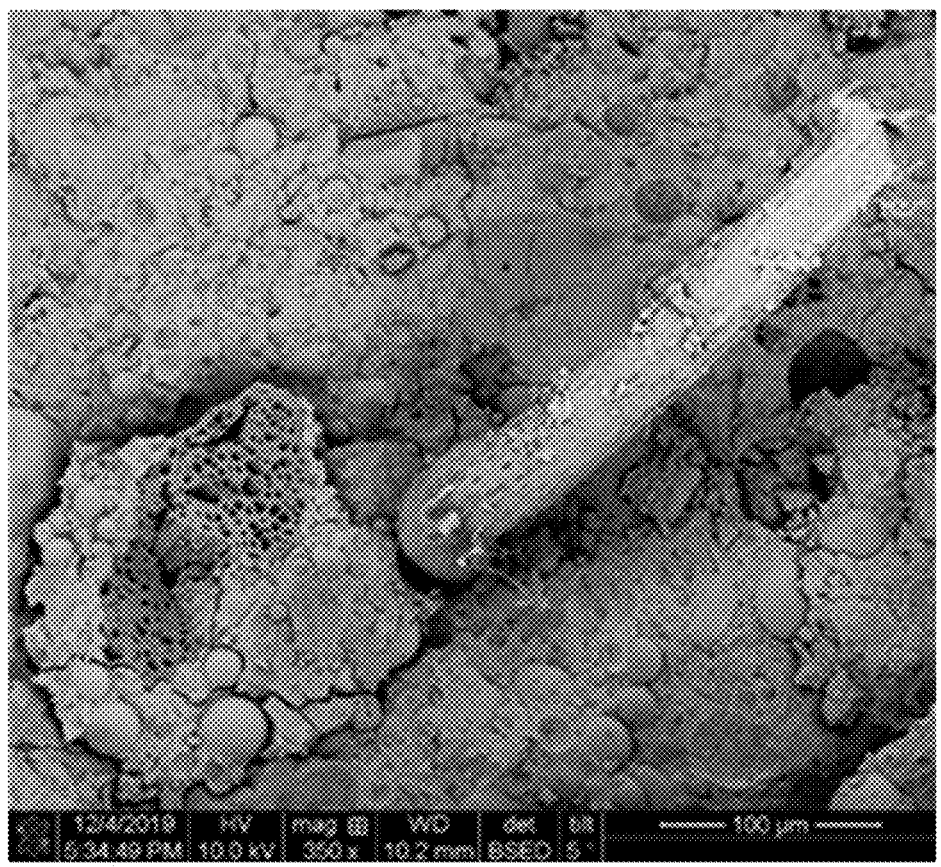

Cylindrical specimens utilized for compressive strength assessment were evaluated for surface resistivity to gain insight on the effect of SCBA on permeability and thus the durability of ECC materials. As shown in FIG. 18A, the surface resistivity of all SCBA-ECC mixtures was lower than that of the control ECC mixture. From FIG. 18A, a clear negative trend was observed between the SCBA content and surface resistivity. The control ECC mixture exhibited a surface resistivity of 23.9 KOhm-cm, which qualified as low chloride ion penetrability (CIP) as per DOTD TR233 (i.e., 21.0-37 KOhm-cm falls under low CIP) which decreased to moderate for all SCBA-ECC mixtures (i.e., 12.0-21. KOhm-cm falls under moderate CIP). The decrease in surface resistivity observed may be attributed to the increasing air content in ECC mixtures as the SCBA content was increased (as shown in Table 5). It is important to note that the air voids provide empty spaces inside the concrete material; which in turn, increases its permeability and decreases its resistivity value. Another possible reason for the decrease in surface resistivity is due to the porous nature of SCBA, as presented in FIG. 188. The presence of porous components in the microstructure of the ECC cementitious matrices increases the total porosity of the materials. As such, this can negatively influence the surface resistivity of ECC. Lastly, the carbon present in the SCBA may affect the electrical conductivity of the ECC materials producing a decrease in the electrical resistivity of SCBA-ECC mixtures.

Drying Shrinkage

Figure 19:
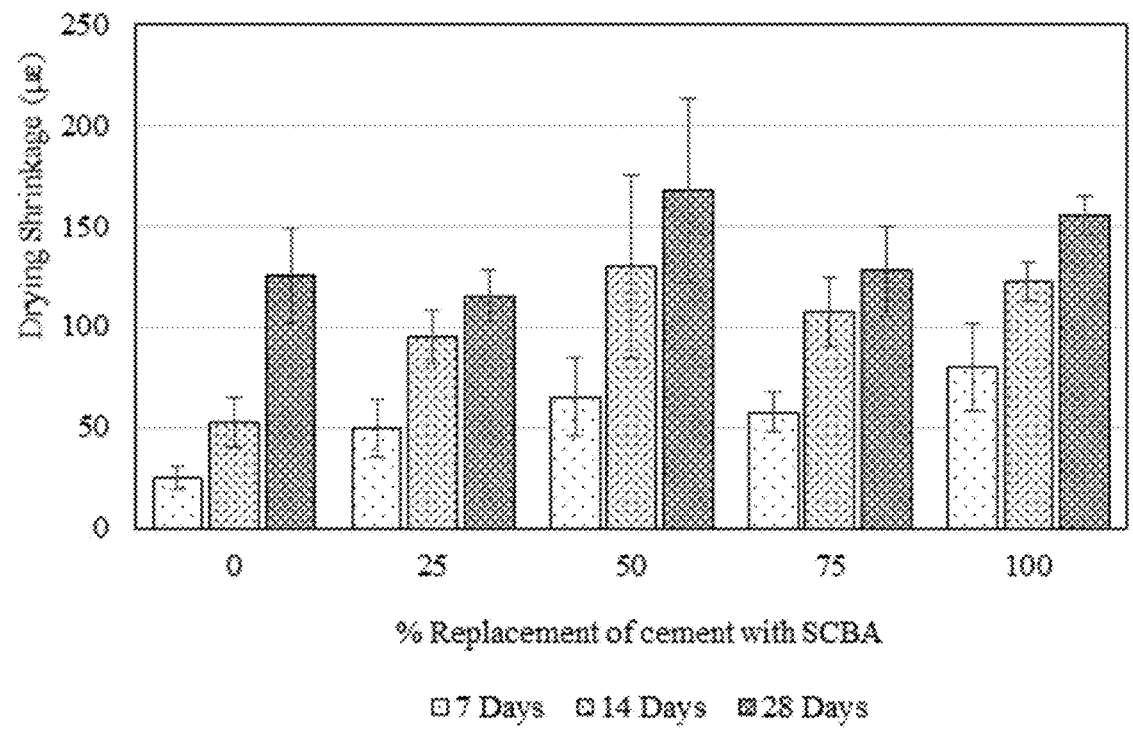
FIG. 19 is a graph of ECC drying shrinkage according to various embodiments of the present disclosure.

The results of the drying shrinkage test at 7, 14 and 28 days of curing are shown in FIG. 19. The drying shrinkage value for all ECC mixtures presented in FIG. 19 is the average measurement of four specimens. The results presented in FIG. 19 show that, with the exception of M-25 at 28 days of curing, the drying shrinkage of all SCBA-ECC materials is higher than that of control at all ages of curing. Previous studies concluded that the drying shrinkage decreases with the addition of larger-size aggregates due to the restraining action of coarser aggregate in the mortar (Liu et al. 2016; Mustafa et al. 2009). In this study, the particle size of the SCBA is smaller than that of the sand used in the control ECC. Therefore, the increase in drying shrinkage may be mainly attributed to the smaller particle size of SCBA which reduces the shrinkage restraining action of aggregates. Furthermore, the increase in the drying shrinkage may be partially attributed to the highly porous nature of SCBA. Since SCBA-ECC mixtures are more porous than control ECC, it is likely that SCBA-ECC have additional capillary pores; thus, resulting in an increased loss of free water to the environment (Chatveera and Lertwattanaruk 2011). It is important to note that no evident trend was observed between shrinkage and increasing contents of SCBA. At 28 days of curing, drying shrinkage compared to control increased by 34%, 2%, and 24% for M-50, M-75 and M-100, respectively. Furthermore, for M-25, drying shrinkage compared to control decrease slightly (i.e., 8%) at 28 days of curing.

Summary and Conclusion

The study in the present example investigated the effects of sugarcane bagasse ash (SCBA) on the fresh and hardened properties of ECC materials when utilized as a partial and complete replacement of sand. Furthermore, this study explored the effects of SCBA on the fiber-bridging relation of the composites. Based on the experimental results, the following conclusions can be drawn:

Through SEM-EDS analysis it was revealed that the SCBA utilized in this study consisted mainly of small (i.e., 256 μm average particle size) porous and irregularly shaped particles with carbon and silica as its main constituents. In addition, the pozzolanic component ($SiO_2+A_2O_3+Fe_2O3$) of SCBA was determined to be 52.68%; thus, meeting ASTM C618 minimum requirement to be classified as a class C pozzolan. Furthermore, XRD analysis unveiled an amorphous phase in SCBA of 52.9% suggesting the presence of amorphous reactive silica. Moreover, SCBA exhibited a SAI of 72.1% which was greater than that of inert silica sand (i.e., 63.72%); thus, confirming pozzolanic and/or filler activity.

Increasing replacements of sand with SCBA in ECC resulted in a substantial loss in workability which was mainly attributed to the irregular particle shape and small particle size of SCBA. Loss in workability was successfully mitigated by incrementing the dosage HRWR; yet, at high replacement levels of sand with SCBA, the dosage of HRWR necessary to achieve a workable mixture produced a considerable increase in air content (i.e., air content increased from 1.4% for control up to 5.8% for 100% sand replacement with SCBA).

The incorporation of SCBA as sand replacement produced minor effects on the compressive strength of ECC materials. As the SCBA content increased, the compressive strength tended to decrease slightly (excepting M-100 compared to M-75) with the maximum strength decrease of 11% occurring at 75% sand replacement with SCBA. The decrease in compressive strength was attributed to a decrease in hardened density and an increase in air content of SCBA-ECC with increasing replacements of sand with SCBA.

The tensile ductility of ECC materials was notably improved by the incorporation of SCBA. An improvement in tensile ductility of up to 311% compared to control was observed for SCBA-ECC materials at 100% replacement of sand with SCBA. The enhancement in the tensile ductility of ECC materials with SCBA was attributed to the combined effect of the reduction of $J_{tip}$ and the increase in $J_b'$. The reduction in $J_{tip}$ was credited to the decrease in aggregate particle size and the increase in air content. While $J_b'$ increase, was associated to the potential decrease in the fiber/matrix chemical bond ($G_d$) and an enhanced fiber dispersion. In the case of tensile strength, all SCBA-ECC materials outperformed control with the greatest improvement in tensile strength of 22.3% occurring at 25% sand replacement with SCBA. The tensile strength improvements observed were attributed to the pozzolanic and/or filler effect of the SCBA material which likely enhanced the microstructure of the ECC cementitious matrix; thus, Increasing the fiber/matrix frictional bond ($\tau_0$).

Fiber-bridging relations obtained from SCTT suggested that in terms of fiber/matrix interfacial properties, the most effective type of ECC mixture to maximize tensile ductility was M-50 as it exhibited the highest $J_b'$ (i.e., 582.32 J/n). Interestingly, M-50 was the SCBA-ECC material with the lowest tensile strain capacity. This finding implied that the effect of SCBA in reducing $J_{tip}$ may be the predominant effect in the enhancements in tensile ductility observed and not its effect on fiber/matrix interfacial properties. It is important to mention that the fiber-bridging relations obtained through SCTT did not always exhibit one single crack, especially for ECC with high SCBA content. As such, it may be possible that a single crack can be consistently obtained SCTT utilizing a reduced fiber content (i.e., 1% volume fraction or lower).

The surface resistivity of ECC was negatively affected by the addition of SCBA. As sand replacement with SCBA increased, surface resistivity decreased accordingly. The decrease in surface resistivity was attributed to the increment in air content, the presence of porous SCBA particles, and the possible electrical conductivity enhancement effect of carbon particles present in SCBA.

Apart from M-25 at 28 days of curing, the drying shrinkage of all SCBA-ECC materials was higher than that of control at all ages of curing. The general increase in drying shrinkage observed was mainly attributed to the smaller particle size of SCBA which likely reduced the shrinkage restraining action of aggregates.

Example 4 References

ACI (American Concrete Institute) Committee 212. 2016. ACI 212.3 R-16 *Report on Chemical Admixtures for Concrete*. ACI, Farmington Hills, MIACI Committee 212. (2016). ACI 212.3 R-16 *Report on Chemical Admixtures for Concrete*.

Arce, G., Noorvand, H., Hassan. M., and Rupnow, T. (2018). "Evaluation of the Performance of Engineered Cementitious Composites (ECC) Produced from Local Materials." *International Congress on Polymers in Concrete (ICPIC 2018)*, (17), 181-186.

Arce, G., Noorvand, H., Hassan. M., and Rupnow, T. (2018). "Evaluation of the Performance of Engineered Cementitious Composites (ECC) Produced from Local Materials." No. 17CLSU05.2018.

ASTM (American Society of Civil Engineers). 2018. *ASTM C39/C39M—Standard Test Method for Compressive Strength of Cylindrical Concrete Specimens*. ASTM, West Conshohocken, Pa.

ASTM (American Society of Civil Engineers). 2013. *ASTM C311/C311M Standard Test Methods for Sampling and Testing Fly Ash or Natural Pozzolans for Use in Portland-Cement Concrete*. ASTM, West Conshohocken, Pa.

ASTM (American Society of Civil Engineers). 2010. *ASTM C109 Standard Test Method for Compressive Strength of Hydraulic Cement Mortars (Using 2-in. or[50-mm] Cube Specimens)*. ASTM, West Conshohocken, Pa.

ASTM (American Society of Civil Engineers). 2010. *ASTM C138/138M Standard Test Method for Density (Unit Weight), Yield, and Air Content (Gravimetric)*. ASTM, West Conshohocken, Pa.

ASTM (American Society of Civil Engineers). 2016. *ASTM C157/157M Standard Test Method for Length Change of Hardened Hydraulic-Cement Mortar and Concrete*. ASTM, West Conshohocken, Pa. 1-7.

ASTM (American Society of Civil Engineers). 2016. *ASTM C192/192M Standard Practice for Making and Curing Concrete Test Specimens in the Laboratory*. ASTM, West Conshohocken, Pa.

ASTM (American Society of Civil Engineers). 2014. *ASTM C618 Standard Specification for Coal Fly Ash and Raw or Calcined Natural Pozzolan for Use in Concrete*. ASTM, West Conshohocken, Pa.

ASTM (American Society of Civil Engineers). 2006. *ASTM C642 Standard test method for density, absorption, and voids in hardened concrete. American Society for Testing and Materials*. ASTM, West Conshohocken, Pa.

ASTM (American Society of Civil Engineers) 2017. *ASTM C778 Standard Specification for Standar Sand*. ASTM, West Conshohocken, Pa.

Chatveera, B., and Lertwattanaruk, P. (2011). "Durability of conventional concretes containing black rice husk ash." *Journal of Environmental Management*, Elsevier Ltd, 92(1), 59-66.

Cordeiro, G. C., Toledo Filho, R. D., and Fairbairn, E. M. R. (2009). "Effect of calcination temperature on the pozzolanic activity of sugar cane bagasse ash." *Construction and Building Materials*, Elsevier Ltd, 23(10), 3301-3303.

D. B. Marshal, and B. N. Cox. (1988). "A J-integral method for calculating steady-state matrix cracking stresses in composites." *Mechanics of Materials*, 7.127-133.

Govindarajan, D., and Jayalakshmi, G. (2011). "XRD, FTIR and Microstructure Studies of Calcined Sugarcane Bagasse Ash." *Advances in Applied Science Research* 2.3, 2(3), 544-549.

Gustavo J. Parra-Montesinos Hans W. Reinhardt, and Naaman, A. E. (2005). *High Performance Fiber Reinforced Cement Composites 6*.

Japan Society of Civil Engineers. (2008). "Applications and Recommendations for Design and Construction of High Performance Fiber Reinforced Cement Composites with Multiple Fine Cracks (HPFRCC) Testing Method." *Concrete Engineering Series*, 82, 6-10.

Kanda, T., and Li, V. C. (2006). "Practical Design Criteria for Saturated Pseudo Strain Hardening Behavior in ECC." *Journal of Advanced Concrete Technology*, 4(1), 59-72.

Kim, J. K., Kim, J. S., Ha, G. J., and Kim, Y. Y. (2007). "Tensile and fiber dispersion performance of ECC (engineered cementitious composites) produced with ground granulated blast furnace slag." *Cement and Concrete Research*, 37(7), 1096-1105.

Koker, D. De, and Van zijl G. P. A. G. (2004). "Extrusion of engineered cement-based composite material." *BEFIB*, 1301-1310.

LaDOTD. (2018). *Surface Resistivity Indication of Concrete's ability to Resist Chloride Ion Penetrability*. Louisiana Department of Transportation and Development, Baton Rouge, La.

Lepech, M., and V. C. L. (2003). "Preliminary findings on size effect in ECC structural members in flexure." *Brittle Matrix Composites* 7, 57-66.

Li, B. V. C., and Leung, C. K. Y. (1993). "Steady-state and multiple cracking of short random fiber composites." *Journal of Engineering Mechanics*, 118(11), 2246-2264.

Li, M. L.; V. C. (2013). "Rheology, fiber dispersion, and robust properties of Engineered Cementitious Composites." *Materials and Structures*, 46(3), 405-420.

Li, V. C. (1992). "Postcrack Scaling relations for fiber reinforced cementitious composites." *Journal of Materials in Civil Engineering*, 4(1), 41-57.

Li, V. C. (1993). "From micromechanics to structural engineering—the design of cementitous composites for civil engineering applications."

Li, V. C. (2003). "On engineered cementitious composites (ECC). A review of the material and its applications." *Journal of Advanced Concrete Technology*, 1(3), 215-230.

Li, V. C. (2007). "Engineered Cementitious Composites (ECC)—Material, Structural, and Durability Performance." *Concrete Construction Engineering Handbook*, 1-15.

Li, V. C. (2008). *Material, Structural, and Durability Performance, Concrete, Construction, Engineering Handbook*.

Li, V. C. (2012). "Tailoring ECC for Special Attributes: A Review." 6(3), 135-144.

Li, V. C., Wu, C., Wang, S., Ogawa, A., and Saito, T. (2003). "Interface Tailoring for Strain-Hardening Polyvinyl Alcohol-Engineered Cementitious Composite." *Material Journal*, 99(5), 463-472.

Liu, J., Han, F., Cui, D., Zhang, Q., Lv. J., Zhang, L., and Yang, Z. (2016). "Combined effect of coarse aggregate and fiber on tensile behavior of ultra-high performance concrete."*Construction and Building Materials*, 121, 310-318.

Ma, H., Qian, S., Zhang, Z., Lin, Z., and Li, V. C. (2015). "Tailoring Engineered Cementitious Composites with local ingredients." *CONSTRUCTION & BUILDING MATERIALS*, Elsevier Ltd, 101, 584-595.

Modani, P. O., and Vyawahare, M. R. (2013). "Utilization of bagasse ash as a partial replacement of fine aggregate in concrete." *Procedia Engineering*, Elsevier B. V., 51(NUiCONE 2012), 25-29.

Moseley, M. D., R. P. Ojdrovic, and H. J. P. (1987). "Influence of Aggregate Size on Fracture Toughness of Concrete." *Theoretical and applied fracture Mechanics*, 7(3), 201-210.

Mustafa, Ş., Lachemi, M., Hossain, K. M. A., Ranade, R., and U. V. C. (2009). "Influence of Aggregate Type and Size on Ductility and Mechanical Properties of Engineered Cementitious Composites." *ACI Materials Journal*, 106(3), 308-316.

Nallathambi, P., Karihaloo, B. L., and Heaton, B. S. (1984). "Effect of specimen and crack sizes, water I cement ratio and coarse aggregate texture upon fracture toughness of concrete." *Magazine of Concrete Research*, 36(129), 227-236.

Noorvand, H., Arce, G., Hassan, M., and Rupnow, T. (2019). "Investigation of the Mechanical Properties of Engineered Cementitious Composites with Low Fiber Content and with Crumb Rubber and High Fly Ash Content." *Transportation Research Record*, 2673(5), 418-428.

Payá, J., Monzó, J., Borrachero, M. V., Diaz-Pinzón, L., and Ordónez, L. M. (2002). "Sugar-cane bagasse ash (SCBA): Studies on its properties for reusing in concrete production."*Journal of Chemical Technology and Biotechnology*, 77(3), 321-325.

Perdikaris, P. C., and Romeo, A. 1995. (1995). "Size effect on fracture energy of concrete and stability issues in three-point bending fracture toughness testing. 92(5):" *ACI Materials Journal*, 92(5), 483-496.

Pereira, E. B., Fischer, G., and Barros, J. A. O. (2012). "Direct assessment of tensile stress-crack opening behavior of Strain Hardening Cementitious Composites (SHCC)." *Cement and Concrete Research*, 42(6), 834-846.

Redon, C., U, V. C., Wu, C., Hoshiro, H., Saito, T., and Ogawa, A. (2001). "Measuring and modifying interface properties of PVA fibers in ECC matrix." *Journal of Materials in Civil Engineering*, 13(6), 399-406.

Sales, A., and Lima, S. A. (2010). "Use of Brazilian sugarcane bagasse ash in concrete as sand replacement." *Waste Management*, Elsevier Ltd, 30(6), 1114-1122.

Subedi, S., Arce, G., Hassan, M., Kumar, N., Barbato, M., and Gutierrez-wing, M. T. (2019). "Influence of Production Methodology on the Pozzolanic Activity of Sugarcane Bagasse Ash." *MAT EC Web of Conferences*, 1-5.

Turk, K. (2013). "The mechanical properties of engineered cementitious composites containing limestone powder replaced by microsilica sand." *Canadian Journal of Civil Engineering*, 40(2), 151-157.

Wang, S., and Li, V. C. (2006). "High-early-strength engineered cementitious composites." *ACI Materials Journal*, 103(2), 97-105.

Wang, S., and Li, V. C. (2007). "Engineered Cementitious Composites with High-Volume Fly Ash."

Wu, Hao-Liang; Jing Yu, D. Z. J.-X. Z. V. C. L. (2019). "Effect of morphological parameters of natural sand on mechanical properties of engineered cementitious composites." *Cement and Concrete Composites*, 100, 108-119.

Wu, C. (2001). "Micromechanical tailoring of PVA-ECC for structural applications."

Yang, E., Wang, S., Yang, Y., and Li, V. C. (2008). "Fiber-Bridging Constitutive Law of Engineered Cementitious Composites." *Journal of Advanced Concrete Technology*, 6(1), 181-193.

Yang, E., Yang, Y., and Li, V. C. (2007). "Use of High Volumes of Fly Ash to Improve ECC Mechanical Properties and Material Greenness." *ACI Materials Journal*, 104(6), 620-628.

Yang, Y., M. D., L., Yang, E. H., and U, C. V. (2009). "Autogenous healing of engineered cementitious composites under wet-dry cycles." *Cement and Concrete Research*, 39(5), 382-390.

Zhou, J., Qian, S., Sierra Beltran, M. G., Ye, G., van Breugel, K., and Li, V. C. (2010). "Development of engineered cementitious composites with limestone powder and blast furnace slag." *Materials and Structures*, 43(6), 803-814.

Example 5

The objective of the study in the present example was to assess the influence of sugarcane bagasse sand (BS) on the mechanical properties of ECC materials when used as a replacement to silica sand. The study investigated the mechanical properties of ECC produced with five levels of silica sand replacement including 0%, 25%, 50%, 75%, and 100% replacement (by volume) with BS.

Test Materials.

Figures 20A, 20B:
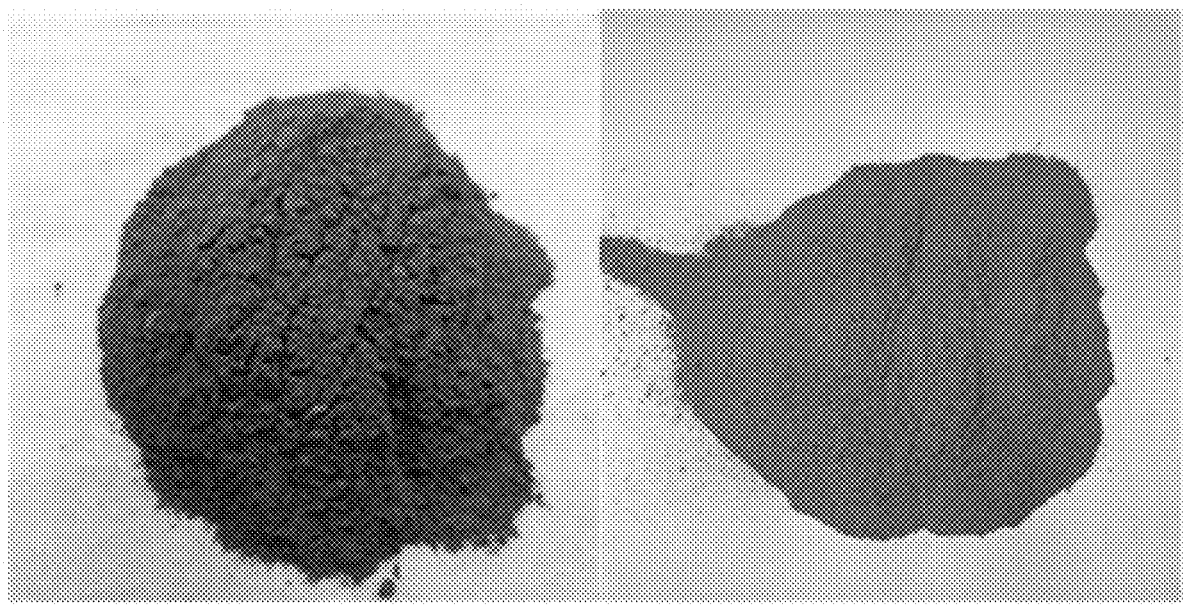
FIGS. 20A-20B are camera images of the SCBA preparation process according to various embodiments of the present disclosure.

The materials used in the production of ECC were locally-available ingredients to decrease the cost of ECC. SCBA used in this study was collected from Alma Plantation in Lakeland, La. (USA). The collected SCBA was first dried for approximately 14 hours at 45° C. to remove moisture. Subsequently, a sieve opening of 1.18 mm (i.e., No. 16 sieve) was utilized to remove the coarse impurities such as gravel or unburnt fibers from SCBA, which remained during the uncontrolled combustion process in sugar mill boilers. Then, the sieved material (FIG. 20A) was burned under controlled conditions for six hours at 550° C. Finally, the burned material was allowed to cool inside the oven until it reached a temperature of 80° C. (FIG. 20B).

Figure 21A:
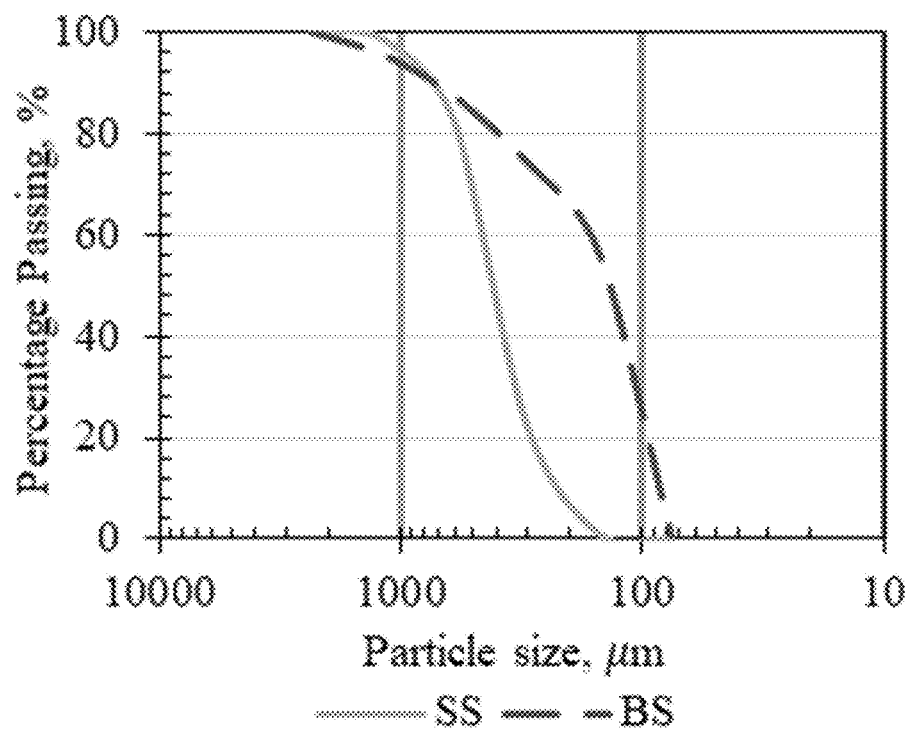
FIGS. 21A-21B are graphs illustrating (bagasse ash sand) BS and (silica sand) SS particle size distribution according to various embodiments of the present disclosure.
Figure 21B:
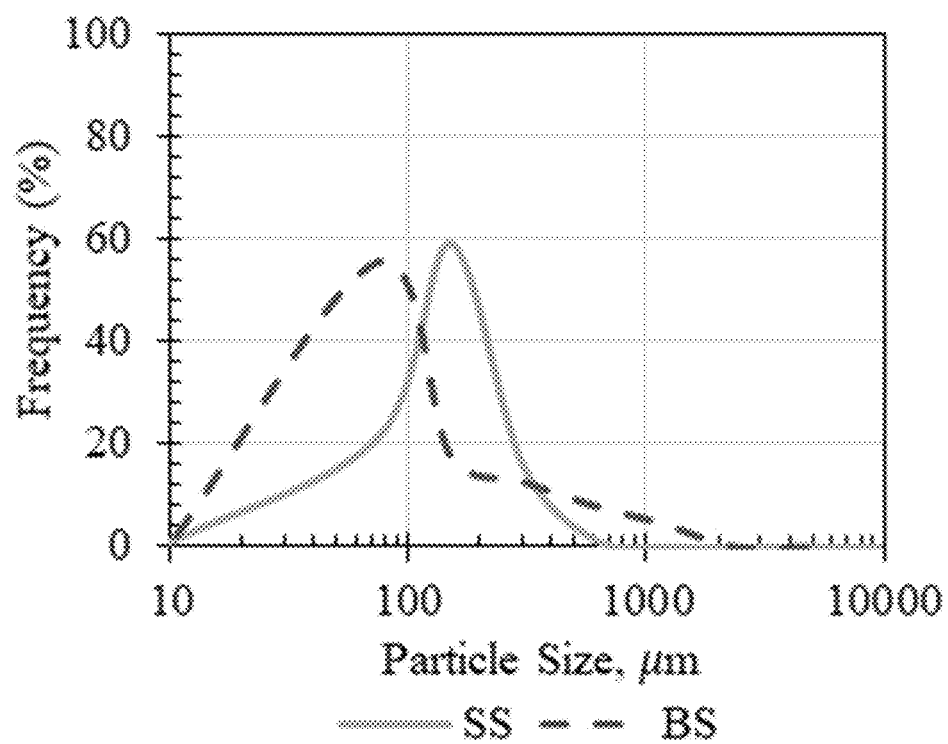

Based on the particle size and chemical composition of SCBAs, they have the potential to be implemented as SCMs and/or fine aggregate in cementitious composites. Therefore, a 75 µm sieve aperture was used to separate the materials that have the potential to be implemented as SCMs and fine aggregate. In this study, the retained material was used as a sand replacement for the production of ECC and was named bagasse sand (BS). The specific gravity of the produced BS was 2.5. Moreover, the produced BS has a maximum particle size and fineness modulus of 1.18 mm and 1.86, respectively. FIGS. 21A-21B illustrate the particle size distribution of BS and silica sand obtained from sieve analysis. As observed in FIGS. 21A-21B, BS has a finer particle size than the silica sand.

Figure 22A:
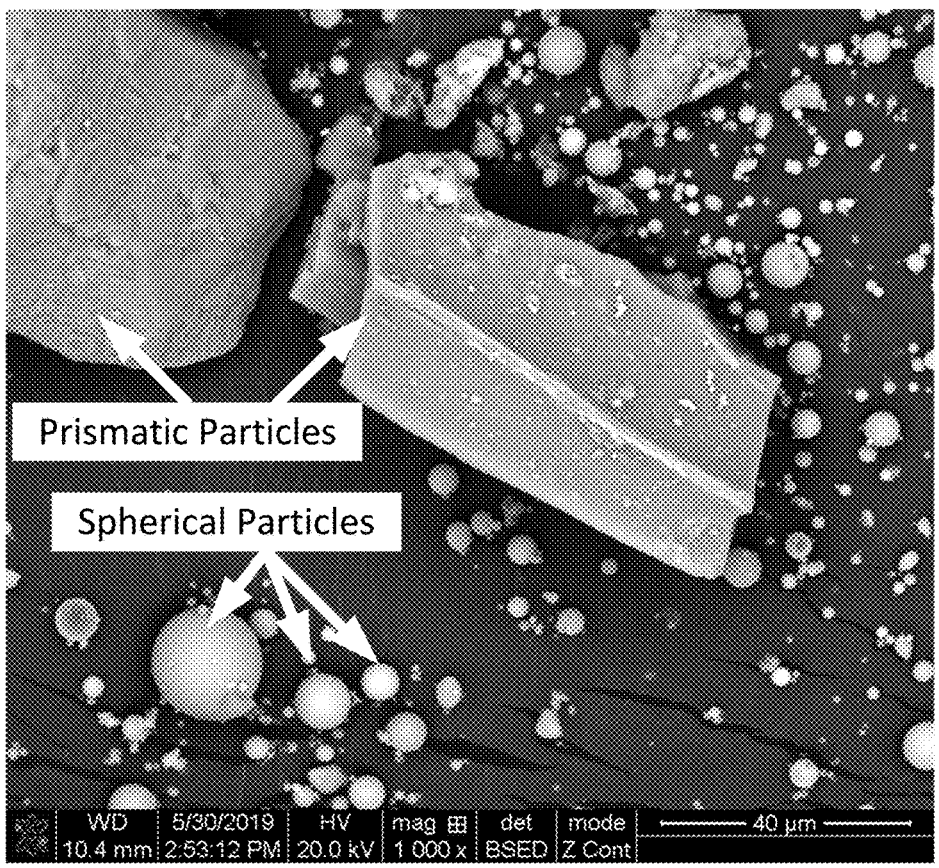
FIGS. 22A-22B provide examples of SEM images of bagasse ash sand.
Figure 22B:
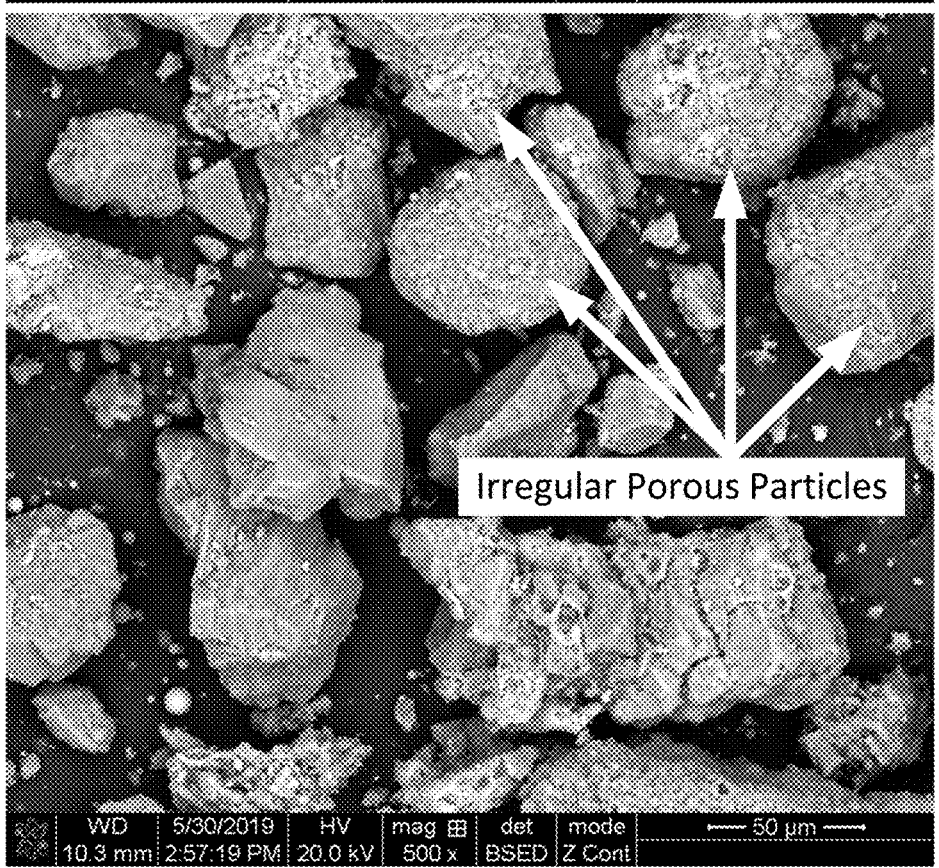

To gain insight on the morphology of BS, a scanning electron microscopy (SEM) was conducted by utilizing Quanta™ 3D Dual Beam™ FEG FIB-SEM with EDAX Pegasus EDS/EBSD detectors. FIGS. 22A-22B present the morphology of SCBA obtained from backscattered electron (BSE) SEM imaging. From FIGS. 22A-22B, it can be observed that BS consists of particles with varied shapes and sizes such as irregular porous particles, angular prismatic particles, and spherical particles. While irregular particles may be attributed to amorphous silica, prismatic particles were likely to be crystalline silica. The presence of prismatic crystalline silica may be attributed to soil adhered to sugarcane during harvest. Moreover, the spherical particles were formed most likely due to the melting of particles when calcinated at high temperatures (Bahurudeen and Santhanam 2015). Furthermore, the chemical composition of BS, determined from energy dispersive spectroscopy (EDS), is presented in Table 5.1. The oxide composition of BS was collected under area mode with an accelerating voltage of 20 kV and a current of 4 pA. From Table 5.1, it can be observed that BS is mainly composed of Silicon dioxide ($SiO_2$). It is important to note that BS exhibited a total pozzolanic component ($SiO_2$+$Al2O3$+$Fe2O3$) of 81.23%; thus, meeting ASTM C618 minimum pozzolanic component requirement to be classified as a Class F and Class N pozzolans (a minimum of 70% for Class F and Class N pozzolans and 50% for Class C pozzolans).

Type I ordinary Portland cement (OPC), class F fly ash (FA), and silica sand (SS) with a maximum particle size and fineness modulus of 1.18 mm and 1.96, respectively, were utilized in this study. The chemical composition of cement and fly ash, obtained X-Ray Fluorescence analysis, is presented in Table 5.1. Non-oil-coated RECS-15 polyvinyl alcohol (PVA) fibers were used throughout this study. Table 5.2 summarizes the properties of the utilized PVA fibers. In addition, a polycarboxylate-based High Range Water Reducer (HRWR) was utilized as an admixture.

TABLE 5.1

Chemical composition of cement and fly ash (weight %)

| Material | $SiO_2$ | $Al_2O_3$ | $Fe_2O_3$ | CaO | MgO | $SO_3$ | $K_2O$ | $Na_2O$ | $CO_2$ |
|---|---|---|---|---|---|---|---|---|---|
| BS | 67.15 | 8.30 | 5.78 | 3.75 | 0.60 | 0.05 | 4.7 | 0.15 | 9.00 |
| Cement | 19.24 | 4.75 | 3.35 | 65.81 | 2.20 | 3.61 | 0.54 | — | — |
| Fly ash | 62.8 | 18.56 | 8.22 | 5.69 | 1.69 | 0.37 | 1.42 | 0.35 | — |

TABLE 5.2

PVA fibers properties

| Fiber Type | Length (mm) | Diameter (μm) | Young's Modulus (GPa) | Tensile Strength (MPa) | Elongation (%) | Density (kg/cm$^3$) |
|---|---|---|---|---|---|---|
| RECS-15 | 8 | 38 | 40 | 1600 | 5.7 | 1300 |

Specimen Preparation.

Cylindrical and dog-bone shaped specimens were cast to assess the compressive and tensile properties of all produced ECC mixtures, respectively, at 28 days of curing. In this study, ECC mixtures utilized similar mix proportions as those of M-2.2 ECC mixture design from previous research (Amador et al. 2018; Noorvand et al. 2019). ECC mixtures were named as M-X, where X is the percentage of sand replacement with BS by volume. The different levels of sand replacement investigated were 0%, 25%, 50%, 75%, and 100% replacement (by volume). The fly ash-to-cement ratio (F/C), water-to-binder ratio (W/B), and fiber content (by volume) were kept constant at 2.2, 0.27, and 1.75%, respectively. The details of the ECC mixture proportions are shown in Table 5.3.

TABLE 5.3

ECC mixture design proportions

| Mix ID | Cement (kg/m$^3$) | Fly Ash (kg/m$^3$) | Water (kg/m$^3$) | Sand (kg/m$^3$) | BS (kg/m$^3$) | BS (%)[1] | HRWR (%)[2] | Fibers (kg/m$^3$) | Fibers (Vol %)[3] |
|---|---|---|---|---|---|---|---|---|---|
| M-0 | 378.5 | 832.6 | 329.2 | 439.0 | 0.0 | 0 | 0.17 | 22.75 | 1.75 |
| M-25 | 378.5 | 832.6 | 329.2 | 329.3 | 104.7 | 25 | 0.37 | 22.75 | 1.75 |
| M-50 | 378.5 | 832.6 | 329.2 | 219.5 | 209.5 | 50 | 0.61 | 22.75 | 1.75 |

TABLE 5.3-continued

ECC mixture design proportions

| Mix ID | Cement (kg/m$^3$) | Fly Ash (kg/m$^3$) | Water (kg/m$^3$) | Sand (kg/m$^3$) | BS (kg/m$^3$) | BS (%)[1] | HRWR (%)[2] | Fibers (kg/m$^3$) | Fibers (Vol %)[3] |
|---|---|---|---|---|---|---|---|---|---|
| M-75 | 378.5 | 832.6 | 329.2 | 109.8 | 314.2 | 75 | 1.2 | 22.75 | 1.75 |
| M-100 | 378.5 | 832.6 | 329.2 | 0.0 | 418.9 | 100 | 2.1 | 22.75 | 1.75 |

Figure 23:
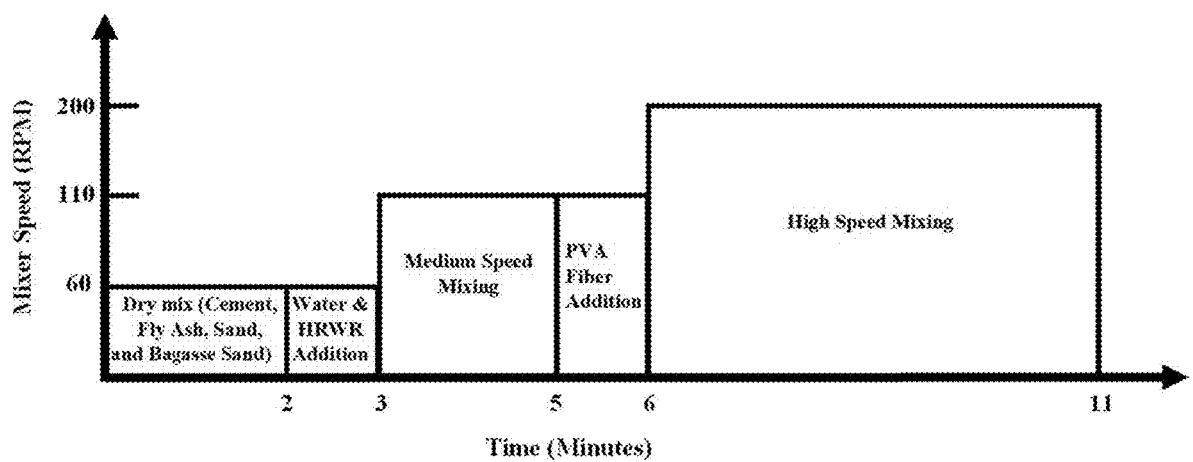
FIG. 23 shows an example of the M2-BS ECC mixing procedure and sequence.

[1] % of sand replacement with BS by volume
[2] % of HRWR by weight of cement
[3] % of fiber content by volume Moreover, all ECC mixtures were prepared using a planetary mixer. Powder compounds (cement, sand, BS, and fly ash) were dry mixed for two minutes. Then, water and HRWR were added slowly in one minute and mixed for an additional two minutes at medium speed. Finally, PVA fibers were added in one minute, followed by five minutes of high-speed mixing. ECC mixing procedure and speed is demonstrated schematically in FIG. 23. Based on the ASTM C 192, the prepared specimens were demolded after 24 hours and cured in water saturated with calcium hydroxide at a controlled temperature of 23 t 2° C. (ASTM Standard C 192 2002).

Experimental Tests.

A test procedure similar to ASTM C39 was carried out to assess the compressive strength of the ECC mixtures. Three 101.6×203.2 mm (4 in×8 in) cylindrical specimens were utilized to measure the compressive strength of ECC mixtures at 28 days of curing. The compression tests were performed using hydraulic pressure at a constant loading rate of 0.25 MPa/s.

Following the recommendation of the Japan Society of Civil Engineers (JSCE) for uniaxial tensile tests on HPFRCCs, dog-bone shaped specimens were cast to characterize the tensile behaviour of ECC mixtures (Japan Society of Civil Engineers 2008). Due to the high variability of the test, a minimum of thirteen dog-bone shaped specimens was cast to conduct the test at 28 days. Dimensions of dog-bone shaped specimens are presented in FIG. 8A. A servo-hydraulic machine with a capacity of 250-kN was used to perform the tensile tests by applying a displacement controlled axial load (at a loading rate of 0.5 mm/min). Two LVDTs were attached at each side of dog-bone shaped specimens to determine the deformation, as shown in FIG. 8B.

Figure 24:
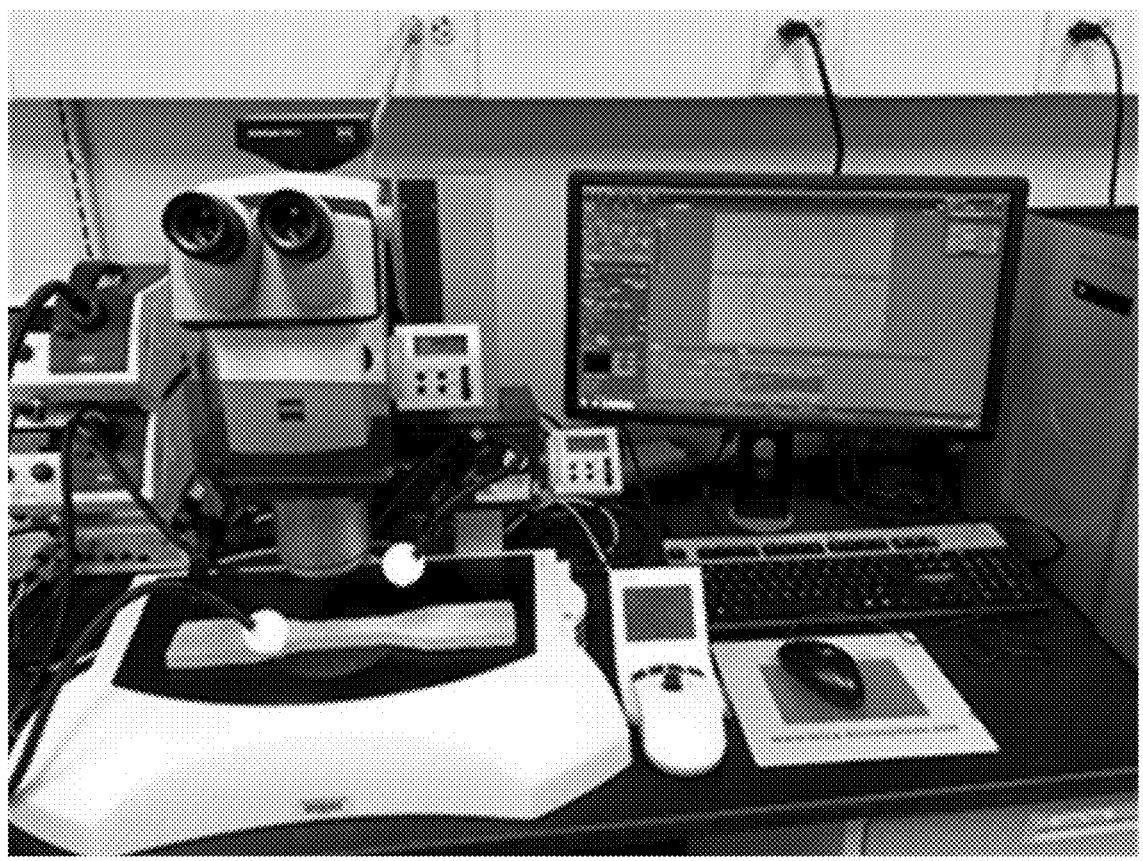
FIG. 24 is an example of a setup for crack analysis, including a ZEISS™ SteREO Lumar V12 microscope.
Figure 25:
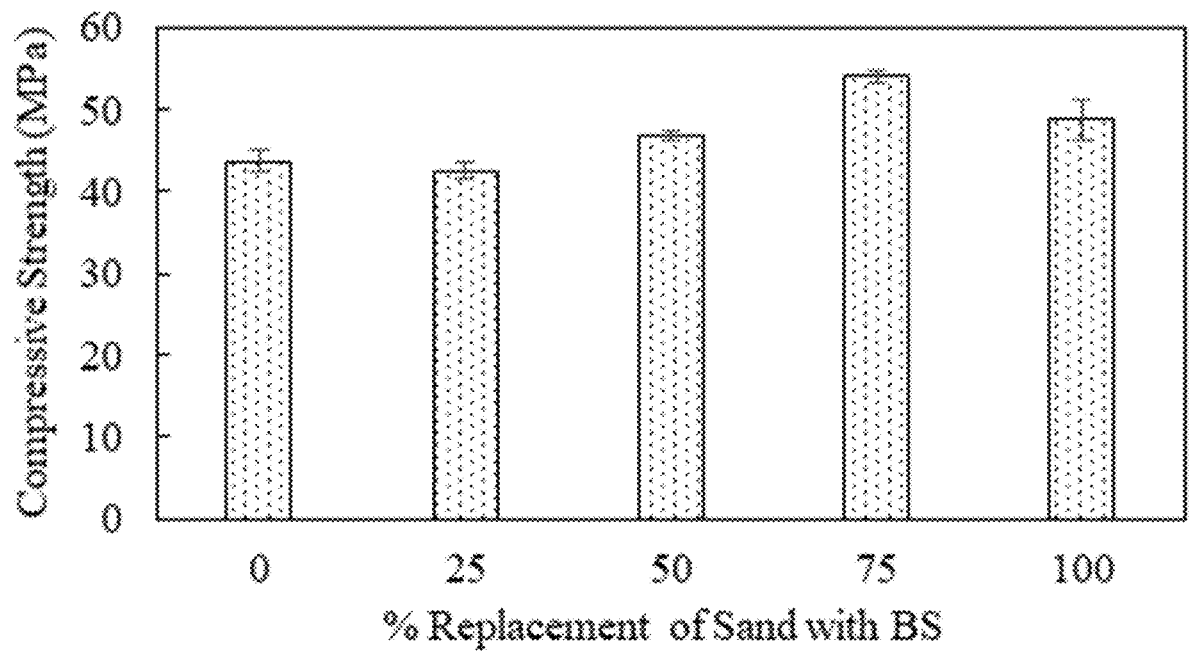
FIG. 25 is a graph showing the average compressive strength of M2-BS ECC at 28 days of curing, according to various embodiments of the present disclosure.

The crack width has been found as an important factor in attaining robust and consistent self-healing behaviour in ECC materials (Li et al. 1994). To this end, after conducting the uniaxial tensile test, an optical microscope (as shown in FIG. 24) was utilized to measure the average residual crack width of tested dog-bone shaped specimens. The width of each crack was measured by digital image analysis at the intersection between the crack and the central axis of the specimen.

Results and Analysis

Compressive Strength.

FIG. 24 shows the 28-day compressive strength results of all ECC mixtures. As shown in FIG. 24, the highest compressive strength of 54 MPa was achieved by M-75 (i.e., ECC mix with 75% of sand replaced with BS), which is considerably higher than the compressive strength of regular concrete (30 MPa). In addition, all BS-ECC mixtures (with an exception of M-25) demonstrated higher strength than that of regular ECC. The increase in the compressive strength of specimens with an increase in BS content can be attributed to the pozzolanic activity of the BS. From EDS analysis (as shown in Table 5.1), it was observed that BS exhibits a significant amount of pozzolanic component (i.e., 81.23%). Therefore, when an inert material such as silica sand (crystalline silica) is replaced with a material with pozzolanic properties such as BS, it is expected that the reactivity of the BS can provide with additional strength to the cementitious matrix; thus, yielding higher compressive strength. Furthermore, another important effect possibly affecting the compressive strength of the material is the well documented filler effect. As BS particles are highly fine, these could also act as a filler material enhancing the microstructure of the cementitious matrix; and therefore, yielding and increased compressive strength.

Uniaxial Tensile Test.

Figure 26A:
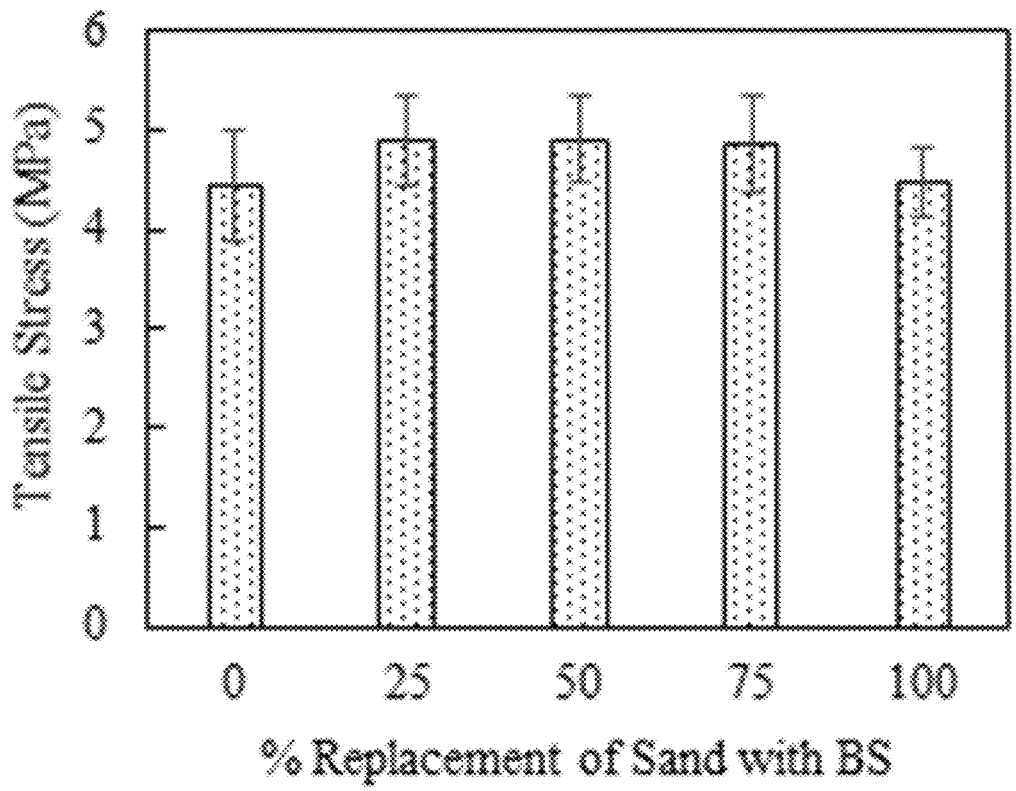
FIGS. 26A-26B are graphs showing uniaxial tensile test results of M2-BS ECC.
Figure 26B:
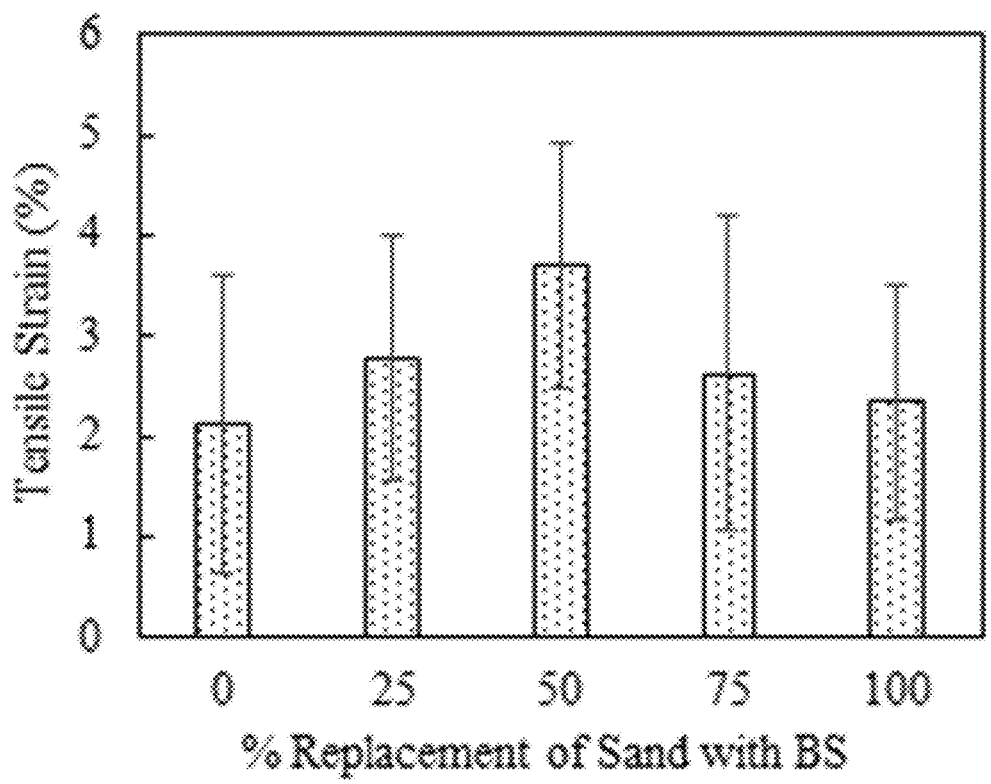
Figure 27A:
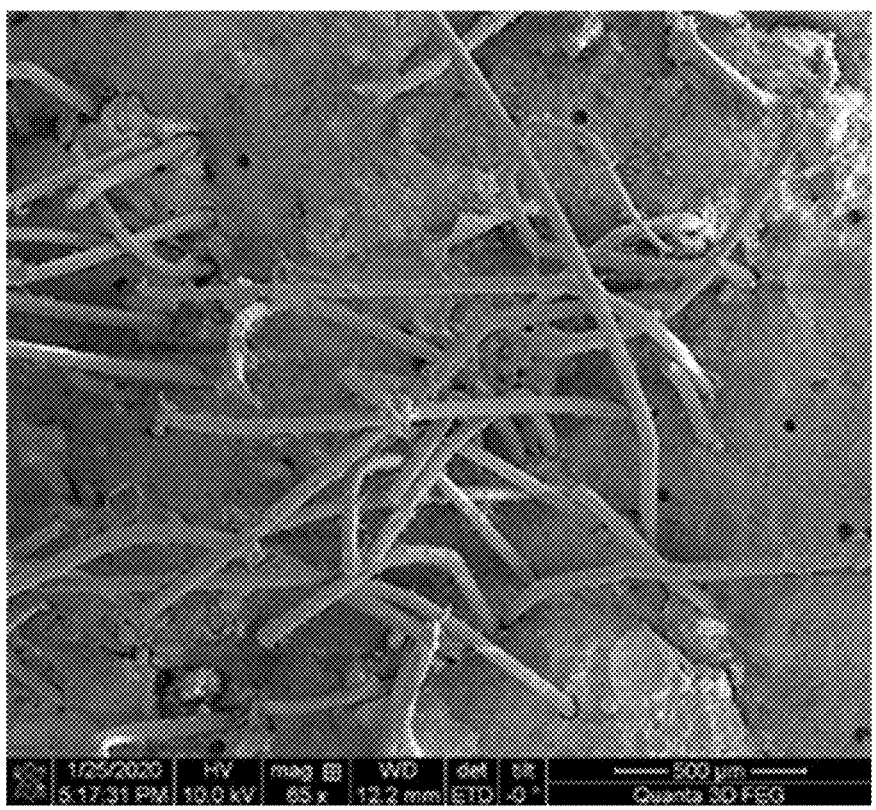
FIGS. 27A-27B are SEM images of ECC Mixtures according to various embodiments of the present disclosure.
Figure 27B:
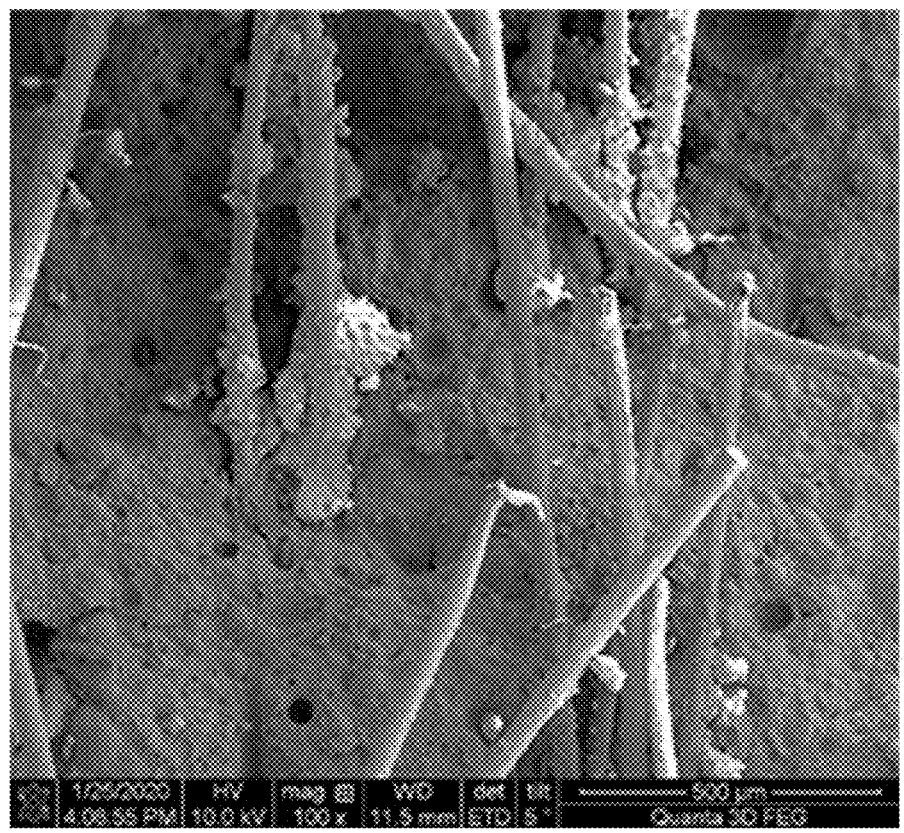

The uniaxial tensile strength and strain capacity of ECC mixtures at 28 days of curing are presented in FIGS. 26A and 26B, respectively. From FIGS. 26A-26B, it is important to notice that the incorporation of BS at all replacement levels led to an increase in the tensile strain capacity in comparison to the regular ECC. For instance, increasing the sand replacement with BS from 0% (M-0) to 50% (M-50) led to an increase in the tensile ductility from 2.12% to 3.71% (75% improvement). While the highest tensile ductility was exhibited by M-50, an increase in the sand replacement with BS beyond 50% did not produce further enhancements in the tensile strain capacity. The increase in tensile ductility by incorporation of BS can be attributed to a higher PSH energy index ([J']_b/J_tip) which favours the PSH multiple cracking mechanisms of ECC materials (Li 2012).

Based on the design principles of ECC materials, the fracture toughness of the cementitious matrix needs to be low to secure the strain-hardening behaviour of ECCs (which allows characteristic ductility of these materials). This is the case since a low matrix fracture toughness, allows for the initiation of steady-state flat cracks in the composite before the tensile stress reaches the fiber-bridging capacity at any given crack. It is well known that the size of aggregate particles has a significant impact on the matrix fracture properties of a cementitious composite, i.e., larger aggregate particles lead to an increase in fracture toughness (Şahmaran et al. 2009). According to the particle size analysis (presented in FIG. 21A-21B), the BS particles are much finer than those of the silica sand utilized in this study. Therefore, the implementation of BS can reduce the fracture toughness of the BS-ECC cementitious matrices, lowering J_tip; and thus, leading to an increase in the PSH energy index (which explains the enhanced ductility).

Another important factor affecting the tensile ductility of ECC is the rheology of the cementitious matrix. Poor fiber distribution and fiber dumping can reduce the effective fiber content at the failure crack; which in turn, negatively affects the tensile performance of ECC materials (Li and Li 2013). A study by Li and Li suggests that to attain a good tensile performance, a fine aggregate should be utilized to sustain uniform fiber dispersion (Li and U 2013). In general, to prevent poor fiber dispersion and clumping in ECC mixtures, aggregate with a particle size smaller than the average fiber spacing should be utilized (Koker and Zijl 2004). Since BS is finer than the silica sand utilized in this study, a more uniform fiber dispersion state was likely achieved by implementing BS; thus, minimizing the probability of creating sections with less effective fiber volume at the crack failure. It is important to notice, however, that at high replacement levels of silica sand with BS (i.e., 75% and 100%) workability was greatly diminished. As such, fiber dispersion can be negatively affected at those high contents of BS; thus, producing an adverse effect in the tensile properties of the composite. This is believed to be the reason for the loss in tensile ductility observed in FIG. 26B.

In terms of the effect of BS in the tensile strength of the composites, incorporation of different levels of sand replacement with BS had minor effects on the tensile strength of BS-ECC mixtures (as shown in FIG. 26A). However, it is important to mention that all BS-ECC mixtures outperformed the tensile strength of control ECC. The highest tensile strength of 4.91 MPa was achieved by M-50, which showed a 10.3% improvement in comparison to the tensile strength of M-0 (4.45 MPa). As in compressive strength, an increase in tensile strength with the increase in BS content may be attributed to the pozzolanic activity and filler effect of BS. Due to these, there is a possibility of fiber/matrix bond enhancement (i.e., mainly frictional bond); thus, leading to an increase in the tensile strength of BS-ECC mixtures.

Figure 28A:
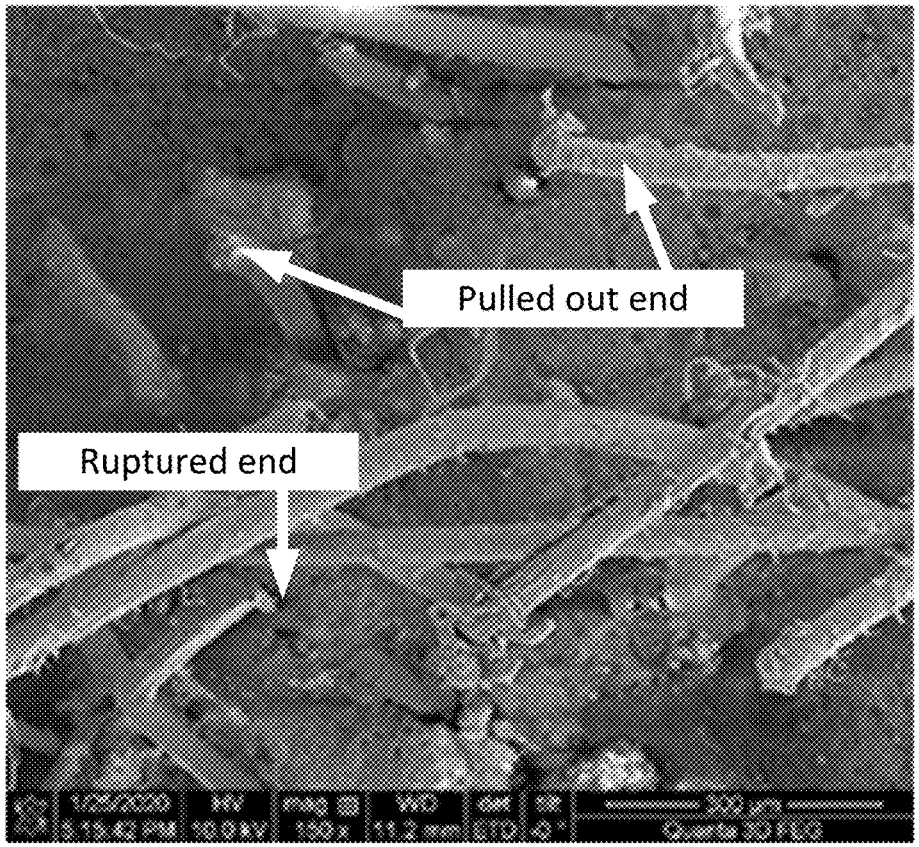
FIGS. 28A-28E are SEM images of ECC mixtures according to various embodiments of the present disclosure.
Figure 28B:
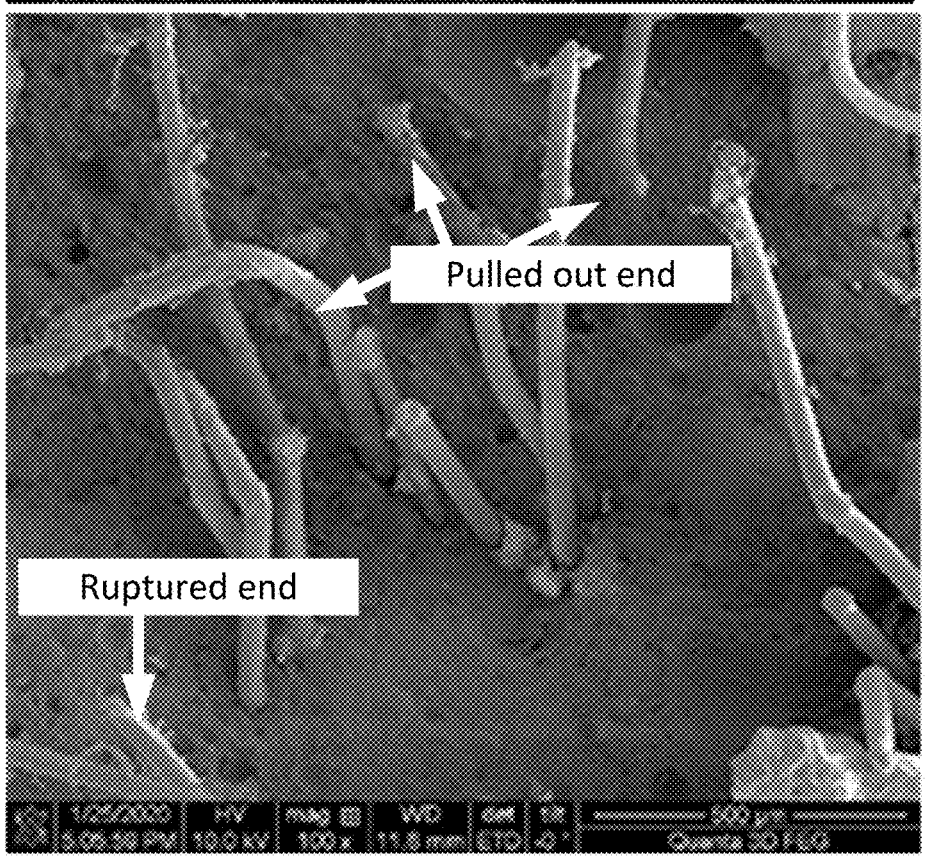
Figure 28C:
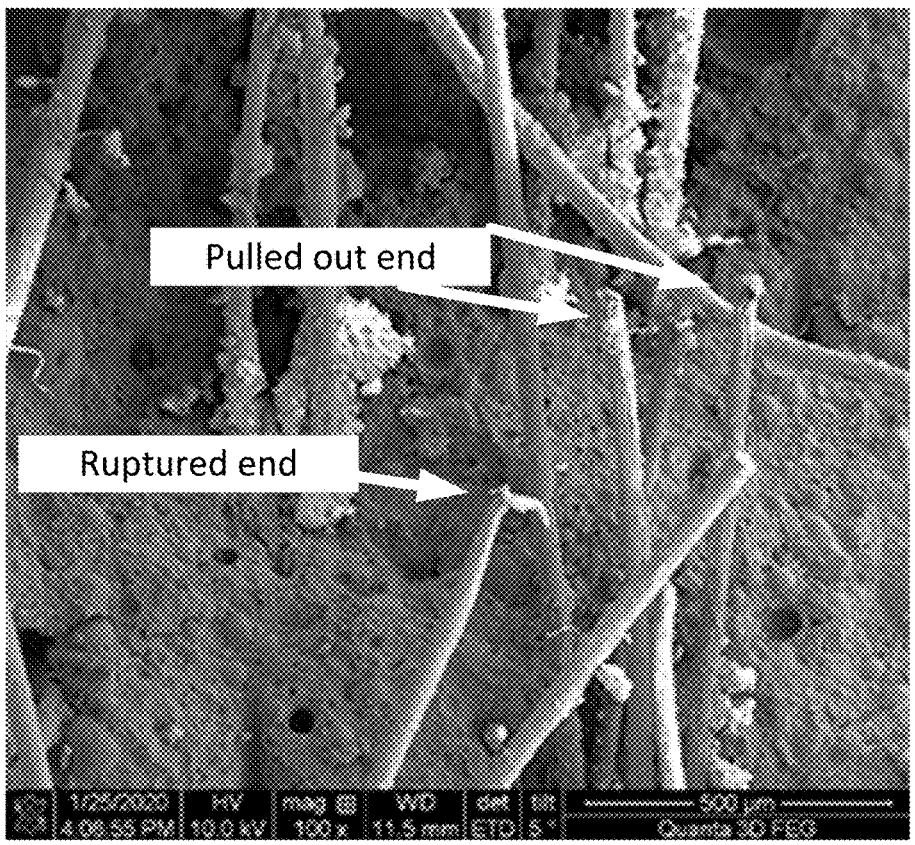
Figure 28D:
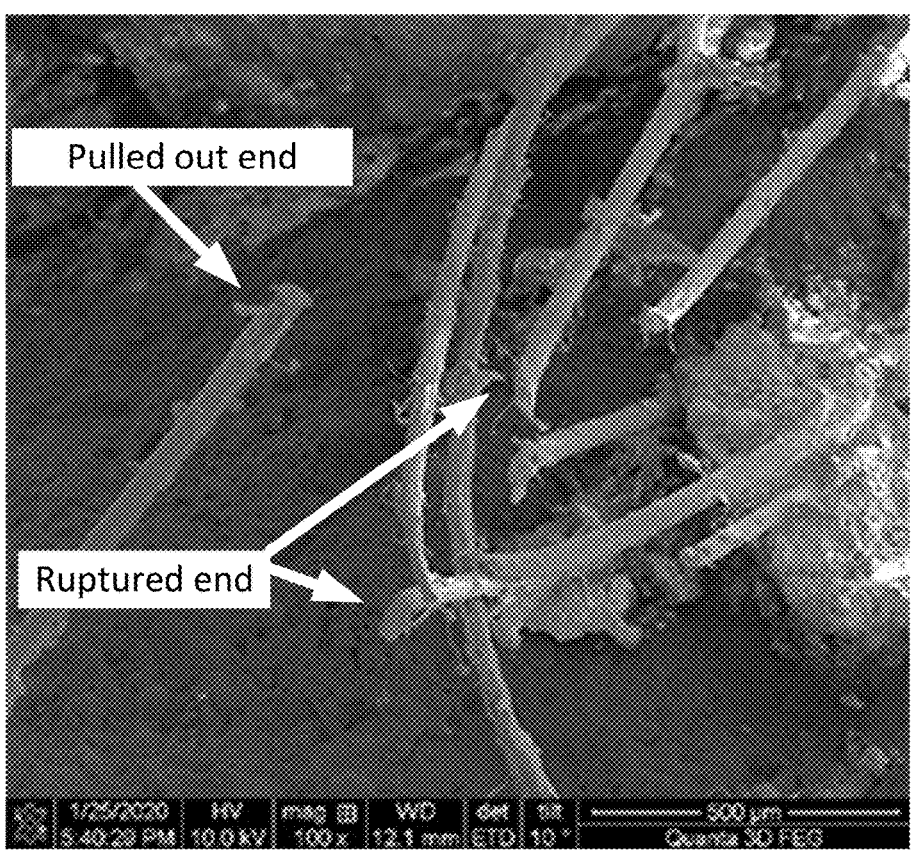
Figure 28E:
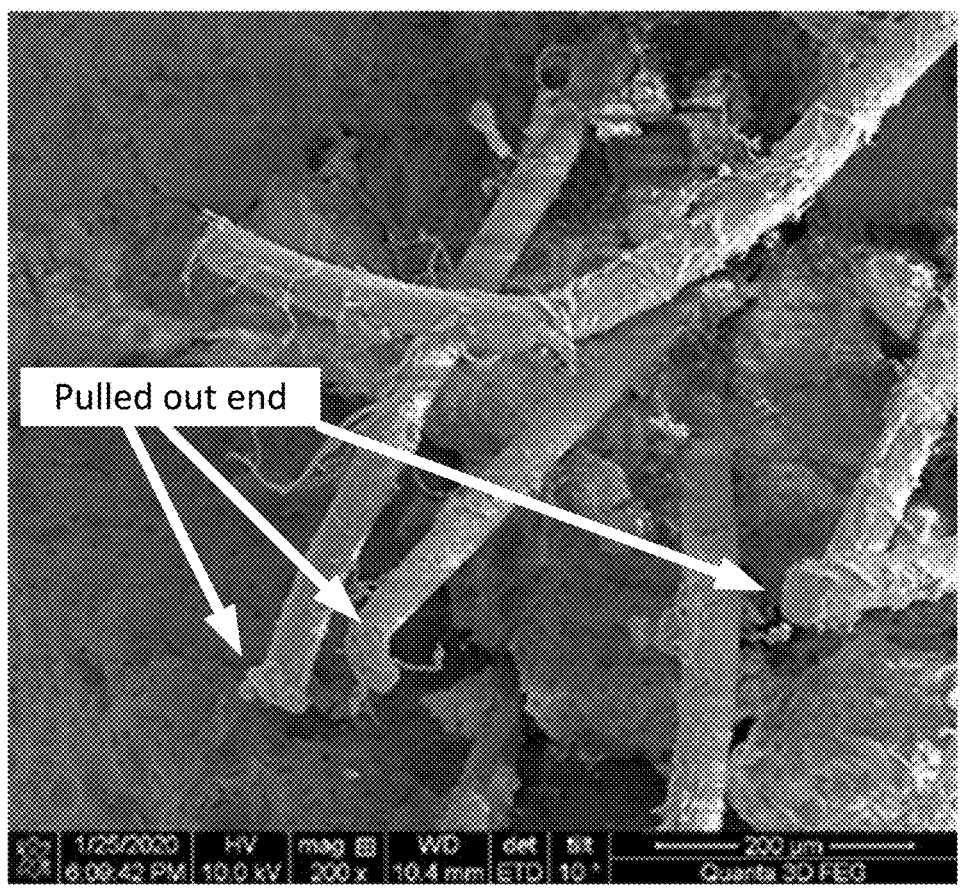

FIGS. 28A-28E presents the SEM images of the pullout fiber in all ECC mixtures. FIG. 28A for M-0 mix shows fibers with a combination of both ruptured end and pulled out end. Ruptured end suggests progressive damage of the fiber when it is pulled out from the matrix. In another words, before exiting the matrix, the embedded fiber travels along with the friction from the matrix resulting in a tip end (Li et al. 2003; Redon et al. 2001). Similar to what was observed in M-0 mixture, a combination of ruptured and pulled out end were observed in M-25, M-50, M-75, M-100 mixes with similar nature of damaged fiber surfaces. Since M-50 exhibited the highest $\sigma\_0$, it was expected that the damage due to debonding (i.e. ruptured end) would be higher for M-50. However, for M-75 more ruptured end along with more abrasion (damage) to the fiber surface is observed in comparison to other mixtures.

Figure 29:
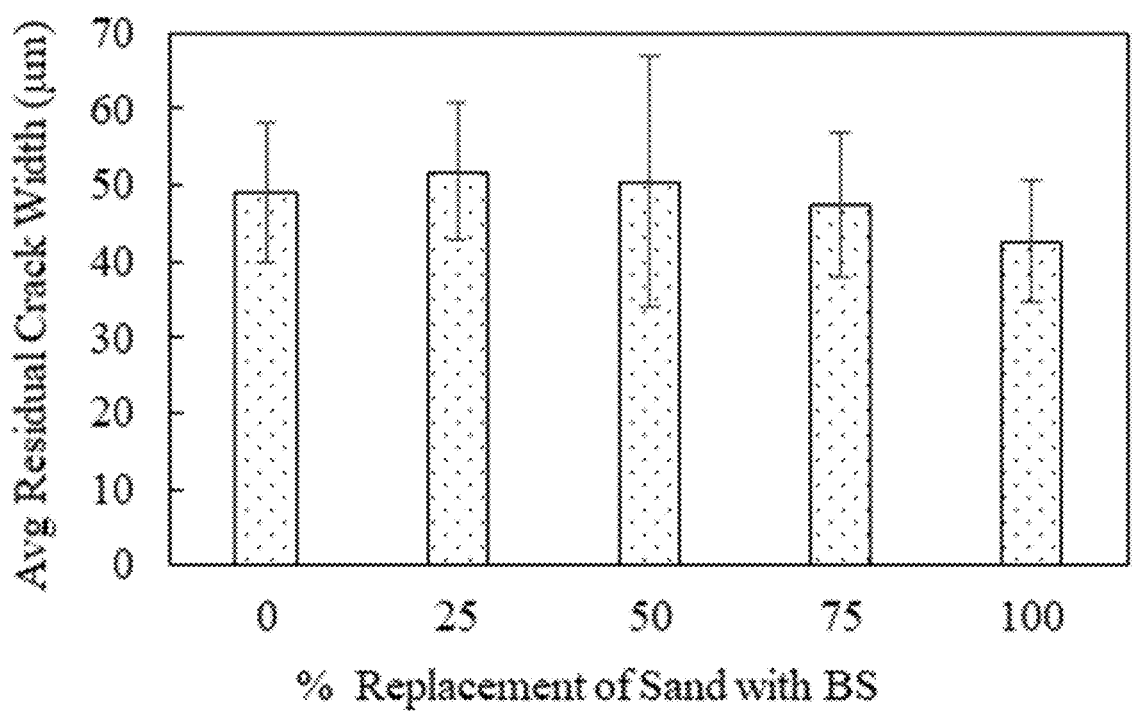
FIG. 29 is a graph showing the average residual crack width of M2-BS ECC mixtures according to various embodiments of the present disclosure.

The large crack width (usually larger than 100 μm) in normal concrete expedites the penetration of deleterious agents into the concrete structures and adversely affect their durability properties. Unlike normal concrete, ECC materials show inherently tight crack width (usually between 60 and 100 μm) under large tensile deformation; thus, allowing the possibility of designing ECC materials with low permeability and high durability (Li 2008). FIG. 29 shows the average residual crack width of all ECC mixtures after performing the uniaxial tensile test on dog-bone shaped specimens. As shown in FIG. 29, the crack width of all specimens evaluated in this study did not exceed an average width of 51.7 μm. Moreover, increasing the content of bagasse sand exhibited a clear propensity to favour crack tightness. It was also observed that the crack width reduced to 42.6 μm when 100% of sand is replaced with BS. It should be noted that the crack width below 50 μm has been found to be beneficial to promote the self-healing phenomena in cementitious materials (Kan et al. 2010). Therefore, the tight crack width makes the self-healing of BS-ECC cracks possible.

Conclusions

This study in this example investigated the influence of BS as sand replacement in ECC (at 0%, 25%, 50%, 75%, and 100% contents of sand replaced by volume). Based on the experimental findings, the following conclusions are drawn:

SEM-EDS analysis showed that BS consists of a high amount of pozzolanic component (i.e., 81.23%) with varied shapes (irregular, spherical, and prismatic) and sizes.

All BS-ECC mixtures (with an exception of ECC mix with 25% of sand replaced with BS) exhibited higher compressive strength than control ECC. The enhancement in compressive and tensile strength may be attributed to the pozzolanic and/or filler effect of BS. Due to these effects, the microstructure of the cementitious matrix enhances; thus, yielding higher compressive strength.

The tensile ductility of BS-ECC materials was considerably affected by the inclusion of BS, i.e., at all replacement levels, an increase in the tensile strain capacity in comparison to the regular ECC was observed. The maximum increase in tensile strain capacity compared to the control ECC was at 50% sand replacement with BS. The increase in strain ductility of the samples in the presence of BS could be attributed to the smaller particle size of BS in comparison to silica sand, which limited the matrix fracture toughness and enhanced fiber dispersion. However, an increase in sand replacement with BS beyond 50% did not produce further enhancements in tensile ductility. This could be possibly due to the loss in workability at high replacement levels of silica sand with BS which in tur negatively influenced fiber dispersion.

All BS-ECC mixtures outperformed the tensile strength of the control ECC mixture. The maximum tensile strength was exhibited by the ECC mixture utilizing 50% of sand replaced by BS. The increase in strength is attributed to enhanced fiber/matrix bond enhancement (i.e., mainly frictional bond) due to the pozzolanic and/or filler effect of BS.

The average crack width of ECC mixtures did not exceed 51.7 μm, suggesting an exceptional durability potential of these composite materials.

Example 5 References

American Sugar Cane League. (2017). The Louisiana Sugar Industry.

Arce, G., Noorvand, H., Hassan, M., Rupnow, T., and Hungria, R. (2019). "Cost-Effective ECC with Low Fiber Content for Pavement Application." MATEC Web of Conferences, 271(EDP Sciences), 07001.

ASTM Standard C 192. (2002). Standard Practice for Making and Curing Concrete Test Specimens in the Laboratory. ASTM International, West Conshohocken, Pa.

Bahurudeen, A., and Santhanam, M. (2015). "Influence of different processing methods on the pozzolanic performance of sugarcane bagasse ash." Cement and Concrete Composites, Elsevier Ltd, 56, 32-45.

Cordeiro, G. C., Toledo Filho, R. D., and Fairbairn, E. M. R. (2009). "Effect of calcination temperature on the pozzolanic activity of sugar cane bagasse ash." Construction and Building Materials, Elsevier Ltd, 23(10), 3301-3303.

Govindarajan, D., and Jayalakshmi, G. (2011). "XRD, FTIR and Microstructure Studies of Calcined Sugarcane Bagasse Ash." Advances in Applied Science Research, 2(3), 544-549.

Japan Society of Civil Engineers. (2008). "Recommendations for Design and Construction of High Performance Fiber Reinforced Cement Composites with Multiple Fine Cracks (HPFRCC)." Concrete Engineering Series, 82, Testing Method 6-10.

Kan, L.-L., Kan, L.-L., Shi, H.-S., Sakulich, A. R., and Li, V. C. (2010). "Self-Healing Characterization of Engineered Cementitious Composite Materials." ACI materials journal, 107(6), 617.

Kanda, T., and Li, V. C. (2006). "Practical Design Criteria for Saturated Pseudo Strain Hardening Behavior in ECC." Journal of Advanced Concrete Technology, 4(1), 59-72.

Kim, J. K., Kim, J. S., Ha, G. J., and Kim, Y. Y. (2007). "Tensile and fiber dispersion performance of ECC (engineered cementitious composites) produced with ground granulated blast furnace slag." Cement and Concrete Research, 37(7), 1096-1105.

Koker, D. De, and Zijl, G. Van. (2004). "Extrusion of engineered cement-based composite material." Proceedings of the 6th RILEM Symposium on Fiber-Reinforced Concretes (FRC), (September), 1301-1310.

Li, V. C., Wang, S. and Wu, C. (2001). "Tensile strain-hardening behaviour of Polyvinyl Alcohol Engineered Cementitious Composites (PVA-ECC)." ACI Materials Journal, (98), 483-492.

Li, M. L. and V. C. (2009). "influence of Material Ductility on Performance of Concrete Repair-2009.pdf." Aci Materials Journal, (September-October), 419-428.

Li, M., and Li, V. C. (2013). "Rheology, fiber dispersion, and robust properties of Engineered Cementitious Composites." Materials and Structures, 46(3), 405-420.

Li, V. C. (1992). "Postcrack scaling relations for fiber reinforced cementitious composites." Journal of Materials in Civil Engineering, 4(1), 41-57.

Li, V. C. (1998). "Engineered Cementitious Composites (ECC)—Tailored Composites through Micromechanical Modeling." Fiber Reinforced Concrete: Present and the Future, Eds: N. Banthia, A. Bentur, and A. Mufti, Canadian Society of Civil Engineers, 64-97.

Li, V. C. (2008). "Engineered Cementitious Composites (ECC)—Material, Structural, and Durability Performance." Concrete Construction Engineering Handbook, 78.

Li, V. C. (2012). "Tailoring ECC for Special Attributes: A Review." International Journal of Concrete Structures and Materials, 6(3), 135-144.

Li, V. C., Mishra, D. K., Naaman, A. E., Wight, J. K., LaFave, J. M., Wu, H. C., and Inada, Y. (1994). "On the shear behavior of engineered cementitious composites." Advanced Cement Based Materials, 1(3), 142-149.

Li, V. C., Wu, C., Wang, S., Ogawa, A., and Saito, T. (2002). "Interface tailoring for strain-hardening polyvinyl alcohol-engineered cementitious composite (PVA-ECC)." ACI Materials Journal, 99(5), 463-472.

Li, V. C., Wu, C., Wang, S., Ogawa, A., and Saito. T. (2003). "Interface Tailoring for Strain-Hardening Polyvinyl Alcohol-Engineered Cementitious Composite." Material Journal, 99(5), 463-472.

Marshall, D. B., and Cox, B. N. (1988). "A J-integral method for calculating steady-state matrix cracking stresses in composites." Mechanics of materials. 7(2), 127-133.

Modani, P. O., and Vyawahare, M. R. (2013). "Utilization of bagasse ash as a partial replacement of fine aggregate in concrete." Procedia Engineering, Elsevier B. V., 51(NUiCONE 2012), 25-29.

Naaman, A. E. (1996). "Characterization of high performance fiber reinforced cement composites-HPFRCC." High performance fiber reinforced cement composites, 1-23.

Noorvand, H., Arce, G., Hassan, M., Rupnow, T., and Mohammad, L. N. (2019). "Investigation of the Mechanical Properties of Engineered Cementitious Composites with Low Fiber Content and with Crumb Rubber and High Fly Ash Content." Transportation Research Record, 1-11.

Pan, Z., Wu, C., Liu, J., Wang, W., and Liu, J. (2015). "Study on mechanical properties of cost-effective polyvinyl alcohol engineered cementitious composites (PVA-ECC)." Construction & Building Materials, 78, 397-404.

Payá, J., Monzó, J., Borrachero, M. V., Diaz-Pinzón, L., and Ordónez, L. M. (2002). "Sugar-cane bagasse ash (SCBA): Studies on its properties for reusing in concrete production." Journal of Chemical Technology and Biotechnology, 77(3), 321-325.

Redon, C., U, V. C., Wu, C., Hoshiro, H., Saito, T., and Ogawa, A. (2001). "Measuring and Modifying Interface Properties of PVA Fibers in ECC Matrix." Journal of Materials in Civil Engineering, 13(6), 399-406.

Şahmaran, M., Lachemi, M., Hossain, K. M. A., Ranade, R., and Li, V. C. (2009). "influence of aggregate type and size on ductility and mechanical properties of engineered cementitious composites." ACI Materials Journal, 106(3), 308-316.

Subedi, S., Arce, G., Hassan, M., Kumar, N., Barbato, M., and Gutierrez-Wing, M. T. (2019). "Influence of Production Methodology on the Pozzolanic Activity of Sugarcane Bagasse Ash." MATEC Web of Conferences, 271, 07003.

Wang, S., and Li, V. C. (2006). "High-early-strength engineered cementitious composites." ACI Materials Journal, 103(2), 97-106.

Wang, S., and Li, V. V. C. V. (2007). "Engineered cementitious composites with high-volume fly ash." ACI Materials Journal, 104(3), 233-241.

Zhou, J., Qian, S., Sierra Beltran, M. G., Ye, G., van Breugel, K., and Li, V. C. (2010). "Development of engineered cementitious composites with limestone powder and blast furnace slag." Materials and Structures, 43(6), 803-814.

Example 6

The objective of the study in the present example was to investigate the influence of post-processed sugarcane bagasse ash (SCBA) on the mechanical properties of ECC when utilized as a partial replacement of cement in ECC mixtures.

Materials

Type I ordinary Portland cement conforming to ASTM C150 was utilized for all mortar mixtures in this study (ASTM C150/150M 2012). The chemical composition of cement obtained from electron dispersive x-ray spectroscopy (EDS) is presented in Table 6.1. Silica sand, i.e., fine river sand (specific gravity of 2.62) with a mean particle size of 421 µm and a maximum nominal particle size of 995 µm was utilized in all ECC mixtures. In the case of mortar specimens for strength activity index (SAI) tests, standard graded sand as per ASTM C778 was used (ASTM C778 2018). For all ECC mixtures, a high-range water reducing admixture (HRWR), and Polyvinyl Alcohol (PVA) fibers were utilized for the production of ECC. The PVA fibers utilized were non-oil coated RECS-15 fibers provided by NYCON, US; the properties of PVA fiber is presented in Table 6.2.

Figure 30A:
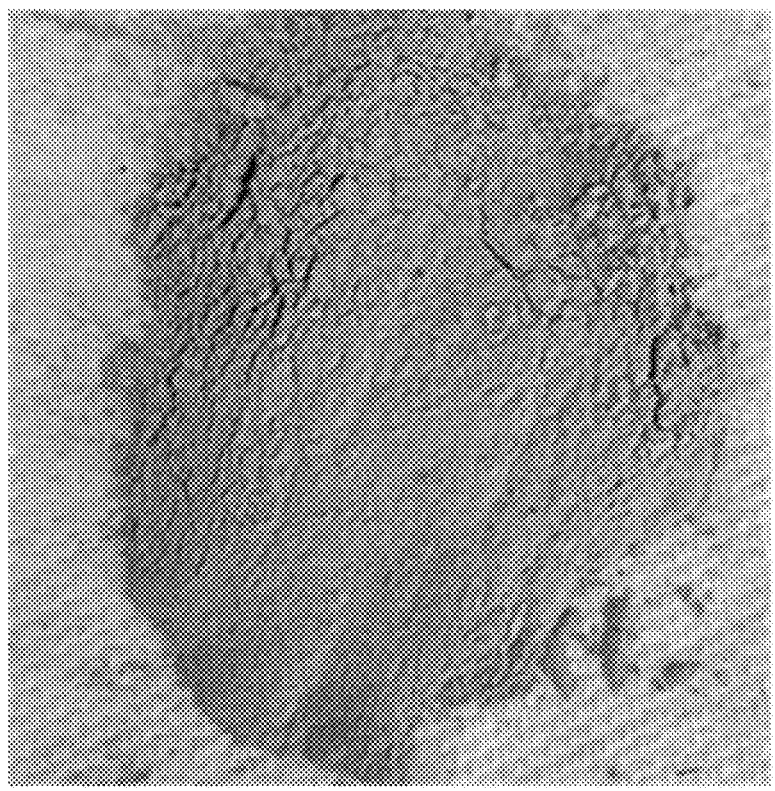
FIGS. 30A-30B are images of (FIG. 30A) Post-Processed SCBA and (FIG. 30B) SEM Image of Post-Processed SCBA.
Figure 30B:
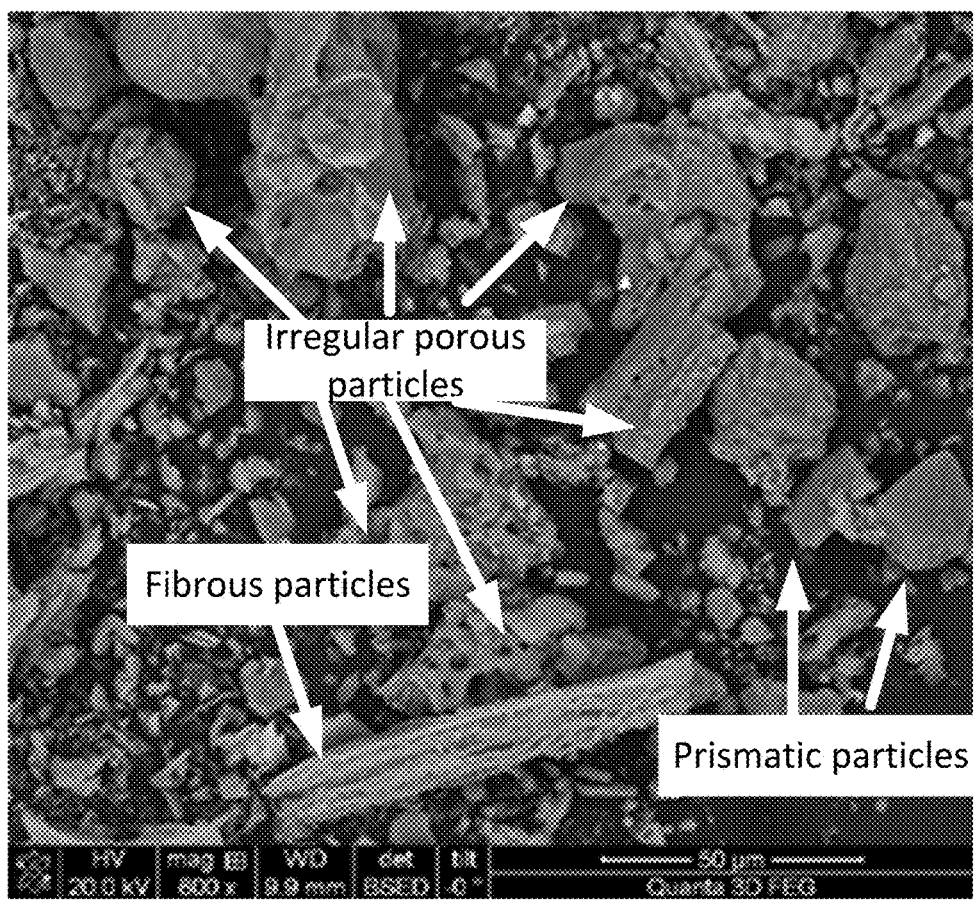

For the production of post-processed SCBA, the SCBA was collected from a sugar mill, Alma Plantation, located in Lakeland, La. The collected SCBA was initially dried at 65° C. for 10-12 hours to remove moisture and subsequently sieved using a No. 20 sieve (i.e., 841 µm opening sieve) to remove coarse impurities (i.e., large unburnt fibers, gravel, etc.). Next, the material was calcinated at 350° C. for 2 hours and then for 3 additional hours at 450° C. The raw SCBA collected from the Louisiana's sugar mill is of insufficient quality for direct use as a Supplementary Cementitious Material (SCM) due to the uncontrolled burning process of SBF in the sugar mill boilers. Therefore, the collected SCBA was further burned under controlled conditions to get rid of the unburnt fibrous particles. After completion of the calcination phase, the materials were kept inside the oven until they reached a temperature of 90° C. (i.e., all materials cooled down inside the oven), and were subsequently ground at 300 rpm in a jar mill for 35 minutes. FIGS. 30A-30B are example images of t

TABLE 6.1

| Oxide Composition of Cement | | | | | | | | | |
|---|---|---|---|---|---|---|---|---|---|
| Oxide | CaO | $SiO_2$ | $Al_2O_3$ | $Fe_2O_3$ | $K_2O$ | $Na_2O$ | MgO | $SO_3$ | $CO_2$ |
| Cement (%) | 63.77 | 19.6 | 4.55 | 3.00 | 0.37 | 0.00 | 2.27 | 3.43 | — |

TABLE 6.2

| PVA Fiber Properties | | | | | |
|---|---|---|---|---|---|
| Fiber Type | Length (mm) | Diameter (µm) | Young's Modulus (GPa) | Tensile Strength (MPa) | Elongation (%) |
| RECS-15 | 8 | 38 | 40 | 1600 | 6 |

ECC Mixtures Procedure

In this study, all ECC mixtures were prepared using a planetary mixer. Initially, all powder components (cement, SCBA, and sand) were dry mixed for three minutes. Subsequently, water and HRWR was added at slow speed and mixed for another three minutes. Next, PVA fibers were introduced into the mix in two minutes while mixing at low speed, and, finally, mixed at high speed for another five minutes. Upon completion of the mixing process, three cylindrical and ten dog-bone specimens were casted on a vibrating table. After 24 hours of mixing, all specimens were demolded and then cured in moist room (23±2° C., >95% Relative Humidity) according to ASTM C 511 (ASTM C511 2003).

TABLE 6.3

| ECC Mixture Design Proportions | | | | | | | |
|---|---|---|---|---|---|---|---|
| Mix ID | Cement (kg/m³) | SCBA (kg/m³) | SCBA (%)[a] | Water (kg/m³) | Sand (kg/m³) | HRWR (%)[b] | $V_f$ (%)[c] | Fibers (kg/m³) |
| M-0 | 1271.2 | 0.0 | 0 | 406.8 | 457.6 | 0 | 1.5 | 19.5 |
| M-25 | 736.1 | 490.8 | 40 | 441.6 | 441.6 | 0.6 | 1.5 | 19.5 |
| M-50 | 608.1 | 608.1 | 50 | 389.1 | 437.8 | 1.0 | 1.5 | 19.5 |
| M-75 | 482.3 | 723.4 | 60 | 385.8 | 434.1 | 1.5 | 1.5 | 19.5 |

[a]% of cement replacement by mass;

[b]% of HRWR by weight of cement;

[c]% of fiber content by volume

ECC Testing
Uniaxial Tensile Test

TABLE 6.4

Oxide Composition of Post-Processed SCBA

| Oxide | CaO | SiO$_2$ | Al$_2$O$_3$ | Fe$_2$O$_3$ | K$_2$O | Na$_2$O | MgO | SO$_3$ | CO$_2$ | SiO$_2$ + Al$_2$O$_3$ + Fe$_2$O$_3$ |
|---|---|---|---|---|---|---|---|---|---|---|
| SCBA (%) | 3.6 | 70.1 | 8.2 | 5.6 | 4.1 | 0.0 | 0.4 | 0.0 | 6.8 | 83.9 |

Strength Activity Index (SAI)

TABLE 6.5

Strength Activity Index Results

| ID | Description | Compressive Strength (MPa) | SD (MPa) | CV (%) | SAI (%) |
|---|---|---|---|---|---|
| CO | Control | 42.73 | 4.90 | 11.48 | N/A |
| BA | 20% cement replacement with SCBA | 33.69 | 3.40 | 10.9 | 78.85 |
| SA | 20% cement replacement with sand | 27.23 | 3.84 | 14.12 | 63.72 |

Figure 31A:
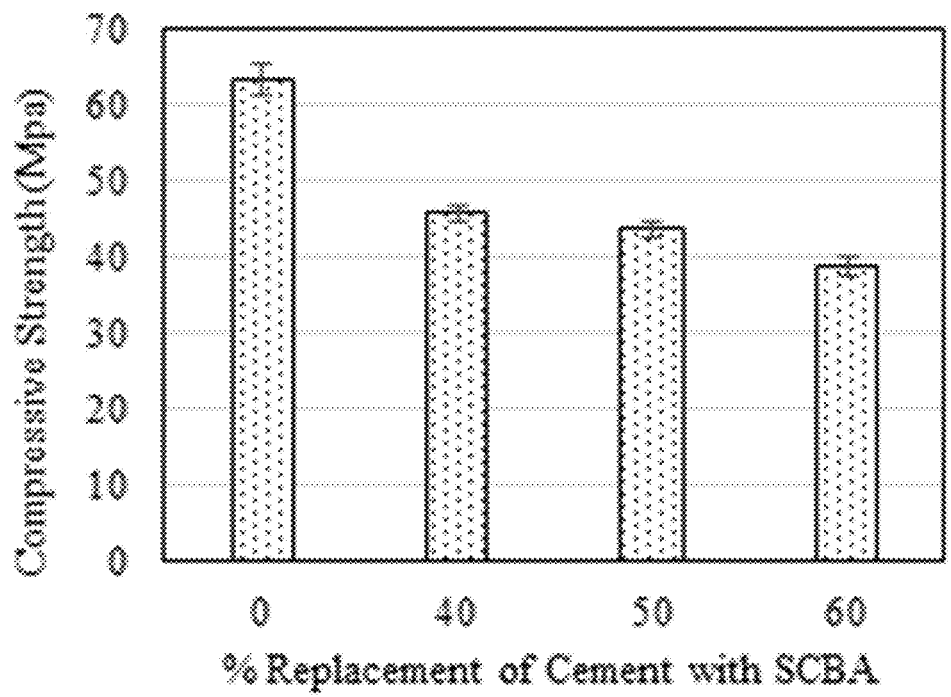
FIGS. 31A-31B are graphs showing (FIG. 31A) ECC Compressive Strength and (FIG. 31B) ECC Hardened Density according to various embodiments of the present disclosure.
Figure 31B:
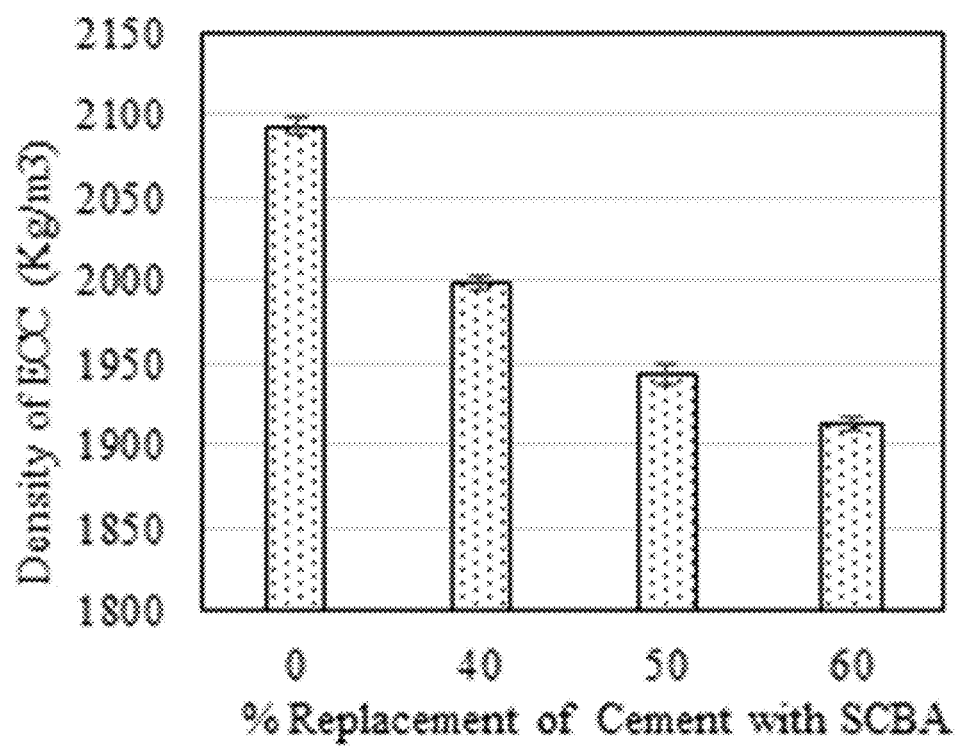
Figure 32A:
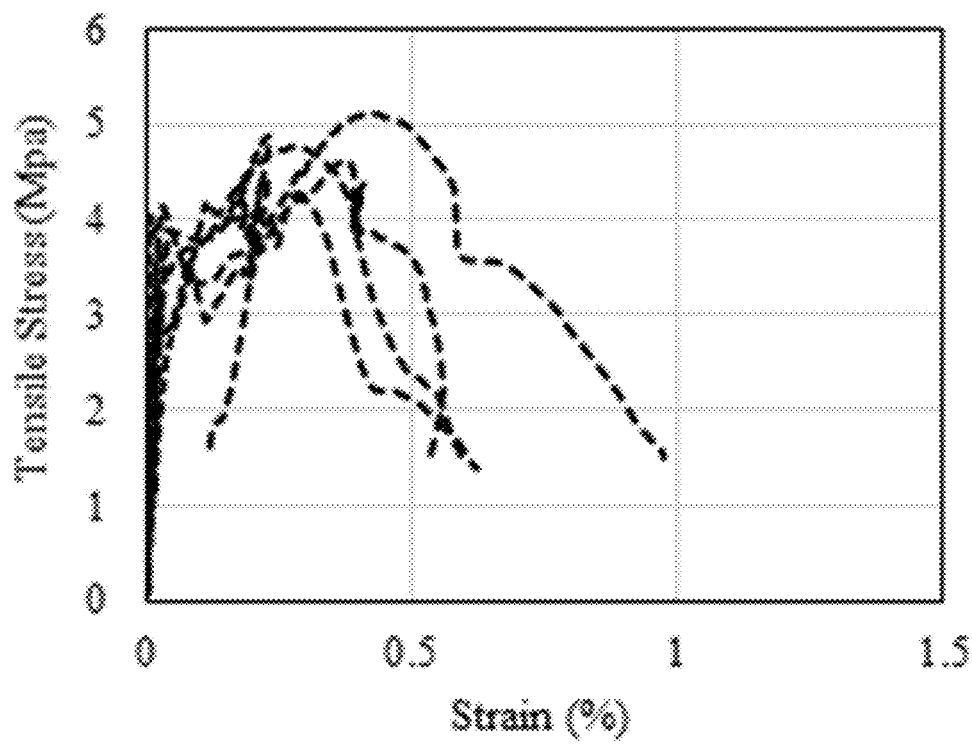
FIGS. 32A-32D show Tensile Stress vs. Strain Curves of ECC Mixtures comprising (FIG. 32A) M-C-0, (FIG. 328) M-C-40, (FIG. 32C) M-C-50, and (FIG. 32D) M-C-60.
Figure 32B:
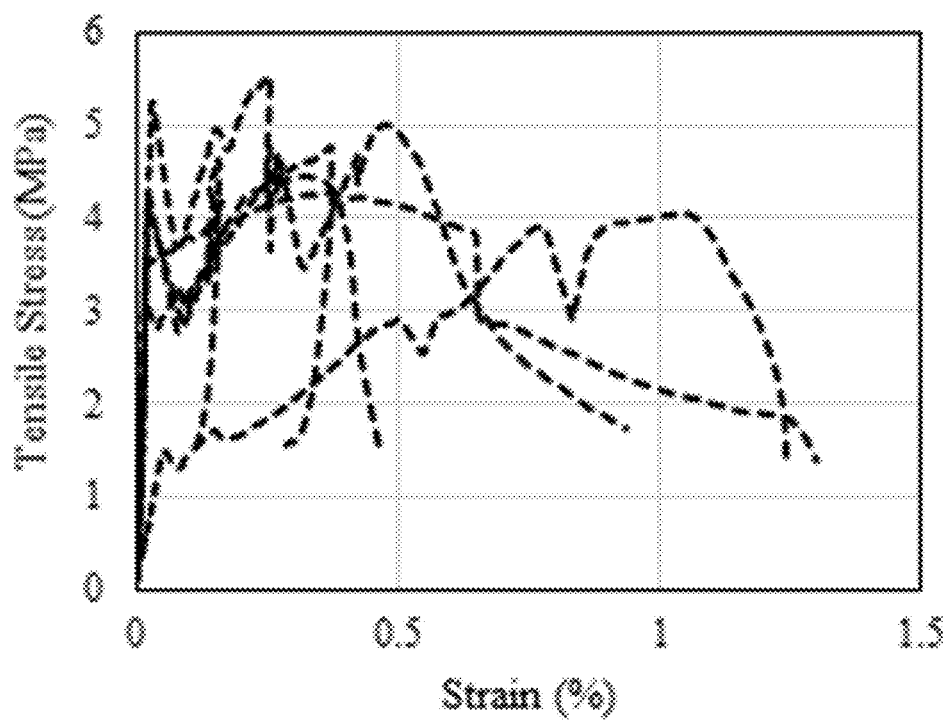
Figure 32C:
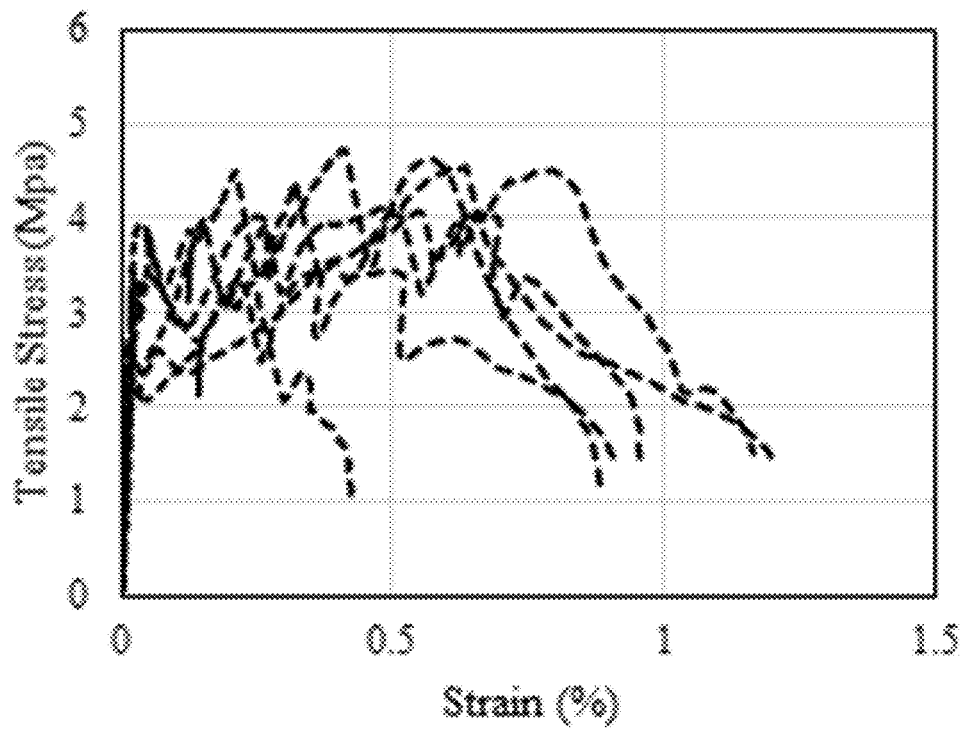
Figure 32D:
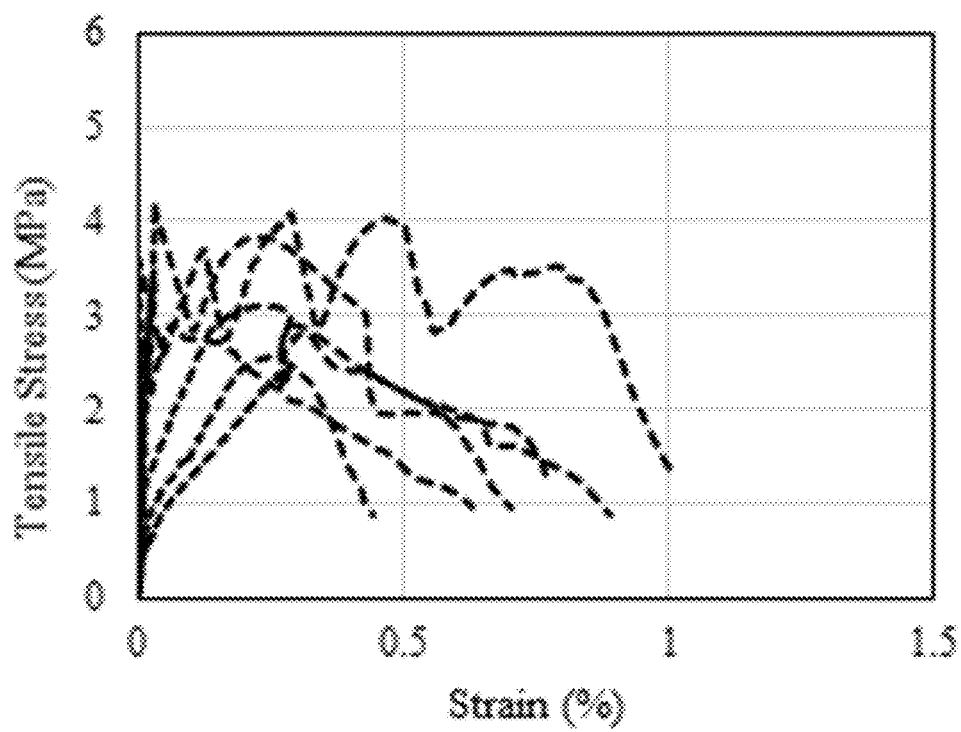
Figure 33A:
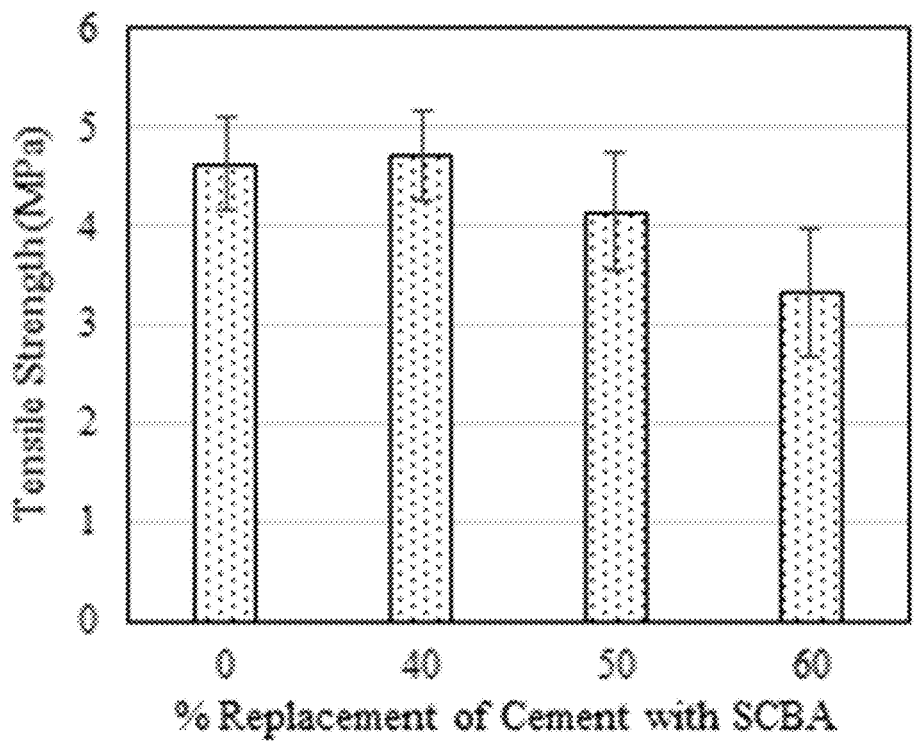
FIGS. 33A-33B are graphs showing uniaxial tensile test results.
Figure 33B:
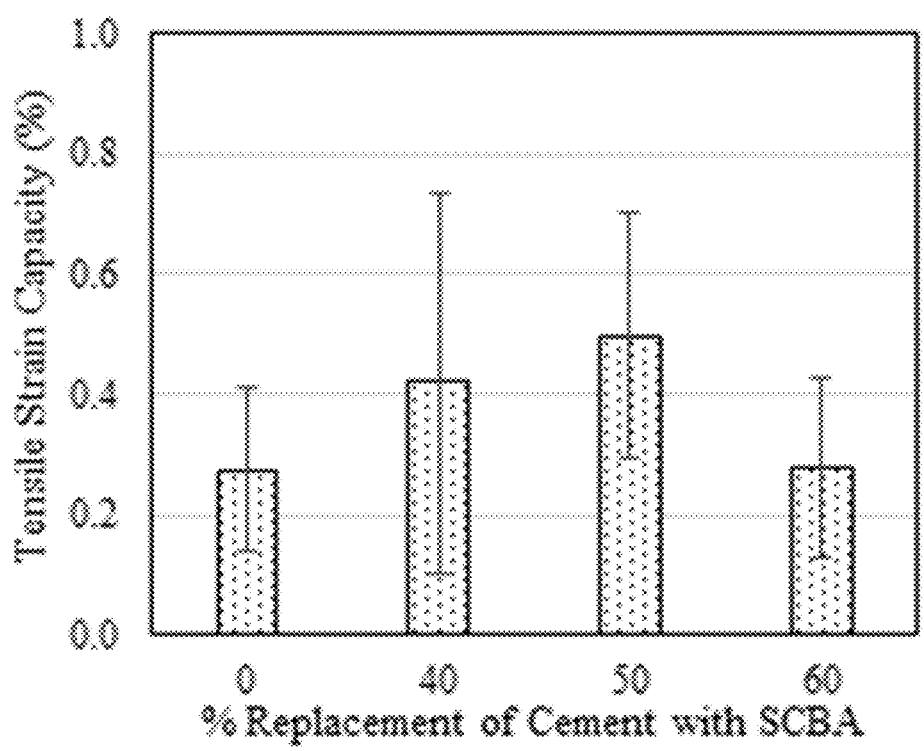
Figure 34:
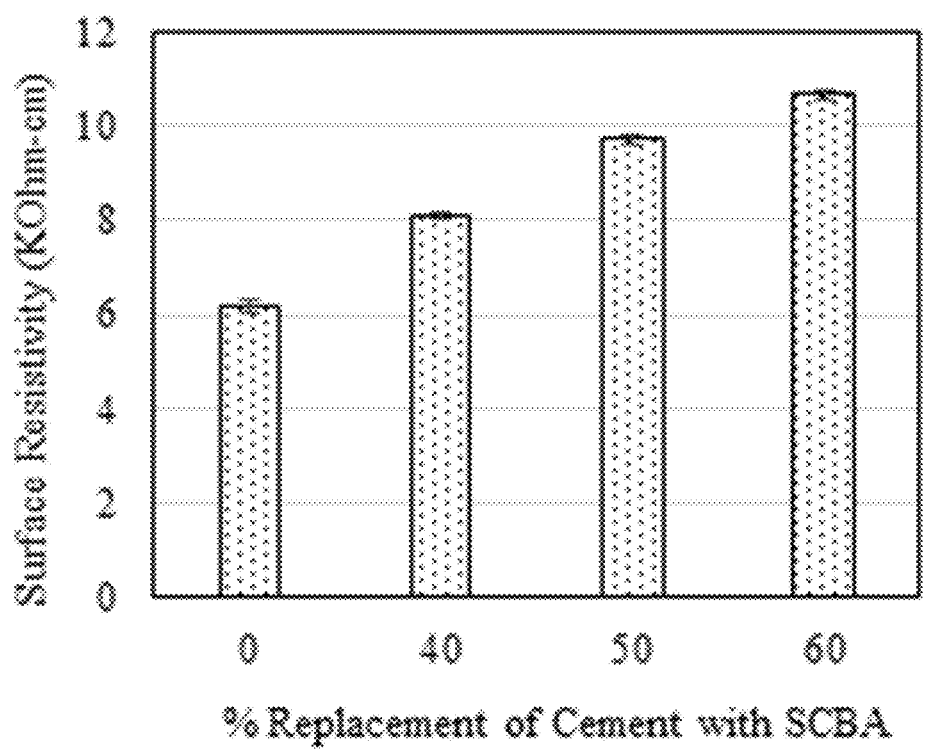
FIG. 34 is a graph showing surface resistivity test results at 28 days of curing, according to various embodiments of the present disclosure.

Compressive strength and hardened density is shown in FIGS. 31A and 31B, respectively. Tensile stress versus strain curves of various mixtures are shown in FIGS. 32A-32D. Uniaxial tensile tests and surface resistivity are shown in 33A-33B and FIG. 34, respectively. Tests were conducted as described in the previous examples.

Summary and Conclusion

This study Investigated the effects of post-processed sugarcane bagasse ash (SCBA) on the fresh and hardened properties of ECC materials when utilized as a partial replacement of cement. In addition, this study explored the effects of SCBA on the fiber-bridging relation of the composites. Based on the experimental results, the following conclusions can be drawn.

SEM-EDS analysis revealed that the SCBA utilized in this study consisted of small sized particles with varied shapes (mostly irregular) with silica as its main constituents. In addition, the pozzolanic component (SiO$_2$+Al2O3+Fe2O3) of SCBA was determined to be 83.9%; thus, meeting ASTM C618 minimum requirement to be classified as a class F and N pozzolans. Moreover, SCBA exhibited an SAI of 78.8%; thus, meeting ASTM C618 minimum requirement to be classified as a pozzolan.

Due to the small particle size and irregular particle shape of SCBA, increasing replacements of cement with SCBA caused a loss in workability in ECC mixtures. To achieve sufficient workability for mixing, high dosages of HRWR were utilized.

The compressive strength showed a decreasing trend with the increase of SCBA content. The maximum strength decrease of 39.4% was observed at 60% cement replacement with SCBA.

The tensile ductility of ECC materials was improved by the inclusion of SCBA. An improvement in tensile ductility of up to 85% compared to control was observed for SCBA-ECC materials at 50% replacement of cement with SCBA.

In the case of tensile strength, a minimal improvement (2.2%) was observed at 40% cement replacement with SCBA compared to control. However, with the further increase in the cement replacement with SCBA, the tensile strength decreased compared to the control mixture.

The surface resistivity of ECC materials was drastically affected by the inclusion of SCBA. In general, a distinctive increasing trend in surface resistivity with the increment in cement replacement with SCBA was observed. This in turn, this translates into a potential increase in the durability of ECC materials with SCBA as cement replacement.

These results suggest that that the utilization of Post-Processed SCBA as cement replacement in ECC is promising. Utilization of SCBA as cement replacement in ECC may occur in conjunction with other SCMs in an optimized system.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. Al such modifications and variations are intended to be included herein within the scope of this disclosure.

What is claimed is:

1. An Engineered Cementitious Composite (ECC) comprising: cement, fibers, and fine aggregate;
where the fine aggregate comprises sugar cane bagasse ash SCBA;
where the fibers comprise about 1% to 3% volume fraction of the ECC; and
where the fibers comprise non-oil-coated polymeric fibers selected from non-oil-coated Polyvinyl Alcohol (PVA), non-oil-coated Polypropylene (PP), non-oil-coated Polyethylene (PE), or a combination thereof.

2. The Engineered Cementitious Composite of claim 1, wherein the cement comprises about 5% to about 90% of the ECC by volume.

3. The Engineered Cementitious Composite of claim 1, wherein the SCBA comprises about 5% to about 90% percent of the fine aggregate by volume.

4. The Engineered Cementitious Composite of claim 1, wherein the fine aggregate further comprises fine silica sand.

5. The Engineered Cementitious Composite of claim 1, further comprising water.

6. The Engineered Cementitious Composite of claim 5, wherein the ECC has a tensile strain capacity of about 2% to 10%.

7. The Engineered Cementitious Composite of claim 5, further comprising high range water reducer.

8. The Engineered Cementitious Composite of claim 1, wherein the ratio by weight of the sugar cane bagasse ash to cement is about 1:20 to 9:1.

9. The Engineered Cementitious Composite of claim 1, wherein a portion of the cement is substituted by a supplementary cementitious material;
   wherein the supplementary cementitious material comprises fly ash; and
   wherein the fly ash to cement ratio is about 1:20 to 9:1 by weight.

10. A concrete product, comprising an Engineered Cementitious Composite (ECC), wherein the ECC comprises cement, fine aggregate, and polymeric fiber;
   where the cement comprises about 5% to 90% by weight of the ECC;
   where the fine aggregate comprises about 5% to 90% by weight of the ECC;
   where the polymeric fiber comprises about 1% to 3% by volume of the ECC;
   where the polymeric fibers are selected from Polyvinyl Alcohol (PVA), Polypropylene (PP), Polyethylene (PE), or a combination thereof; and
   where the fine aggregate comprises sugar cane bagasse ash (SCBA).

11. The concrete product of claim 10, wherein the SCBA has been subjected to controlled burning and has a mean particle size ranging from 1 to 1000 μm.

12. The concrete product of claim 10, wherein the SCBA is raw SCBA having a mean particle size from about 1 to 1000 μm.

13. The concrete product of claim 10, wherein the fine aggregate further comprises fine silica sand having a mean particle size of about 1 to 3000 μm.

14. The concrete product of claim 10, wherein the fine aggregate comprises SCBA and fine silica sand in a ratio of about 1:20 to about 1:0 by weight.

15. The concrete product of claim 10, further comprising water, high range water reducer, or a combination thereof.

* * * * *